United States Patent
Seib et al.

(10) Patent No.: US 12,479,892 B2
(45) Date of Patent: Nov. 25, 2025

(54) IMMUNOGENIC PROTEIN AGAINST GONOCOCCAL INFECTION

(71) Applicant: Griffith University, Nathan (AU)

(72) Inventors: Kate Seib, Nathan (AU); Evgeny Semchenko, Nathan (AU)

(73) Assignee: Griffith University, Nathan (AU)

( * ) Notice: Subject to any disclaimer, the term of this patent is extended or adjusted under 35 U.S.C. 154(b) by 537 days.

(21) Appl. No.: 17/779,411

(22) PCT Filed: Nov. 20, 2020

(86) PCT No.: PCT/AU2020/051257
§ 371 (c)(1),
(2) Date: May 24, 2022

(87) PCT Pub. No.: WO2021/102505
PCT Pub. Date: Jun. 3, 2021

(65) Prior Publication Data
US 2023/0181709 A1    Jun. 15, 2023

(30) Foreign Application Priority Data
Nov. 25, 2019   (AU) .............................. 2019904450

(51) Int. Cl.
| | | |
|---|---|---|
| *C07K 14/22* | (2006.01) | |
| *A61K 39/095* | (2006.01) | |
| *A61P 37/04* | (2006.01) | |
| *C07K 16/12* | (2006.01) | |
| *A61K 39/00* | (2006.01) | |

(52) U.S. Cl.
CPC ............ *C07K 14/22* (2013.01); *A61K 39/095* (2013.01); *A61P 37/04* (2018.01); *C07K 16/1217* (2013.01); *A61K 2039/55566* (2013.01)

(58) Field of Classification Search
CPC ........................................................ C07K 14/22
See application file for complete search history.

(56) References Cited

FOREIGN PATENT DOCUMENTS

| WO | WO-0164922 A2 * | 9/2001 | ........... A61K 39/095 |
|---|---|---|---|
| WO | WO 2016/008961 A1 | 1/2016 | |
| WO | WO 2018/042017 A2 | 3/2018 | |

OTHER PUBLICATIONS

Esposito et al., "Structure of the C-terminal Doman of Neisseria Heparin Binding Antigen (NHBA), One of the Main Antigens of a Novel Vaccine against Neisseria meningitidis", J. of Biol. Chem., 286(48):41767-41775, 2011.
International Search Report and Written Opinion for International Application No. PCT/AU2020/051257, mailed Feb. 1, 2021.
Serruto et al., "Neisseria meningitidis GNA2132, a heparin-binding protein that induces protective immunity in humans", PNAS, 107(8):3770-3775, 2010.
UniProtKB, "B4RQT3_NEIG2", GNA2132, NGK_2289, NCBI Taxonomic Identifier: 521006, Neisseria gonorrhoeae (strain NCCP11945), Sep. 23, 2008.
Samchenko et al., "The Serogroup B Meningococcal Vaccine Bexsero Elicits Antibodies to Neisseria gonorrhoeae", Clinical Infectious Diseases, Sep. 13, 2019, 69(7): 1101-1111.

* cited by examiner

*Primary Examiner* — Albert M Navarro
(74) *Attorney, Agent, or Firm* — Jones Day

(57) ABSTRACT

This invention relates, inter alia, to an immunogenic fragment of a Neisserial Heparin Binding Antigen (NHBA) protein of *Neisseria gonorrhoeae* (SEQ ID NO: 1) for the prevention and treatment of *Neisseria gonorrhoeae* or gonococcal- or meningococcal-associated diseases and conditions. In some embodiments, the immunogenic fragment corresponds to a C-terminal fragment of the protein (SEQ ID NO: 2).

8 Claims, 21 Drawing Sheets
Specification includes a Sequence Listing.

A Gram stain
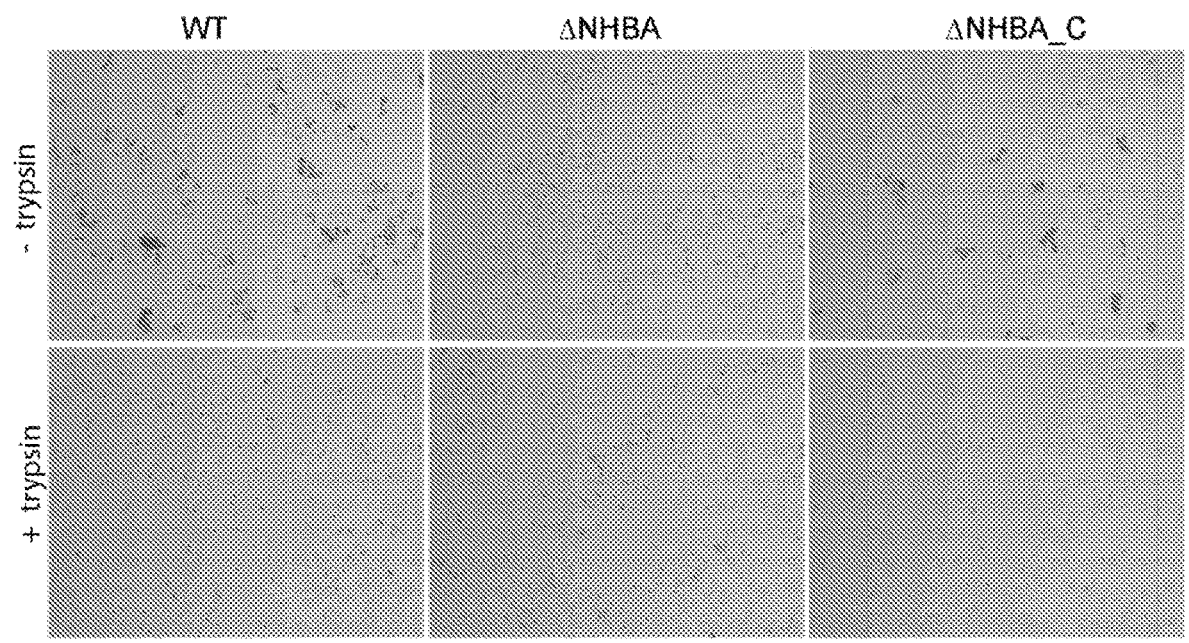
B Western Blot
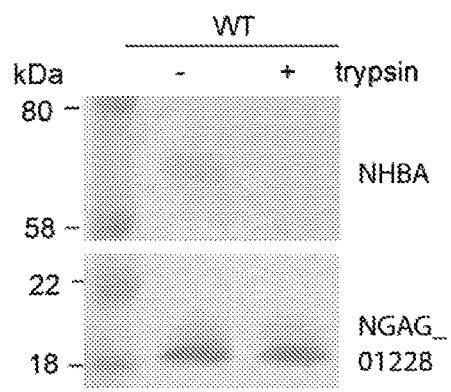
FIG. 15

| | Class | NHBA$_{Ng}$ | No. glycans bound |
|---|---|---|---|
| Glycan | Terminal Gal | | 6/100 (6%) |
| | Terminal GlcNAc | | 4/30 (13%) |
| | Mannosyl | | 1/20 (5%) |
| | Fucosyl | | 7/66 (11%) |
| | Sialylated | | 8/66 (12%) |
| | Terminal GalNAc | | 4/22 (18%) |
| | Terminal Glc | | 3/12 (25%) |
| | Glycosaminoglycans (GAGs) | | 5/43 (12%) |
| | Other | | 1/9 (11%) |

FIG. 16

Sequence of NHBA from *N. gonorrhoeae 1291* SEQ ID NO: 1

MFKRSVIAMACIFPLSACGGGGGGSPDVKSADTPSKPAAPVVAENAGEGVLPKEKKDEEA
AGGAPQADTQDATAGEGSQDMAAVSAENTGNGGAATTDNPKNEDAGAQNDMPQNAAE
SANQTGNNQPAGSSDSAPASNPAPANGGSDFGRTNVGNSVVIDGPSQNITLTHCKGDPCNG
DNLLDEEAPPKSEFESLSDEEKIKKYKKDGEKFTGLVAIKVENNGLNKYTIIYQAQPTRSAR
SRRSLPAEIPLIPVNQADTLIVDGEAVSLTGHSGNIFAPEGNYRYLTYGAEKLPGGSYALRV
QGEPAKGEMLAGTAVYNGEVLHFHMENGRPYPSGGRFAAKVDFGSKSVDGIIDSSDDLH
MGTQKFKAAIDGNGFKGTWTENGGGDVSGRFYGPAGEEVAGKYSYRPTDAEKGGFGVFA
GKKDRD

Sequence of NHBA-C (c terminal fragment) SEQ ID NO: 2
SLPAEIPLIPVNQADTLIVDGEAVSLTGHSGNIFAPEGNYRYLTYGAEKLPGGSYALRVQGEP
AKGEMLAGTAVYNGEVLHFHMENGRPYPSGGRFAAKVDFGSKSVDGIIDSSDDLHMGTQ
KFKAAIDGNGFKGTWTENGGGDVSGRFYGPAGEEVAGKYSYRPTDAEKGGFGVFAGKKD
RD

SEQUENCE LISTING

<160> NUMBER OF SEQ ID NOS: 10

<210> SEQ ID NO 1
<211> LENGTH: 426
<212> TYPE: PRT
<213> ORGANISM: Neisseria gonorrhoeae (strain 1291)

<400> SEQUENCE: 1

```
Met Phe Lys Arg Ser Val Ile Ala Met Ala Cys Ile Phe Pro Leu Ser
1               5                   10                  15

Ala Cys Gly Gly Gly Gly Gly Ser Pro Asp Val Lys Ser Ala Asp
        20                  25                  30

Thr Pro Ser Lys Pro Ala Ala Pro Val Val Ala Glu Asn Ala Gly Glu
        35                  40                  45

Gly Val Leu Pro Lys Glu Lys Lys Asp Glu Glu Ala Ala Gly Gly Ala
    50                  55                  60

Pro Gln Ala Asp Thr Gln Asp Ala Thr Ala Gly Glu Gly Ser Gln Asp
65              70                  75                  80

Met Ala Ala Val Ser Ala Glu Asn Thr Gly Asn Gly Gly Ala Ala Thr
                85                  90                  95

Thr Asp Asn Pro Lys Asn Glu Asp Ala Gly Ala Gln Asn Asp Met Pro
                100                 105                 110

Gln Asn Ala Ala Glu Ser Ala Asn Gln Thr Gly Asn Asn Gln Pro Ala
            115                 120                 125

Gly Ser Ser Asp Ser Ala Pro Ala Ser Asn Pro Ala Pro Ala Asn Gly
130                 135                 140

Gly Ser Asp Phe Gly Arg Thr Asn Val Gly Asn Ser Val Val Ile Asp
145                 150                 155                 160

Gly Pro Ser Gln Asn Ile Thr Leu Thr His Cys Lys Gly Asp Pro Cys
                165                 170                 175

Asn Gly Asp Asn Leu Leu Asp Glu Glu Ala Pro Pro Lys Ser Glu Phe
                180                 185                 190

Glu Ser Leu Ser Asp Glu Glu Lys Ile Lys Tyr Lys Lys Asp Gly
                195                 200                 205

Glu Lys Phe Thr Gly Leu Val Ala Ile Lys Val Glu Asn Asn Gly Leu
210                 215                 220

Asn Lys Tyr Thr Ile Ile Tyr Gln Ala Gln Pro Thr Arg Ser Ala Arg
225                 230                 235                 240

Ser Arg Arg Ser Leu Pro Ala Glu Ile Pro Leu Ile Pro Val Asn Gln
                245                 250                 255

Ala Asp Thr Leu Ile Val Asp Gly Glu Ala Val Ser Leu Thr Gly His
                260                 265                 270

Ser Gly Asn Ile Phe Ala Pro Glu Gly Asn Tyr Arg Tyr Leu Thr Tyr
                275                 280                 285

Gly Ala Glu Lys Leu Pro Gly Gly Ser Tyr Ala Leu Arg Val Gln Gly
        290                 295                 300

Glu Pro Ala Lys Gly Glu Met Leu Ala Gly Thr Ala Val Tyr Asn Gly
305                 310                 315                 320

Glu Val Leu His Phe His Met Glu Asn Gly Arg Pro Tyr Pro Ser Gly
                325                 330                 335

Gly Arg Phe Ala Ala Lys Val Asp Phe Gly Ser Lys Ser Val Asp Gly
                340                 345                 350

Ile Ile Asp Ser Ser Asp Asp Leu His Met Gly Thr Gln Lys Phe Lys
                355                 360                 365

Ala Ala Ile Asp Gly Asn Gly Phe Lys Gly Thr Trp Thr Glu Asn Gly
        370                 375                 380

Gly Gly Asp Val Ser Gly Arg Phe Tyr Gly Pro Ala Gly Glu Glu Val
385                 390                 395                 400

Ala Gly Lys Tyr Ser Tyr Arg Pro Thr Asp Ala Glu Lys Gly Gly Phe
                405                 410                 415

Gly Val Phe Ala Gly Lys Lys Asp Arg Asp
```

```
                    420             425
```

<210> SEQ ID NO 2
<211> LENGTH: 183
<212> TYPE: PRT
<213> ORGANISM: Neisseria gonorrhoeae (strain 1291)

<400> SEQUENCE: 2

Ser Leu Pro Ala Glu Ile Pro Leu Ile Pro Val Asn Gln Ala Asp Thr
1               5                   10                  15

Leu Ile Val Asp Gly Glu Ala Val Ser Leu Thr Gly His Ser Gly Asn
            20                  25                  30

Ile Phe Ala Pro Glu Gly Asn Tyr Arg Tyr Leu Thr Tyr Gly Ala Glu
        35                  40                  45

Lys Leu Pro Gly Gly Ser Tyr Ala Leu Arg Val Gln Gly Glu Pro Ala
    50                  55                  60

Lys Gly Glu Met Leu Ala Gly Thr Ala Val Tyr Asn Gly Glu Val Leu
65                  70                  75                  80

His Phe His Met Glu Asn Gly Arg Pro Tyr Pro Ser Gly Gly Arg Phe
                85                  90                  95

Ala Ala Lys Val Asp Phe Gly Ser Lys Ser Val Asp Gly Ile Ile Asp
            100                 105                 110

Ser Ser Asp Asp Leu His Met Gly Thr Gln Lys Phe Lys Ala Ala Ile
        115                 120                 125

Asp Gly Asn Gly Phe Lys Gly Thr Trp Thr Glu Asn Gly Gly Gly Asp
    130                 135                 140

Val Ser Gly Arg Phe Tyr Gly Pro Ala Gly Glu Val Ala Gly Lys
145                 150                 155                 160

Tyr Ser Tyr Arg Pro Thr Asp Ala Glu Lys Gly Gly Phe Gly Val Phe
                165                 170                 175

Ala Gly Lys Lys Asp Arg Asp
            180

<210> SEQ ID NO 3
<211> LENGTH: 23
<212> TYPE: DNA
<213> ORGANISM: Neisseria gonorrhoeae (strain 1291)

<400> SEQUENCE: 3
atgtttaaac gcagtgtgat tgc                                          23

<210> SEQ ID NO 4
<211> LENGTH: 24
<212> TYPE: DNA
<213> ORGANISM: Neisseria gonorrhoeae (strain 1291)

<400> SEQUENCE: 4
tcaatcccga tcttttttgc cggc                                         24

<210> SEQ ID NO 5
<211> LENGTH: 29
<212> TYPE: DNA
<213> ORGANISM: Artificial sequence
<220> FEATURE:
<223> OTHER INFORMATION: Synthesized

<400> SEQUENCE: 5
ggatccccgg ccgagattcc gctgattcc                                    29

```
<210> SEQ ID NO 6
<211> LENGTH: 30
<212> TYPE: DNA
<213> ORGANISM: Artificial sequence
<220> FEATURE:
<223> OTHER INFORMATION: Synthesized

<400> SEQUENCE: 6
ggatccgcga cctcctcgac cgtgcagaac                                     30

<210> SEQ ID NO 7
<211> LENGTH: 20
<212> TYPE: DNA
<213> ORGANISM: Neisseria gonorrhoeae (strain 1291)

<400> SEQUENCE: 7
ggcatatggc ggaaacaata                                                20

<210> SEQ ID NO 8
<211> LENGTH: 24
<212> TYPE: DNA
<213> ORGANISM: Neisseria gonorrhoeae (strain 1291)

<400> SEQUENCE: 8
tcaatcccga tcttttttgc cggc                                           24

<210> SEQ ID NO 9
<211> LENGTH: 30
<212> TYPE: DNA
<213> ORGANISM: Artificial sequence
<220> FEATURE:
<223> OTHER INFORMATION: Synthesized from Neisseria gonorrhoea (strain
      1291)

<400> SEQUENCE: 9
attactcgag tcgcttccgg ccgagattcc                                     30

<210> SEQ ID NO 10
<211> LENGTH: 27
<212> TYPE: DNA
<213> ORGANISM: Artificial sequence
<220> FEATURE:
<223> OTHER INFORMATION: Synthesized from Neisseria gonorrhoeae (strain
      1291)

<400> SEQUENCE: 10
tgaaggatcc cggcatcaac atcaatc                                        27
```

IMMUNOGENIC PROTEIN AGAINST GONOCOCCAL INFECTION

RELATED APPLICATION DATA

This application is a 35 U.S.C. § 371 filing of International Patent Application No. PCT/AU2020/051257, filed Nov. 20, 2020, which claims priority to Australian Provisional Patent Application No 2019904450 filed Nov. 25, 2019, the contents of which are incorporated herein by reference in their entirety.

SEQUENCE LISTING

The instant application contains a Sequence Listing which has been submitted electronically in ASCII format and is hereby incorporated by reference in its entirety. Said ASCII copy, created on Dec. 15, 2022, is named 728242_FBR9-007US_ST25.txt and is 7,196 bytes in size.

TECHNICAL FIELD

THIS INVENTION relates to an immunogenic peptide for the prevention and treatment of *Neisseria gonorrhoeae* or gonococcal-associated diseases and conditions.

BACKGROUND

The ongoing emergence of multidrug resistant strains of *Neisseria gonorrhoeae* is a major challenge to the management of the sexually transmitted infections of gonorrhoea (1,2) and the World Health Organization (3), Centers for Disease Control (4), and Australian National Antimicrobial Resistance (AMR) Strategy (5) have prioritised *N. gonorrhoeae* as an urgent public health threat for which immediate action is needed. There are estimated to be more than 106 million cases of gonorrhoea worldwide each year (6) and infection rates are rising (e.g. over the past five years, there has been a 67% increase in cases in the USA (7) and an 80% increase in Australia (8)). The outcome of *N. gonorrhoeae* infection varies by site of infection and by sex (reviewed in 9,10), and includes asymptomatic and localised symptomatic infection, but if left undiagnosed and/or untreated, gonorrhoea can result in severe sequelae, such as pelvic inflammatory disease, pregnancy and neonatal complications, and infertility. Infection with *N. gonorrhoeae* also increases the risk of acquiring and transmitting HIV.

Due to its high prevalence, the severe sequelae it can cause, and the increasing difficulty of treating multi-drug resistant strains of *N. gonorrhoeae*, there is an urgent need for the development of a vaccine to prevent infection. There are, however, various challenges to developing a gonococcal vaccine, including the high level of phase and antigenic variation of *N. gonorrhoeae* surface structures, and the fact that there is no protective immunity following infection, which means there are no established correlates of protection to guide preclinical vaccine studies (reviewed in 9,11).

SUMMARY

Surprisingly, the present inventors have discovered that administration of a C-terminal fragment of a Neisserial Heparin Binding Antigen (NHBA) protein from *Neisseria gonorrhoeae* can elicit the production of antibodies with higher levels of bactericidal and opsonophagocytic killing than the full-length protein, particularly in gonococcal strains with relatively lower NHBA expression.

Accordingly, in a broad form, the invention is directed to an NHBA protein, such as that set forth in SEQ ID NO:1 or a fragment, variant or derivative thereof that is immunogenic and can elicit immune responses to *Neisseria gonorrhoeae* or gonococcal bacteria. In a preferred form, the NHBA protein is a C-terminal fragment that comprises the amino acid sequence set forth in SEQ ID NO:2 or a fragment, variant or derivative thereof.

A first aspect of the invention provides an immunogenic fragment of an isolated Neisserial Heparin Binding Antigen (NHBA) protein of *Neisseria gonorrhoeae*.

Suitably, the isolated NHBA protein comprises an amino acid sequence set forth in SEQ ID NO: 1 or a fragment, variant or derivative thereof.

In particular embodiments, the immunogenic fragment comprises a C-terminal fragment of the isolated NHBA protein, such as that amino acid sequence set forth in SEQ ID NO: 2 or a fragment, variant or derivative thereof.

Suitably, the variant or derivative of SEQ ID NO:2 comprises one or more amino acid substitutions of residues 4, 6, 7, 10, 21, 51, 58, 61, 62, 70, 72, 76, 77, 84, 89, 90, 92, 93, 94, 114, 136, 151,153, 154, 168, 174, 178, 181 and 182 thereof. More particularly, the one or more amino acid substitutions of SEQ ID NO:2 may be selected from the group consisting of A4V, I6M, P7L, P10S, G21E, P51S, R58S, G61A, E62K, A70V, T72A, N76S, G77R, M84T, P89S, Y90C, S92T, G93R, G94S, S114G, T136N, G151D, A153V, G154D, A168T, G174S, G178D, D181E, R182Q and any combination thereof.

In some embodiments, the immunogenic fragment comprises one or more heparin binding residues and/or one or more active site residues of the isolated NHBA protein. In other embodiments, the immunogenic fragment does not comprise a heparin binding residue and/or an active site residue of the isolated NHBA protein.

In a second aspect, the invention resides in an isolated protein comprising one or a plurality of immunogenic fragments according to the first aspect.

In a third aspect, the invention relates to an isolated nucleic acid which comprises a nucleotide sequence that encodes the immunogenic fragment of the first aspect or the isolated protein of the second aspect, or which comprises a nucleotide sequence complementary thereto.

In a fourth aspect, the invention provides a genetic construct comprising the isolated nucleic acid of the third aspect.

In a fifth aspect, the invention resides in a host cell comprising the genetic construct of the fourth aspect.

In a sixth aspect, the invention relates to a method of producing the isolated immunogenic fragment of the first aspect or the isolated protein of the second aspect, comprising; (i) culturing the host cell of the fifth aspect; and (ii) isolating said immunogenic fragment or protein from said host cell cultured in step (i).

In a seventh aspect, the invention provides an antibody or antibody fragment that binds or is raised against the immunogenic fragment of the first aspect or the isolated protein of the second aspect.

In an eighth aspect, the invention resides in a composition comprising one or more immunogenic fragments of the first aspect, the isolated protein of the second aspect, the isolated nucleic acid of the third aspect, the genetic construct of the fourth aspect, the host cell of the fifth aspect and/or the antibody or antibody fragment of the seventh aspect, optionally together with a pharmaceutically-acceptable diluent, carrier or excipient.

Suitably, the present composition is an immunogenic composition, such as a vaccine.

In a ninth aspect, the invention provides a method of eliciting an immune response to *Neisseria gonorrhoeae* and/or *Neisseria meningitidis* bacteria in a subject, said method including the step of administering: one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; to the subject to thereby elicit the immune response.

In a tenth aspect, the invention relates to a method of inducing immunity against *Neisseria gonorrhoeae* and/or *Neisseria meningitidis* bacteria in a subject, said method including the step of administering: one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; to the subject to thereby induce immunity against the *Neisseria gonorrhoeae* and/or *Neisseria meningitidis* bacteria in the subject.

In an eleventh aspect, the invention resides in a method of treating or preventing a *Neisseria gonorrhoeae* and/or *Neisseria meningitidis* bacterial infection in a subject, said method including the step of administering: one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; to the subject to thereby prevent or treat the *Neisseria gonorrhoeae* and/or *Neisseria meningitidis* bacterial infection in the subject.

In a twelfth aspect, the invention provides a method of at least partly inhibiting or preventing *Neisseria gonorrhoeae* and/or *Neisseria meningitidis* bacteria binding to a cell in a subject, said method including the step of administering: one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; to the subject to thereby inhibit or prevent *Neisseria gonorrhoeae* bacteria binding to the subject's cell.

In a thirteenth aspect, the invention resides in a method of at least partly inhibiting or reducing serum resistance of a *Neisseria gonorrhoeae* and/or *Neisseria meningitidis* bacterial infection in a subject, said method including the step of administering: one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; to the subject to thereby inhibit or reduce serum resistance of the *Neisseria gonorrhoeae* and/or *Neisseria meningitidis* bacterial infection in the subject.

In a fourteenth aspect, the invention provides a method of detecting *Neisseria gonorrhoeae* and/or *Neisseria meningitidis* in a biological sample obtained from a subject, said method including the step of contacting the biological sample with the antibody or antibody fragment of the eighth aspect to thereby detect *N. gonorrhoeae* and/or *N. meningitidis* in the biological sample.

In a fifteenth aspect, the invention relates to the use of one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect; in the manufacture of a medicament for: eliciting an immune response to *Neisseria gonorrhoeae* and/or *Neisseria meningitidis* bacteria in a subject; inducing immunity against *Neisseria gonorrhoeae* and/or *Neisseria meningitidis* bacteria in a subject; treating or preventing a *Neisseria gonorrhoeae* and/or *Neisseria meningitidis* bacterial infection in a subject; at least partly inhibiting or preventing *Neisseria gonorrhoeae* and/or *Neisseria meningitidis* bacteria binding to a cell in a subject; and/or for at least partly inhibiting or reducing serum resistance of a *Neisseria gonorrhoeae* and/or *Neisseria meningitidis* bacterial infection in a subject.

In a sixteenth aspect, the invention resides in one or more immunogenic fragments of the first aspect; the isolated protein of the second aspect; the isolated nucleic acid of the third aspect; the genetic construct of the fourth aspect; the host cell of the fifth aspect; the antibody or antibody fragment of the seventh aspect; and/or the composition of the eighth aspect for use or when used for: eliciting an immune response to *Neisseria gonorrhoeae* and/or *Neisseria meningitidis* bacteria in a subject; inducing immunity against *Neisseria gonorrhoeae* and/or *Neisseria meningitidis* bacteria in a subject; treating or preventing a *Neisseria gonorrhoeae* and/or *Neisseria meningitidis* bacterial infection in a subject; at least partly inhibiting or preventing *Neisseria gonorrhoeae* and/or *Neisseria meningitidis* bacteria binding to a cell in a subject; and/or, for at least partly inhibiting or reducing serum resistance of a *Neisseria gonorrhoeae* and/or *Neisseria meningitidis* bacterial infection in a subject.

Preferably, the subject of the aforementioned aspects is a human.

As used herein, the indefinite articles 'a' and 'an' are used here to refer to or encompass singular or plural elements or features and should not be taken as meaning or defining "one" or a "single" element or feature.

Unless the context requires otherwise, the terms "comprise", "comprises" and "comprising", or similar terms are intended to mean a non-exclusive inclusion, such that a recited list of elements or features does not include those stated or listed elements solely, but may include other elements or features that are not listed or stated.

By "consisting essentially of" in the context of an amino acid sequence, such as an immunogenic fragment, is meant the recited amino acid sequence together with an additional one, two or three amino acids at the N- or C-terminus.

The $K_D$ of NHBA$_{Nm}$ interactions [14] are also shown to enable comparison. NHBA$_{Nm}$ has higher affinity for β-Glc6P ($K_D$ 0.056+/−0.025 μM). NB—no concentration dependent binding.

Figure 11:
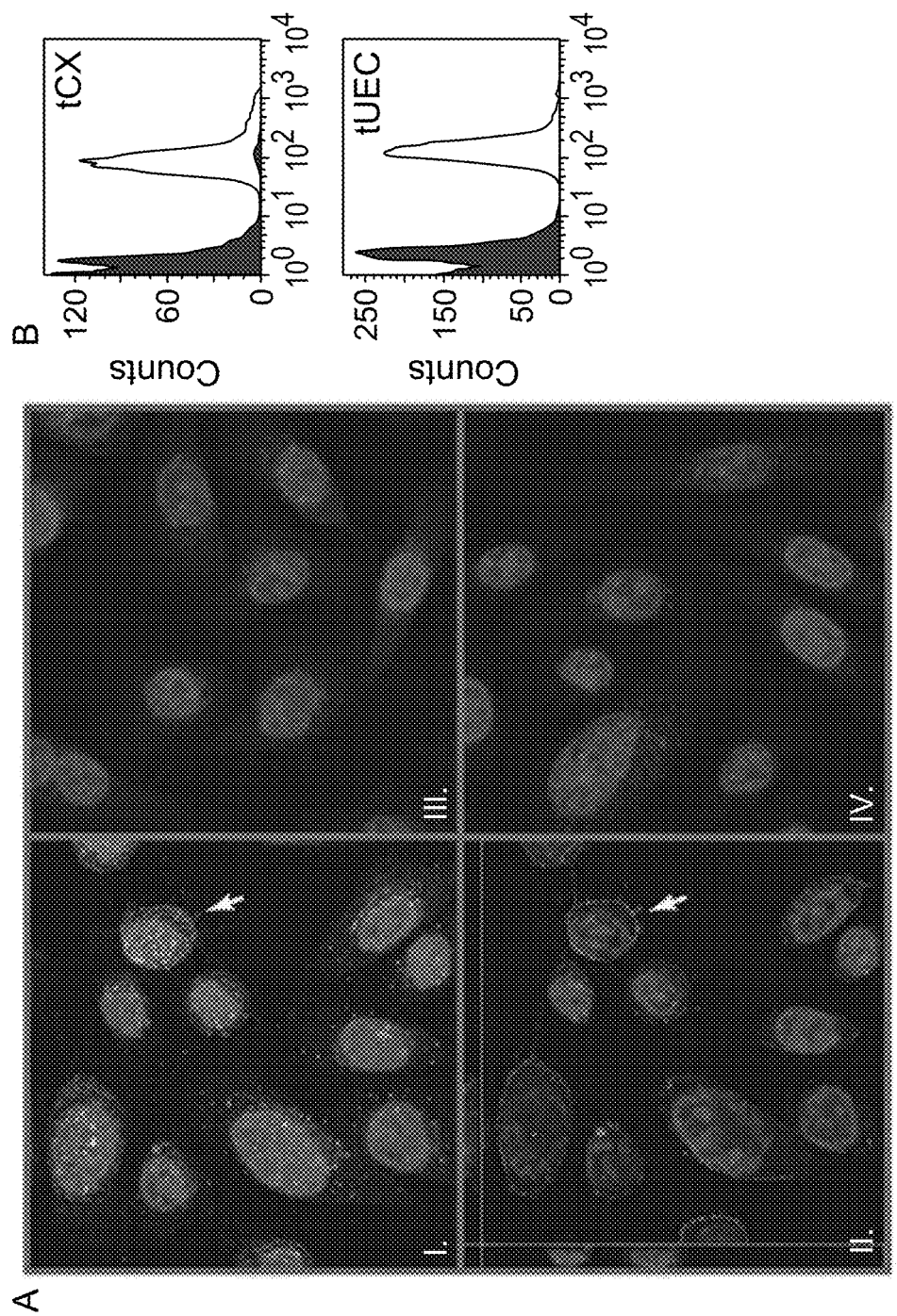

FIG. 11. Gonococcal recombinant NHBA binds to epithelial cells. (A) Confocal fluorescent images acquired under 40× magnification of NHBA$_{Ng}$ binding to cervical epithelial cells (tCX). (I) Extended focus and (II) xyz cross-section of cells. Control images of (III) antibody only treated cells (no recombinant NHBA) and (IV) cells treated with NHBA$_{Ng}$ and secondary antibody. White arrows indicate protein localising on the cell surface. (B) Flow cytometric analysis of binding of recombinant NHBA$_{Ng}$ to human cervical (tCX) and urethral (tUEC) epithelial cells.

Figure 12:
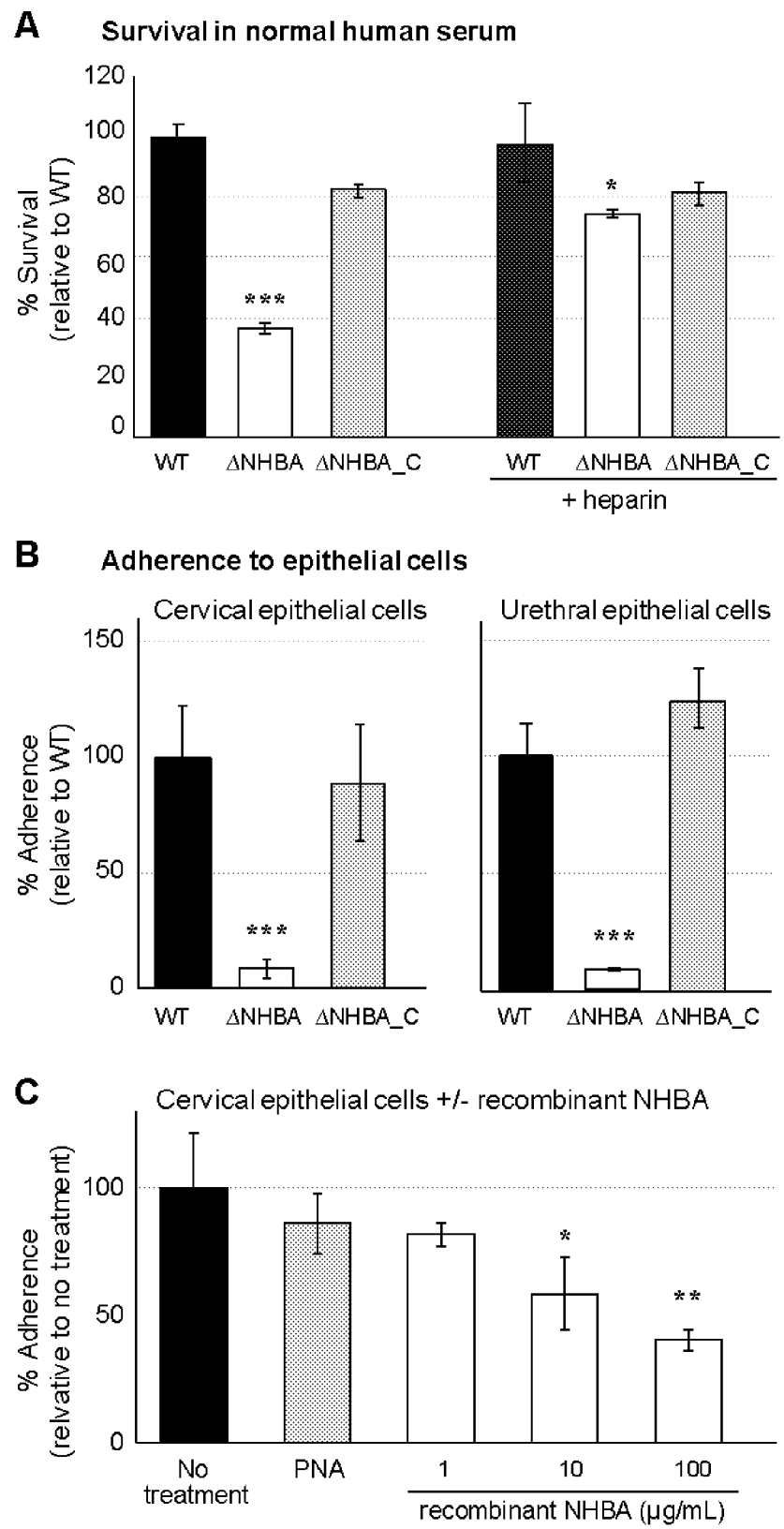

FIG. 12. Gonococcal NHBA contributes to survival in human serum and adherence to human epithelial cells. (A) Survival of *N. gonorrhoeae* 1291 wild-type (WT), NHBA knockout (ΔNHBA), and complemented (ΔNHBA_C) strains after 60 minutes in 10% (v/v) normal human serum. Data represent the average percent survival for triplicate samples as a percentage of the inoculum and are shown relative to the WT (the results for the wild type, set at 100% are 5.5×10$^4$ colony forming units (CFU)). There was no significant difference between survival of the WT in serum in the absence or presence of heparin. (B) Adherence of *N. gonorrhoeae* to human cervical (tCX) and human urethral (tUEC) epithelial cells with *N. gonorrhoeae* 1291 wild-type (WT), NHBA$_{Ng}$ knockout (ΔNHBA), and complemented (ΔNHBA_C) strains. (C) Adherence of *N. gonorrhoeae* 1291 wild-type (WT) with tCX cells that were either untreated (no treatment) or pretreated with recombinant NHBA$_{Ng}$ (1-100 μg/ml) or PNA as a negative control (100 μg/ml). Data represent the average percent adherence or invasion for triplicate samples as a percentage of that for the inoculum and are shown relative to the WT (the results for the WT, set at 100%, are (B) 1.1×10$^5$ (tCX) and 1.7×10$^5$ (tUEC), (C) 6.5×10$^4$ adherent CFU). Error bars represent +/−1 standard deviation. *P<0.05, P<0.01, *P<0.001 relative to the untreated WT, using a two-tailed Student's t-test. Experiments were performed on at least three occasions, and representative results are shown.

Figure 13:
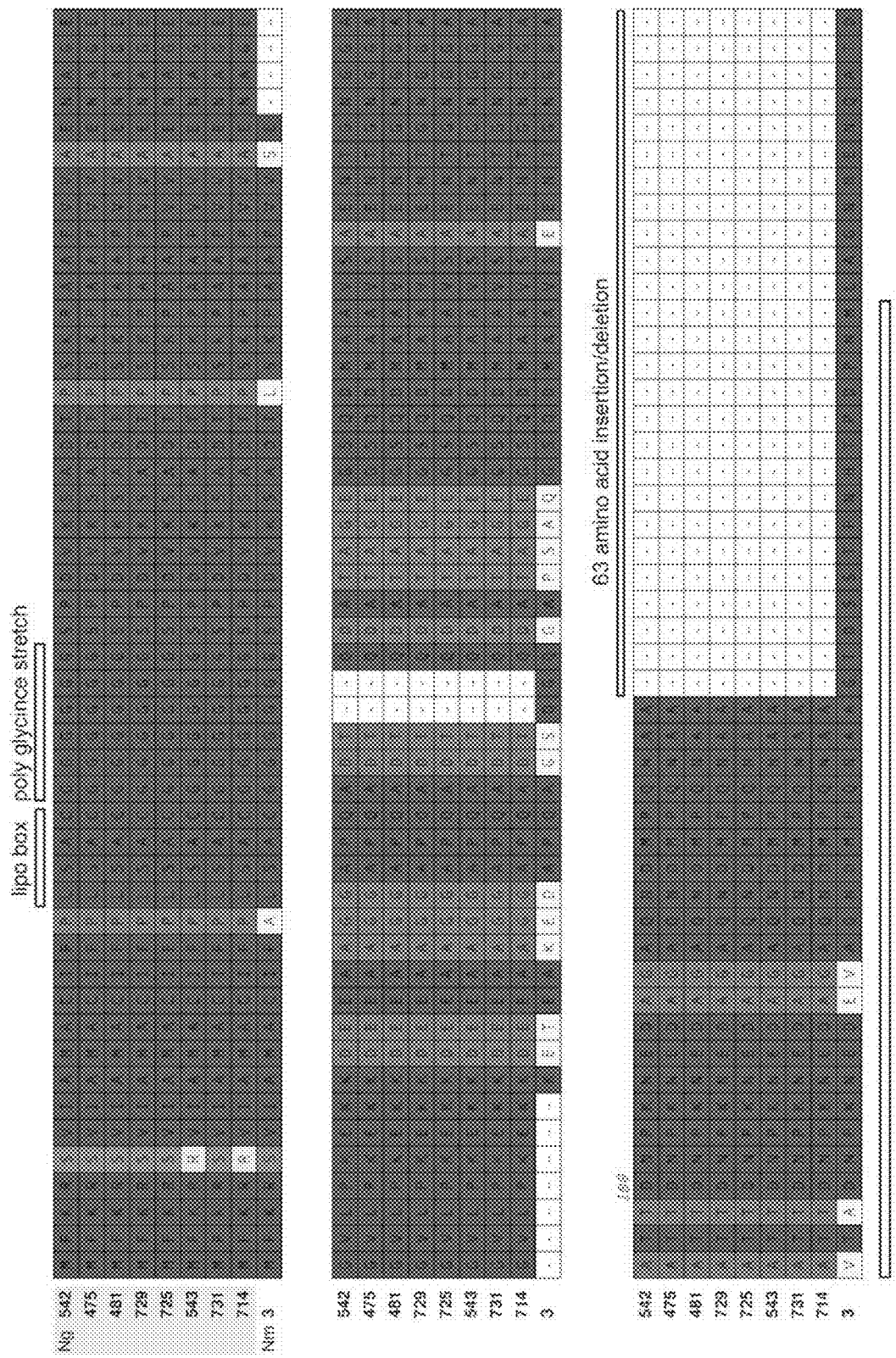
Figure 13:
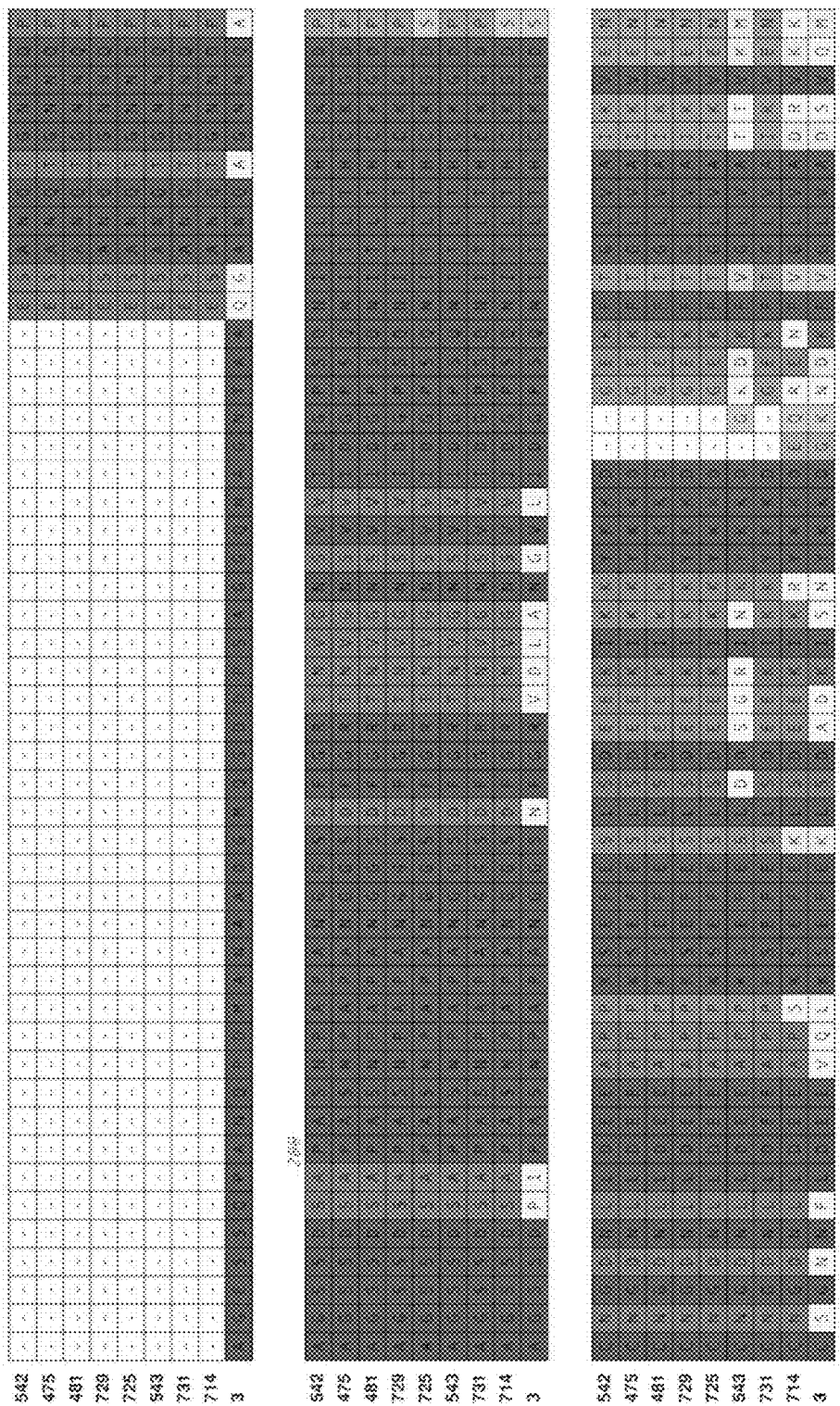
Figure 13:
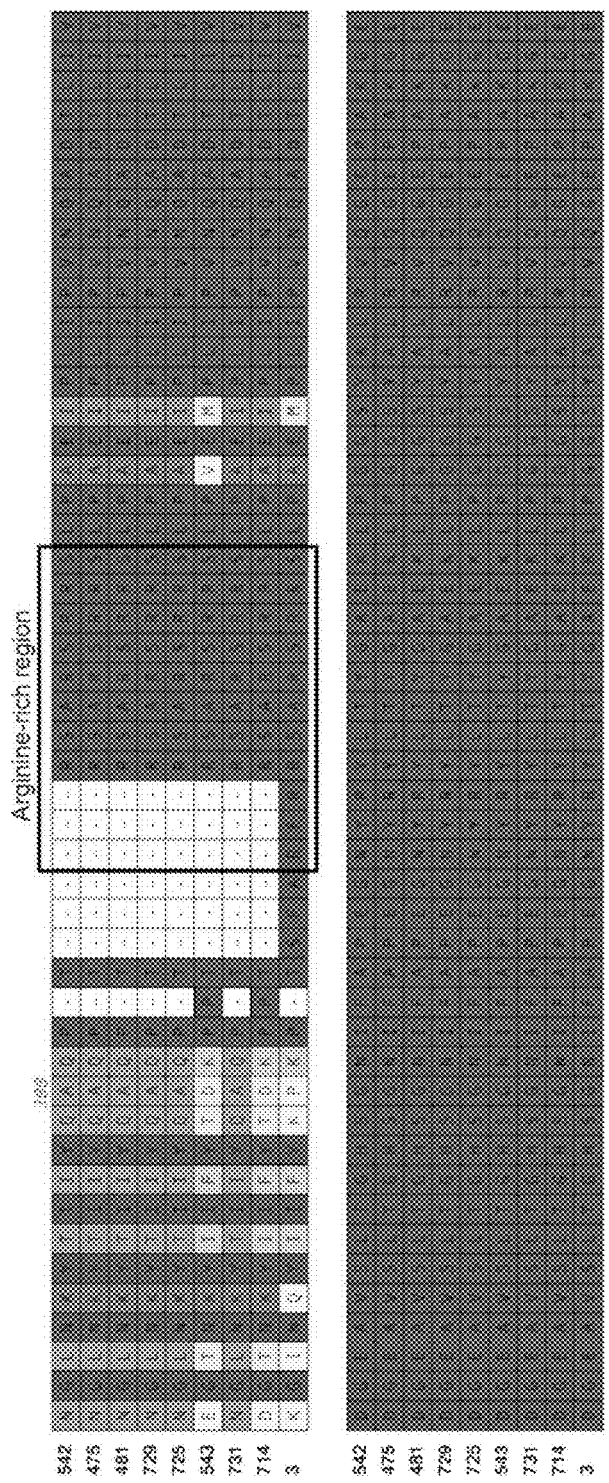
Figure 13:
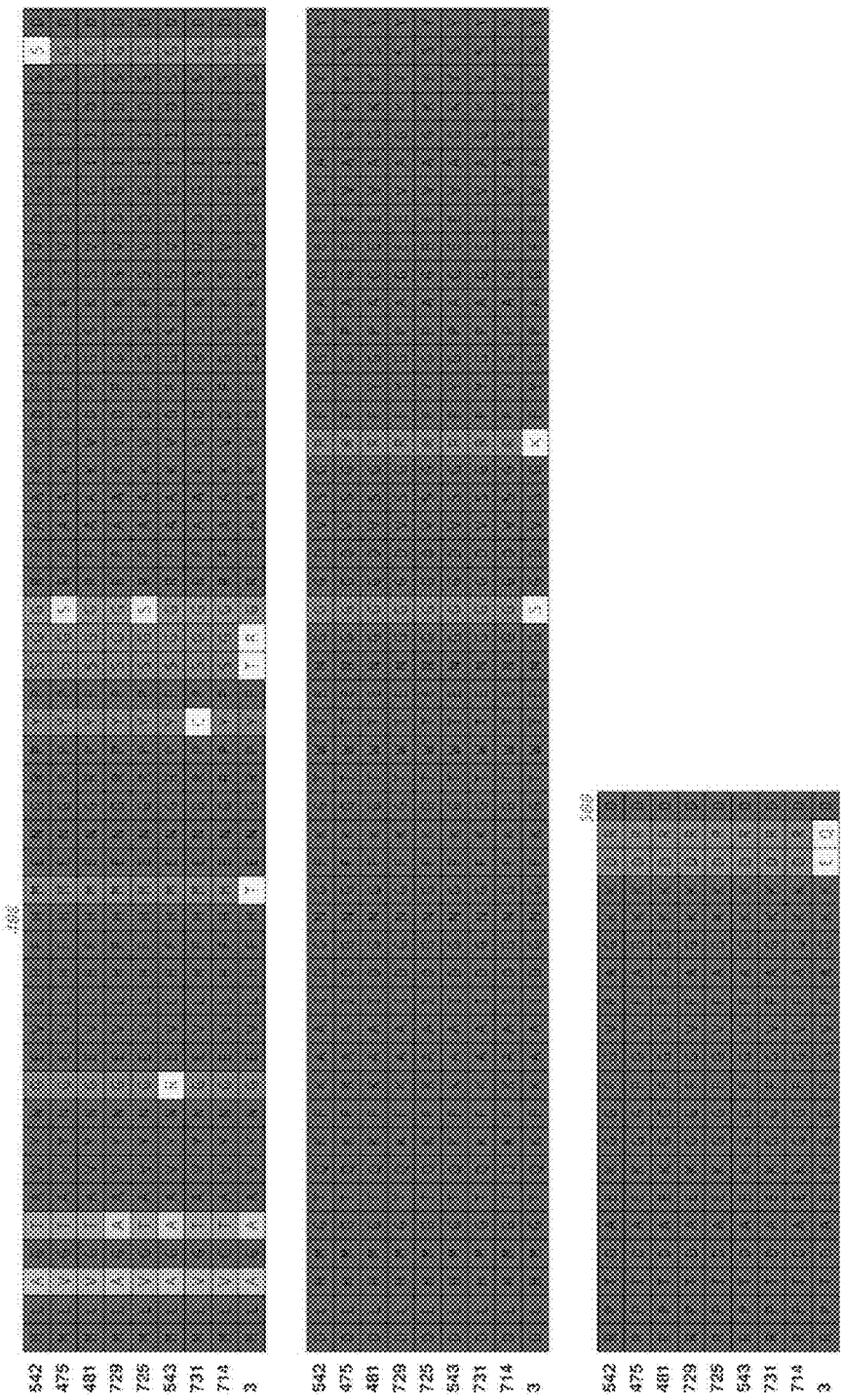

FIG. 13. Conservation of gonococcal NHBA. An alignment of the eight most common NHBA variants of *N. gonorrhoeae* (Ng) is shown, with the consensus sequence at the top. The *N. meningitidis* (Nm) NHBA sequence from strain MC58 is also included (NHBA-3).

Figure 14:
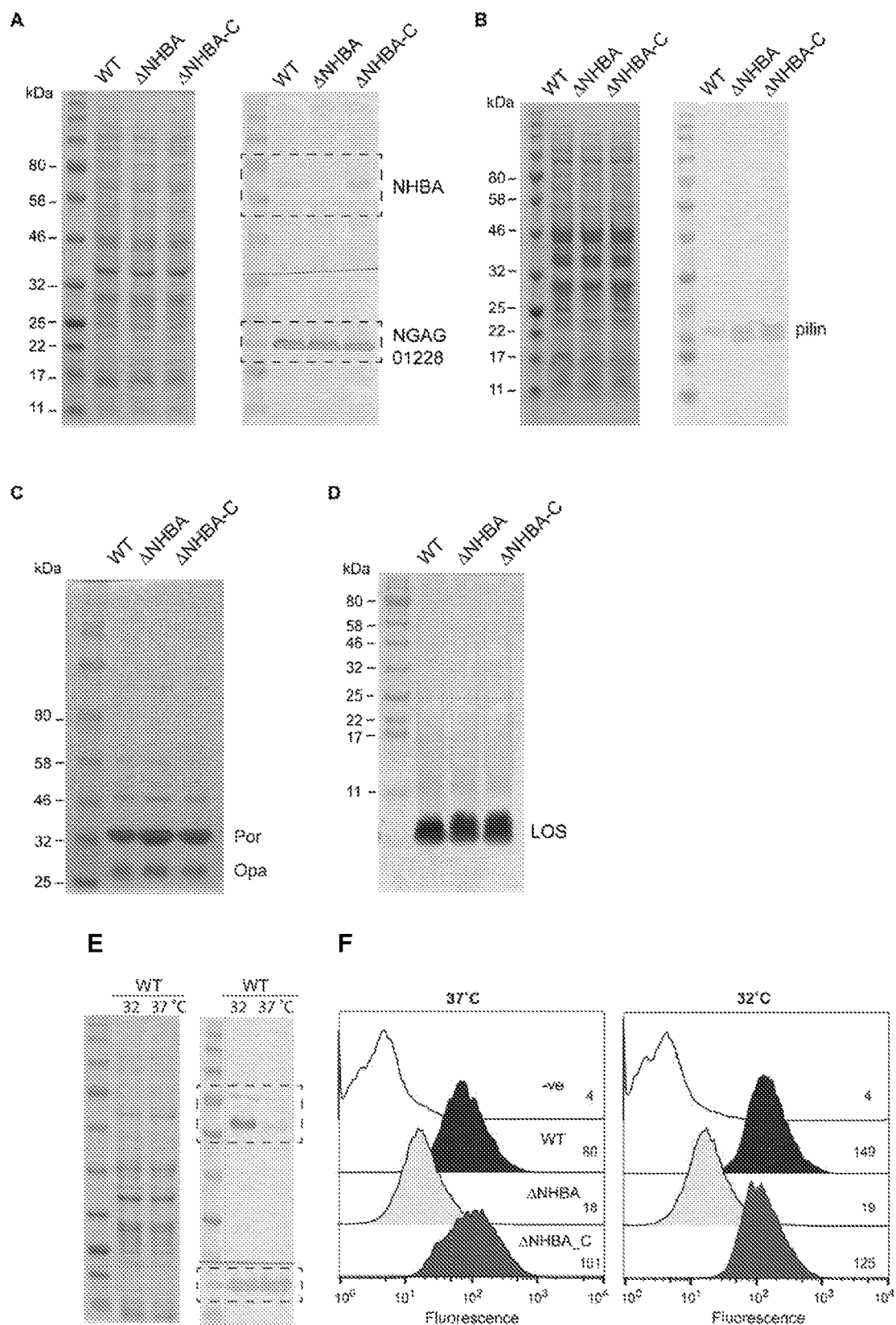

FIG. 14. Expression of NHBA in *N. gonorrhoeae*.
(A) Coomassie stained SDS-PAGE and Western blot analysis of whole cell lysates of *N. gonorrhoeae* 1291 wild type (WT), nhba::kan mutant (ΔNHBA), and complemented (ΔNHBA_C) strains, probed with α-NHBA and α-NGAG01228 antibodies. The regions of the Western blots shown in FIG. 1C is boxed. (B) Coomassie stained SDS-PAGE and Western blot analysis of pilin preparations of *N. gonorrhoeae* 1291 WT, NHBA and NHBA_C strains, probed with α-C311 pilin antibody. (C) Coomassie stained SDS-PAGE of sarkosyl outer membrane protein (OMP) preparations of *N. gonorrhoeae* 1291 WT, NHBA and NHBA_C strains, showing major OMPs, including opacity (Opa) and porin (Por) proteins. (D) Silver stained SDS-PAGE gel of lipooligosaccharide (LOS) preparations of *N. gonorrhoeae* 1291 WT, ΔNHBA and ΔNHBA_C strains. (E) Coomassie stained SDS-PAGE and Western blot analysis of whole cell lysates of *N. gonorrhoeae* 1291 wild type (WT) grown at 32° C. and 37° C., probed with α-NHBA. The regions of the Western blots shown in FIG. 1C is boxed.
(F) Flow cytometry of whole cells of *N. gonorrhoeae* WT, ΔNHBA and ΔNHBA_C strains grown at 32° C. and 37° C. with α-NHBA. The negative (−ve) control is WT with secondary antibody only. Values represent geometric mean fluorescence.

FIG. 15. Gonococcal NHBA is involved in cell aggregation. (A) Gram stain of *N. gonorrhoeae* 1291 wild type (WT), nhba::kan mutant (ΔNHBA), and complemented (ΔNHBA_C) strains without trypsin ('−'; top panel) or with trypsin treatment ('+'; bottom panel). (B) Western blot analysis of trypsin untreated (−) and tyrpsin treated (+) whole cell *N. gonorrhoeae* 1291 WT probed with α-NHBA and antibodies to the periplasmic protein NGAG_01228.

FIG. 16. Glycan binding by *Neisseria gonorrhoeae*. The heat map shows binding (black bars) by whole-cell *N. gonorrhoeae* strain 1291 to glycans on the array (average of results from three independent experiments). Glycans are clustered into classes based on their respective terminal sugars. The number and percentage of glycans bound within each class are indicated. The full data set of glycan binding is shown in Table 4.

FIG. 17. Amino acid sequence of the full length (upper panel) (SEQ ID NO: 1) and C-terminal fragments (lower panel) (SEQ ID NO: 2) of the NHBA protein of *N. gonorrhoeae* 1291.

Figure 18:
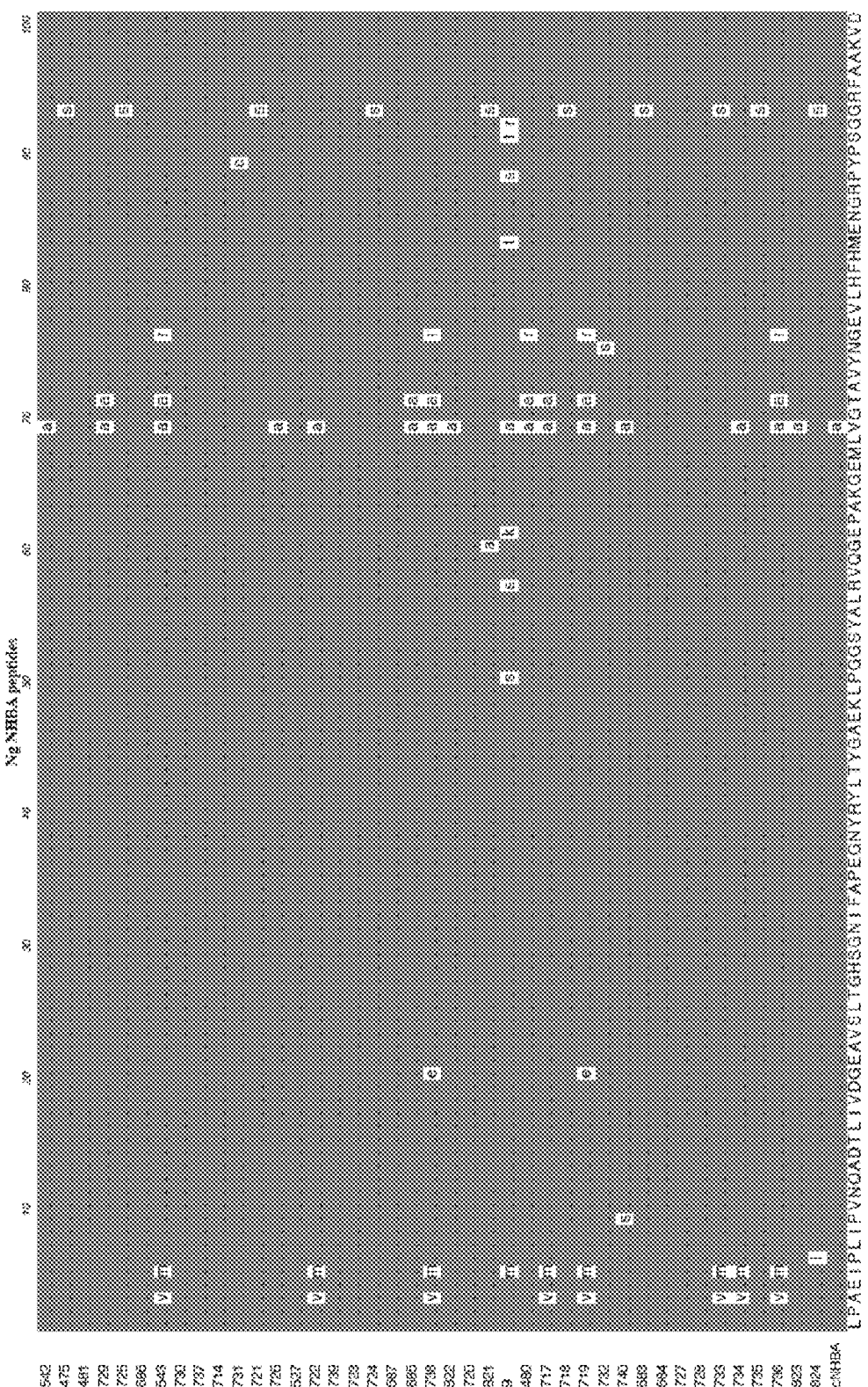
Figure 18:
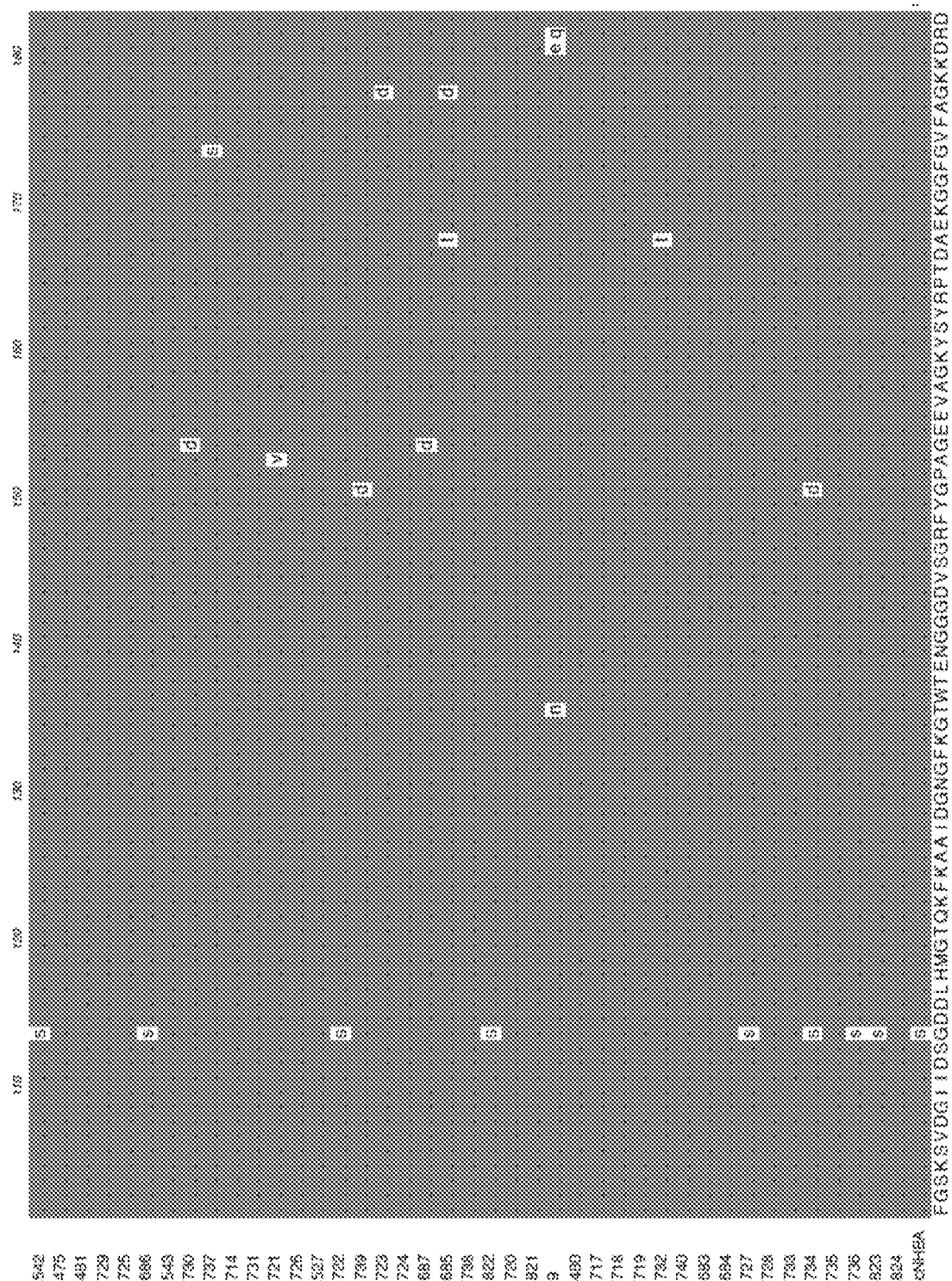

FIG. 18. Amino acid sequence variation for the consensus sequence of the C-terminal immunogenic fragment of SEQ ID NO:2 for the 41 *N. gonorrhoeae* NHBA variants.

Figure 19:
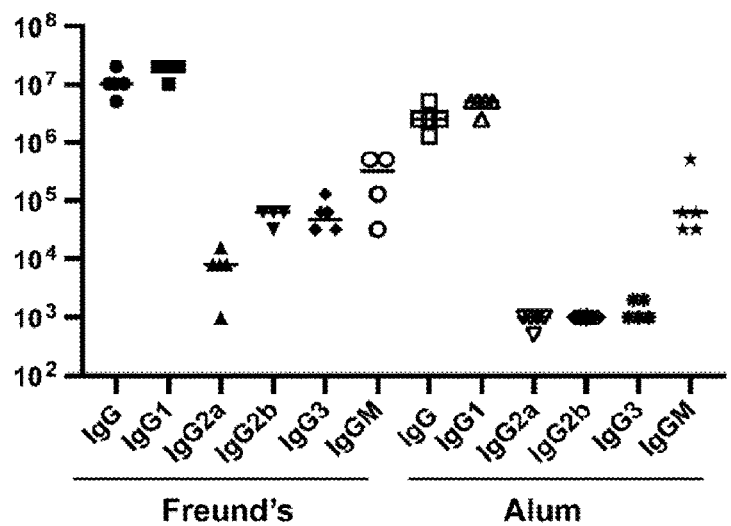

FIG. 19. Immunogenicity of NHBA. ELISA titers of the post-immune sera from each mouse immunized with either NHBA-c-Freund's or NHBA-c-Alum against purified recombinant NHBA. The titer for each of five mice are shown with symbols, and the geometric mean titer (GMT) is indicated with a bar.

Figure 20:
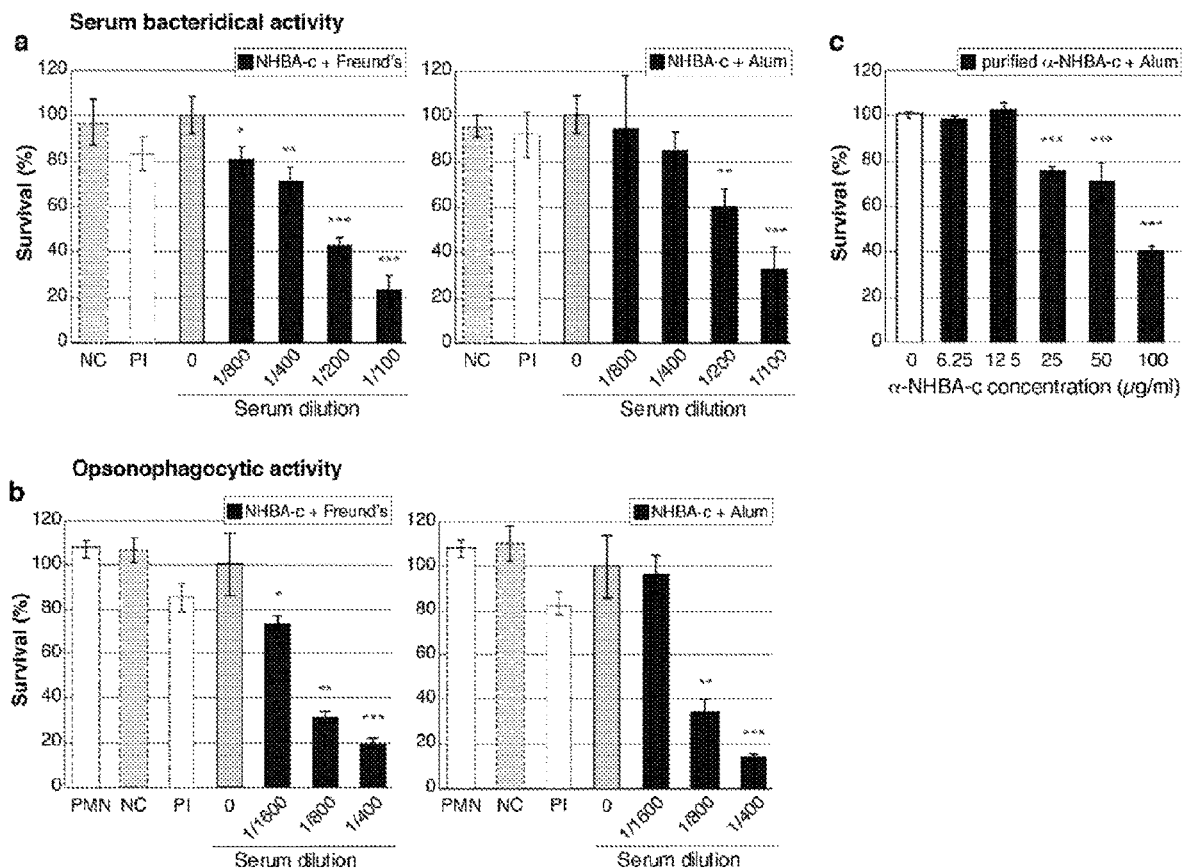

FIG. 20. Serum bactericidal activity (a, c) and opsonophagocytic activity of (b) anti-NHBA antibodies. (a, c) Serum bactericidal activity (SBA) of anti-NHBA serum. The survival of *N. gonorrhoeae* strain 1291 in the presence of normal human serum as a source of complement and 2-fold dilutions of heat-inactivated mouse sera is shown. Sera are either: (a) anti-NHBA-c serum plus adjuvant (Freund's or alum) compared to no serum (0) and pre-immune (PI) control sera. A "no complement" control (NC) is also shown (bacteria incubated with 1/100 dilution of mouse sera only); or (c) purified anti-NHBA antibodies from NHBA-c-alum serum. (b) Opsonophagocytic activity (OPA) of anti-NHBA serum. The survival of *N. gonorrhoeae* strain 1291 in the presence of human polymorphonuclear leukocytes (PMNs), normal human serum and mouse sera are shown, as in (a) above. The "no complement" control (NC) is shown (bacteria incubated with 1/400 dilution of mouse sera only), as well as a "PMN only" control (PMN) (bacteria incubated with PMNs but no mouse sera and no complement). For a-c, data represent the average survival for triplicate samples relative to the result obtained with the untreated wild-type strain (0) (the untreated wild type, set at 100%, represent 2.5×10$^3$, 1.6×10$^3$ and 3.5×10$^3$ colony forming units for a-c, respectively). Error bars represent ±1 standard deviation. A two-tailed Student's t-test was used to compare survival relative to the no serum (0) untreated wild type; *, p<0.05, p≤0.01, *, p≤0.001. Statistical analysis was also performed for (c) using one-way analysis of variance (ANOVA; p<0.0001) and Dunnett's multiple comparison test (p>0.9 for untreated wild-type control group (0) vs. 6.25 or 12.5; p≤0.0001 for 0 vs. 25, 50 or 100 µg/mL)

Figure 21:
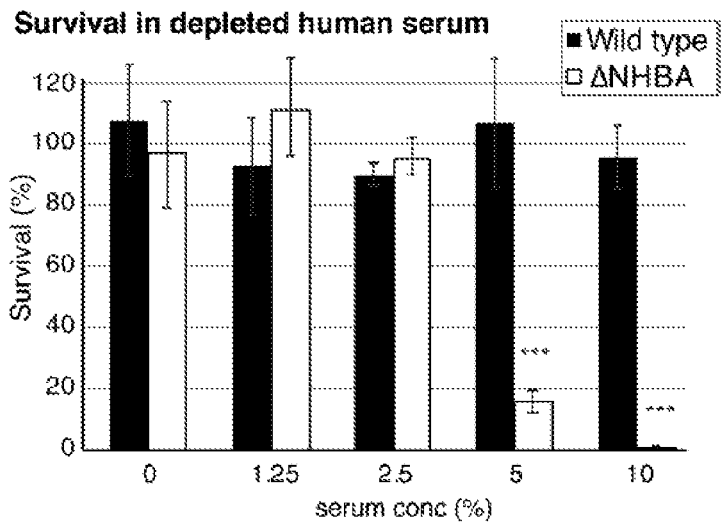

FIG. 21. Survival of *Neisseria gonorrhoeae* in human serum. The survival of *Neisseria gonorrhoeae* 1291 wild type (WT) and NHBA knockout (ΔNHBA) strains after 30 minutes in 0-10% (vol/vol) human serum is shown. The human serum tested is normal human serum pre-absorbed with *N. gonorrhoeae* to remove any antibodies that cross react with *N. gonorrhoeae*. This depleted serum is used as a complement source in serum bactericidal activity (SBA) and opsonophagocytic killing (OPA) assays. Data represent the average survival for triplicate samples relative to the result obtained with the untreated strain (0) (the untreated WT, set at 100%, represents $2.8 \times 10^3$ colony forming units (CFU); untreated ΔNHBA, set at 100%, represents $2.5 \times 10^3$ CFU). Experiments were performed three times, and representative results are shown. A two-tailed Student's t-test was used to compare survival relative to the untreated control; ***, p≤0.001. There was no significant difference in survival of the WT in the % serum tested, relative to the untreated (0) control.

Figure 22:
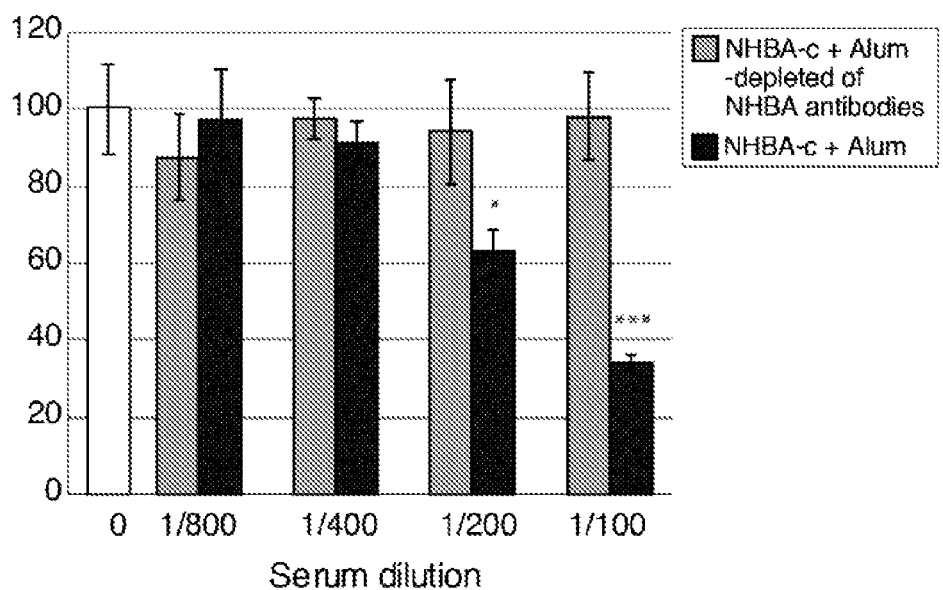

FIG. 22. Serum bactericidal activity (SBA) of anti-NHBA serum. The survival of *N. gonorrhoeae* strain 1291 in the presence of normal human serum as a source of complement and 2-fold dilutions of heat-inactivated mouse sera is shown. Sera is either anti-NHBA-c serum plus Alum or anti-NHBA-c serum plus Alum that has been depleted of anti-NHBA antibodies. Data represent the average survival for triplicate samples relative to the result obtained with the untreated wild-type strain (0) (the untreated wild type, set at 100%, represent $3.3 \times 10^3$ colony forming units). Error bars represent ±1 standard deviation. A two-tailed Student's t-test was used to compare survival relative to the untreated wild type shown in white (0); *, P<0.05, ***, P≤0.001.

BRIEF DESCRIPTION OF THE SEQUENCES

| SEQ ID NO. | Identifier | Description |
| --- | --- | --- |
| 1 | NHBA | Amino acid sequence of the full length Neisserial Heparin Binding Antigen (NHBA) protein from *Neisseria gonorrhoeae* (strain 1291) see FIG. 17 (upper panel; total = 426 amino acids) |
| 2 | NHBA-c | Amino acid sequence of the C-terminal fragment of the NHBA protein from *Neisseria gonorrhoeae* (strain 1291) see FIG. 17 (lower panel; total = 183 amino acids) |
| 3 | nhba1 | Primer |
| 4 | nhba2 | Primer |
| 5 | nhba3 | Primer |
| 6 | nhba4 | Primer |
| 7 | nhba5 | Primer |
| 8 | nhba6 | Primer |
| 9 | NHBA-c primer 1 | Primer |
| 10 | NHBA-c primer 2 | Primer |

DETAILED DESCRIPTION

The present invention is at least partly predicated on the discovery that a C-terminal fragment of NHBA from *Neisseria gonorrhoeae* demonstrates substantially improved immunogenicity against gonococcal bacteria. Immunization with the NHBA protein fragment can elicit antibodies that are bactericidal, opsonophagocytic and can inhibit adherence of gonococcal bacteria to mucosal epithelial cells.

A broad aspect of the invention relates to an immunogenic fragment of an isolated Neisserial Heparin Binding Antigen (NHBA) protein of *Neisseria gonorrhoeae*, such as that which comprises an amino acid sequence set forth in SEQ ID NO: 1 or a fragment, variant or derivative thereof.

*Neisseria gonorrhoeae* (also known as Gonococci or Gonococcus) is one type of proteobacteria that causes the sexually transmitted genitourinary infection gonorrhoea, as well as other gonococcal-associated diseases, disorders and conditions including oropharyngeal gonorrhoea, rectal gonorrhoea, disseminated gonococcaemia, gonococcal septic arthritis, and gonococcal ophthalmia neonatorum. As generally used herein, "*Neisseria gonorrhoeae*" includes all strains and serotypes of *N. gonorrhoeae* identifiable by a person skilled in the art and inclusive of those described herein. *Neisseria gonorrhoeae* also includes genetic variants of different strains. One may determine whether the target organism is *N. gonorrhoeae* by a number of methods known in the art, including sequencing of the 16S ribosomal RNA (rRNA) gene, as described in Chakravorty et al. (2007) for *N. gonorrhoeae*, which is incorporated by reference herein.

The *Neisseria meningitidis* Neisseria Heparin Binding Antigen (NHBA, previously called GNA2132) is a component of 4CMenB, present as a NHBA-GNA1030 fusion protein (14). The meningococcal NHBA ($NHBA_{Nm}$) is a surface-exposed lipoprotein, that consists of three regions—an N-terminal region (up to residues 200-250) that is predicted to be intrinsically disordered and unfolded (15), a central arginine-rich region that binds glycans including heparin, heparin sulfate and chondroitin sulfate (16-18), and a C-terminal region that folds as an anti-parallel β-barrel (15,19,20). $NHBA_{Nm}$ is relatively well conserved, although the N-terminal region contains several insertions/deletions between different meningococcal strains (15). $NHBA_{Nm}$ induces serum bactericidal antibodies against diverse *N. meningitidis* strains (17,21,22), and these antibodies are also opsonophagocytic (23,24) and are able to block adherence of *N. meningitidis* to epithelial cells (18). The gonococcal homologue of NHBA ($NHBA_{Ng}$) is highly conserved between *N. gonorrhoeae* strains (>93% identity), and shares 67% identity to the NHBA-2 peptide variant that is in 4CMenB (13,25). The present inventors recently showed that $NHBA_{Ng}$ is surface exposed and is recognized by antibodies from 4CMenB vaccinated people (13). An example of a NHBA protein of *N. gonorrhoeae* is set forth in SEQ ID NO: 1.

For the purposes of this invention, by "isolated" is meant material that has been removed from its natural state or otherwise been subjected to human manipulation. Isolated material may be substantially or essentially free from components that normally accompany it in its natural state, or may be manipulated so as to be in an artificial state together with components that normally accompany it in its natural state. Isolated material may be in native, chemical synthetic or recombinant form.

By "protein" is meant an amino acid polymer. The amino acids may be natural or non-natural amino acids, D- or L-amino acids as are well understood in the art.

The term "protein" includes and encompasses "peptide", which is typically used to describe a protein having no more than fifty (50) amino acids and "polypeptide", which is typically used to describe a protein having more than fifty (50) amino acids.

A "fragment" is a segment, domain, portion or region of a protein, which constitutes less than 100% of the amino acid sequence of the protein.

In general, fragments may comprise up to 10, 20, 30, 40, 50, 60, 70, 80, 90, 100, 110, 120, 130, 140, 150, 200, 250, 300, 400 or 425 amino acids of an amino acid sequence, such as the full length NHBA protein set forth in SEQ ID NO:1.

In particular embodiments, an immunogenic fragment of an isolated NHBA protein comprises or consists of between 10 and 250 amino acids, more preferably between 15 and 190 amino acids and even more preferably up to 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180 or 185 amino acids of the isolated NHBA protein, such as set forth in SEQ ID NO:1 or SEQ ID NO:2.

In certain embodiments, the immunogenic fragment comprises a C-terminal fragment of an isolated NHBA protein. As used herein, the term "C-terminal fragment" as applied to a NHBA protein, may ordinarily comprise at least about 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205 or 210 contiguous or consecutive amino acids located in or contained within the C-terminal domain of the NHBA protein In one specific embodiment, the immunogenic fragment comprises, consists, consists essentially of or is contained within an amino acid sequence set forth in SEQ ID NO: 2, which essentially comprises the extracellular or extracellularly exposed domain of NHBA.

In another embodiment, the immunogenic fragment comprises one or more glycan or heparin binding residues and/or one or more active site residues of the isolated NHBA protein.

Thus, the immunogenic fragment may comprise some or all of the extracellular or extracellularly exposed domain of an NHBA protein corresponding to SEQ ID NO:2 and constituting a fragment of SEQ ID NO:1, or the immunogenic fragment may comprise a fragment of this extracellular or extracellularly exposed domain sequence that comprises at least one of the glycan binding residues and/or active site residues thereof.

In the context of the present invention, the term "immunogenic" as used herein indicates the ability or potential of a protein to generate or elicit an immune response, such as to N. gonorrhoeae or molecular components thereof, upon administration of the protein to an animal. It is envisaged that the immune response may be either B-lymphocyte or T-lymphocyte mediated, or a combination thereof. Advantageously, by "immunogenic" is meant capable of eliciting a B-lymphocyte response, although is not limited thereto. "Immunogenic" can also mean capable of eliciting a neutralising antibody response.

By "elicit an immune response" is meant generate or stimulate the production or activity of one or more elements of the immune system inclusive of the cellular immune system, antibodies and/or the native immune system. Suitably, the one or more elements of the immune system include B lymphocytes, antibodies and neutrophils. In one embodiment, the immune response is a mucosal immune response.

As used herein, a protein "variant" shares a definable nucleotide or amino acid sequence relationship with a reference amino acid sequence. The reference amino acid sequence may be the amino acid sequence of SEQ ID NO:1 or SEQ ID NO:2, for example. The "variant" protein may have one or a plurality of amino acids of the reference amino acid sequence deleted or substituted by different amino acids. It is well understood in the art that some amino acids may be substituted or deleted without changing the activity of the immunogenic fragment and/or protein (conservative substitutions). Accordingly, one or more of the other residues of SEQ ID NO:1 or SEQ ID NO: 2 may be conservatively modified (e.g by amino acid substitution or deletion) so that the variant substantially retains the immunogenicity of SEQ ID NO:1 or SEQ ID NO:2. Preferably, protein variants share at least 70% or 75%, preferably at least 80% or 85% or more preferably at least 90%, 91%, 92%, 93%, 94%, 95%, 96%, 97%, 98% or 99% sequence identity with a reference amino acid sequence, such as SEQ ID NO:1 or SEQ ID NO: 2.

It is also envisaged that modification of a "wild-type" or "unmodified" NHBA protein fragment sequence, such as that of SEQ ID NO:1 or SEQ ID NO: 2, may substantially improve or enhance the immunogenicity of the immunogenic fragment. By way of example, the immunogenic fragment may be modified to substantially match or correspond to the NHBA protein sequence of a particular N. gonorrhoeae strain and thereby improve the immunogenicity of the immunogenic fragment to said strain, such as those described herein. Accordingly, the term "variant" also includes isolated proteins or fragments thereof disclosed herein, produced from, or comprising amino acid sequences of, naturally occurring (e.g., allelic) variants, orthologs (e.g., from a species other than N. gonorrhoeae, such as N. meningitidis) and synthetic variants, such as produced in vitro using mutagenesis techniques. Typically, modification includes substitution of one or more amino acids of a NHBA protein fragment.

Variants may retain the biological activity of a corresponding wild type protein (e.g. allelic or strain variants, paralogs and orthologs, such as those described in FIG. 18) or may lack, or have a substantially reduced, biological activity compared to a corresponding wild type protein.

Suitably, the immunogenic fragment comprises one or more amino acid substitutions of residues 4, 6, 7, 10, 21, 51, 58, 61, 62, 70, 72, 76, 77, 84, 89, 90, 92, 93, 94, 114, 136, 151, 153, 154, 168, 174, 178, 181 and 182 of SEQ ID NO:2 or as shown in FIG. 18. In particular embodiments, the one or more amino acid substitutions are selected from the group consisting of: a valine (V) amino acid at residue 4 (A4V); a methionine (M) amino acid at residue 6 (I6M); a leucine (L) amino acid at residue 7 (P7L); a serine (S) amino acid at residue 10 (P10S); a glutamate (E) amino acid at residue 21 (G21E); a serine (S) amino acid at residue 51 (P51S); a serine (S) amino acid at residue 58 (R58S); a alanine (A) amino acid at residue 61 (G61A); a lysine (K) amino acid at residue 62 (E62K); a valine (V) amino acid at residue 70 (A70V); an alanine (A) amino acid at residue 72 (T72A); a serine (S) amino acid at residue 76 (N76S); an arginine (R) amino acid at residue 77 (G77R); a threonine (T) amino acid at residue 84 (M84T); a serine (S) amino acid at residue 89 (P89S); a cysteine (C) amino acid at residue 90 (Y90C); a threonine (T) amino acid at residue 92 (S92T); an arginine (R) amino acid at residue 93 (G93R); a serine (S) amino acid at residue 94 (G94S); a glycine (G) amino acid at residue 114 (S114G); an asparagine (N) amino acid at residue 136 (T136N); an aspartate (D) amino acid at residue 151 (G151D); a valine (V) amino acid at residue 153 (A153V); an aspartate (D) amino acid at residue 154 (G154D); a threonine (T) amino acid at residue 168 (A168T); a serine (S) amino acid at residue 174 (G174S); an aspartate (D) amino acid at residue 178 (G178D); a glutamate (E) amino acid at residue 181 (D181E); a glutamine (Q) amino acid at residue 182 (R182Q); of SEQ ID NO:2 and any combination thereof.

In one particular embodiment, a variant protein or peptide may comprise one or a plurality of residues such as lysine residues at an N and/or C-terminus thereof. The plurality of lysine residues (e.g., polylysine) may be a linear sequence of lysine residues or may be branched chain sequences of lysine residues. These additional lysine residues may facilitate increased peptide solubility.

Terms used generally herein to describe sequence relationships between respective proteins and nucleic acids include "comparison window", "sequence identity", "percentage of sequence identity" and "substantial identity". Because respective nucleic acids/proteins may each comprise (1) only one or more portions of a complete nucleic acid/protein sequence that are shared by the nucleic acids/proteins, and (2) one or more portions which are divergent between the nucleic acids/proteins, sequence comparisons are typically performed by comparing sequences over a "comparison window" to identify and compare local regions of sequence similarity. A "comparison window" refers to a conceptual segment of typically 6, 9 or 12 contiguous residues that is compared to a reference sequence. The comparison window may comprise additions or deletions (i.e., gaps) of about 20% or less as compared to the reference sequence for optimal alignment of the respective sequences. Optimal alignment of sequences for aligning a comparison window may be conducted by computerised implementations of algorithms (Geneworks program by Intelligenetics; GAP, BESTFIT, FASTA, and TFASTA in the Wisconsin Genetics Software Package Release 7.0, Genetics Computer Group, 575 Science Drive Madison, WI, USA, incorporated herein by reference) or by inspection and the best alignment (i.e. resulting in the highest percentage homology over the comparison window) generated by any of the various methods selected. Reference also may be made to the BLAST family of programs as for example disclosed by Altschul et al., 1997, Nucl. Acids Res. 25 3389, which is incorporated herein by reference. A detailed discussion of sequence analysis can be found in Unit 19.3 of CURRENT PROTOCOLS IN MOLECULAR BIOLOGY Eds. Ausubel et al. (John Wiley & Sons Inc NY, 1995-1999).

The term "sequence identity" is used herein in its broadest sense to include the number of exact nucleotide or amino acid matches having regard to an appropriate alignment using a standard algorithm, having regard to the extent that sequences are identical over a window of comparison. Thus, a "percentage of sequence identity" is calculated by comparing two optimally aligned sequences over the window of comparison, determining the number of positions at which the identical nucleic acid base (e.g., A, T, C, G, U) occurs in both sequences to yield the number of matched positions, dividing the number of matched positions by the total number of positions in the window of comparison (i.e., the window size), and multiplying the result by 100 to yield the percentage of sequence identity. For example, "sequence identity" may be understood to mean the "match percentage" calculated by the DNASIS computer program (Version 2.5 for windows; available from Hitachi Software engineering Co., Ltd., South San Francisco, California, USA).

The invention also provides a derivative of an immunogenic fragment disclosed herein. Suitably, the immunogenic fragment comprises an amino acid sequence set forth in SEQ ID NO:2.

As used herein, "derivatives" are molecules such as proteins, fragments or variants thereof that have been altered, for example by conjugation or complexing with other chemical moieties, by post-translational modification (e.g. phosphorylation, acetylation and the like), modification of glycosylation (e.g. adding, removing or altering glycosylation), lipidation and/or inclusion of additional amino acid sequences as would be understood in the art. One particular derivative is by conjugation of the immunogenic fragment to diphtheria toxin (DT). This may be facilitated by addition of a C-terminal cysteine residue.

Additional amino acid sequences may include fusion partner amino acid sequences which create a fusion protein. By way of example, fusion partner amino acid sequences may assist in detection and/or purification of the isolated fusion protein. Non-limiting examples include metal-binding (e.g. polyhistidine) fusion partners, maltose binding protein (MBP), Protein A, glutathione S-transferase (GST), fluorescent protein sequences (e.g. GFP), epitope tags such as myc, FLAG and haemagglutinin tags.

Other additional amino acid sequences may be of carrier proteins such as diphtheria toxoid (DT) or a fragment thereof, or a CRM protein fragment such as described in International Publication WO2017/070735. In particular embodiments, the immunogenic fragment or isolated protein described herein is conjugated, coupled or otherwise linked to a carrier protein.

Other derivatives contemplated by the invention include, but are not limited to, modification to side chains, incorporation of unnatural amino acids and/or their derivatives during peptide, or protein synthesis and the use of crosslinkers and other methods which impose conformational constraints on the immunogenic proteins, fragments and variants of the invention.

In this regard, the skilled person is referred to Chapter 15 of CURRENT PROTOCOLS IN PROTEIN SCIENCE, Eds. Coligan et al. (John Wiley & Sons NY 1995-2008) for more extensive methodology relating to chemical modification of proteins.

In a related aspect, the invention provides an isolated protein comprising one or more immunogenic fragments of the NHBA of *N. gonorrhoeae*. Suitably, the isolated protein is not full length or wild-type NHBA of *N. gonorrhoeae*.

In one particular embodiment, the invention contemplates an isolated protein comprising a plurality of immunogenic fragments described herein, such as in the form of a "polytope" protein. For example, said immunogenic fragments may be present singly or as repeats, which also includes tandemly repeated fragments. Heterologous amino acid sequences (e.g., "spacer" amino acids) may also be included between one or a plurality of the immunogenic fragments present in said isolated protein.

In yet a further embodiment, the invention of the present aspect provides an isolated protein or peptide that consists of: (i) the immunogenic fragment described herein or a segment, domain, portion or region thereof (e.g., an epitope or antigenic determinant thereof), and inclusive of fragments, variants or derivatives thereof; and (ii) optionally one or more additional amino acid sequences. In this regard, the additional amino acid sequences are preferably heterologous amino acid sequences that can be at the N- and/or C-termini of the recited amino acid sequence of the aforementioned proteins, although without limitation thereto.

The immunogenic fragments and/or isolated proteins described herein, inclusive of fragments, variants and derivatives thereof, may be produced by any means known in the art, including but not limited to, chemical synthesis, recombinant DNA technology and proteolytic cleavage to produce peptide fragments.

Chemical synthesis is inclusive of solid phase and solution phase synthesis. Such methods are well known in the art, although reference is made to examples of chemical synthesis techniques as provided in Chapter 9 of SYNTHETIC VACCINES Ed. Nicholson (Blackwell Scientific Publications) and Chapter 15 of CURRENT PROTOCOLS IN PROTEIN SCIENCE Eds. Coligan et al., (John Wiley & Sons, Inc. NY USA 1995-2008). In this regard, reference is also made to International Publication WO 99/02550 and International Publication WO 97/45444.

Recombinant proteins may be conveniently prepared by a person skilled in the art using standard protocols as for example described in Sambrook et al., MOLECULAR CLONING. A Laboratory Manual (Cold Spring Harbor Press, 1989), in particular Sections 16 and 17; CURRENT PROTOCOLS IN MOLECULAR BIOLOGY Eds. Ausubel et al., (John Wiley & Sons, Inc. NY USA 1995-2008), in particular Chapters 10 and 16; and CURRENT PROTOCOLS IN PROTEIN SCIENCE Eds. Coligan et al., (John Wiley & Sons, Inc. NY USA 1995-2008), in particular Chapters 1, 5 and 6. Typically, recombinant protein preparation includes expression of a nucleic acid encoding the protein in a suitable host cell.

In another aspect, the present invention contemplates isolated nucleic acids that encode, or are complementary to nucleic acid sequence which encodes, the immunogenic fragments and isolated proteins disclosed herein or which comprises a nucleotide sequence complementary thereto.

Nucleotide sequences encoding the isolated immunogenic proteins, isolated immunogenic fragments, variants, derivatives and polytopes of the invention may be readily deduced from the complete genomic nucleic acid sequence of NHBA.

This aspect also includes fragments, variants and derivatives of said isolated nucleic acid.

The term "nucleic acid" as used herein designates single- or double-stranded DNA and RNA. DNA includes genomic DNA and cDNA. RNA includes mRNA, RNA, RNAi, siRNA, cRNA and autocatalytic RNA. Nucleic acids may also be DNA-RNA hybrids. A nucleic acid comprises a nucleotide sequence which typically includes nucleotides that comprise an A, G, C, T or U base. However, nucleotide sequences may include other bases such as inosine, methylycytosine, methylinosine, methyladenosine and/or thiouridine, although without limitation thereto.

Accordingly, in particular embodiments, the isolated nucleic acid is cDNA.

A "polynucleotide" is a nucleic acid having eighty (80) or more contiguous nucleotides, while an "oligonucleotide" has less than eighty (80) contiguous nucleotides.

A "probe" may be a single or double-stranded oligonucleotide or polynucleotide, suitably labelled for the purpose of detecting complementary sequences in Northern or Southern blotting, for example.

A "primer" is usually a single-stranded oligonucleotide, preferably having 15-50 contiguous nucleotides, which is capable of annealing to a complementary nucleic acid "template" and being extended in a template-dependent fashion by the action of a DNA polymerase such as Taq polymerase, RNA-dependent DNA polymerase or Sequenase™.

In one embodiment, the invention provides a variant of an isolated nucleic acid that encodes an isolated immunogenic fragment or protein of the invention.

In one embodiment, nucleic acid variants encode a variant of an isolated protein or immunogenic fragment of the invention.

Suitably, nucleic acid variants share at least 35%, 40%, 45%, 50%, 55%, 60% or 65%, 66%, 67%, 68%, 69%, preferably at least 70%, 71%, 72%, 73%, 74% or 75%, more preferably at least 80%, 81%, 82%, 83%, 84%, or 85%, and even more preferably at least 90%, 91%, 92%, 93%, 94%, or 95% nucleotide sequence identity with an isolated nucleic acid of the invention.

The present invention also contemplates nucleic acids that have been modified such as by taking advantage of codon sequence redundancy. In a more particular example, codon usage may be modified to optimize expression of a nucleic acid in a particular organism or cell type.

The invention further provides use of modified purines (for example, inosine, methylinosine and methyladenosine) and modified pyrimidines (for example, thiouridine and methylcytosine) in isolated nucleic acids of the invention.

It will be well appreciated by a person of skill in the art that the isolated nucleic acids of the invention can be conveniently prepared using standard protocols such as those described in Chapter 2 and Chapter 3 of CURRENT PROTOCOLS IN MOLECULAR BIOLOGY (Eds. Ausubel et al. John Wiley & Sons NY, 1995-2008).

In yet another embodiment, complementary nucleic acids hybridise to nucleic acids of the invention under high stringency conditions.

"Hybridise and Hybridisation" is used herein to denote the pairing of at least partly complementary nucleotide sequences to produce a DNA-DNA, RNA-RNA or DNA-RNA hybrid. Hybrid sequences comprising complementary nucleotide sequences occur through base-pairing.

"Stringency" as used herein, refers to temperature and ionic strength conditions, and presence or absence of certain organic solvents and/or detergents during hybridisation. The higher the stringency, the higher will be the required level of complementarity between hybridizing nucleotide sequences.

"Stringent conditions" designates those conditions under which only nucleic acid having a high frequency of complementary bases will hybridize.

Stringent conditions are well-known in the art, such as described in Chapters 2.9 and 2.10 of Ausubel et al., supra, which are herein incorporated by reference. A skilled addressee will also recognize that various factors can be manipulated to optimize the specificity of the hybridization. Optimization of the stringency of the final washes can serve to ensure a high degree of hybridization.

Complementary nucleotide sequences may be identified by blotting techniques that include a step whereby nucleotides are immobilized on a matrix (preferably a synthetic membrane such as nitrocellulose), a hybridization step, and a detection step, typically using a labelled probe or other complementary nucleic acid. Southern blotting is used to identify a complementary DNA sequence; Northern blotting is used to identify a complementary RNA sequence. Dot blotting and slot blotting can be used to identify complementary DNA/DNA, DNA/RNA or RNA/RNA polynucleotide sequences. Such techniques are well known by those skilled in the art, and have been described in Ausubel et al., supra, at pages 2.9.1 through 2.9.20. According to such methods, Southern blotting involves separating DNA molecules according to size by gel electrophoresis, transferring the size-separated DNA to a synthetic membrane, and hybridizing the membrane bound DNA to a complementary nucleotide sequence. An alternative blotting step is used when identifying complementary nucleic acids in a cDNA or genomic DNA library, such as through the process of plaque or colony hybridization. Other typical examples of this procedure are described in Chapters 8-12 of Sambrook et al., MOLECULAR CLONING. A Laboratory Manual (Cold Spring Harbor Press, 1989).

Methods for detecting labelled nucleic acids hybridized to an immobilized nucleic acid are well known to practitioners in the art. Such methods include autoradiography, chemiluminescent, fluorescent and colorimetric detection.

Nucleic acids may also be isolated, detected and/or subjected to recombinant DNA technology using nucleic acid sequence amplification techniques.

Suitable nucleic acid amplification techniques covering both thermal and isothermal methods are well known to the skilled addressee, and include polymerase chain reaction (PCR); strand displacement amplification (SDA); rolling circle replication (RCR); nucleic acid sequence-based amplification (NASBA), Q-β replicase amplification, recombinase polymerase amplification (RPA) and helicase-dependent amplification, although without limitation thereto.

As used herein, an "amplification product" refers to a nucleic acid product generated by nucleic acid amplification.

Nucleic acid amplification techniques may include particular quantitative and semi-quantitative techniques such as qPCR, real-time PCR and competitive PCR, as are well known in the art.

In another aspect, the invention provides a genetic construct comprising: (i) the isolated nucleic acid described herein; or (ii) an isolated nucleic acid comprising a nucleotide sequence complementary thereto.

Suitably, the genetic construct is in the form of, or comprises genetic components of, a plasmid, bacteriophage, a cosmid, a yeast or bacterial artificial chromosome as are well understood in the art. Genetic constructs may be suitable for maintenance and propagation of the isolated nucleic acid in bacteria or other host cells, for manipulation by recombinant DNA technology and/or expression of the nucleic acid or an encoded protein of the invention.

For the purposes of host cell expression, the genetic construct is an expression construct. Suitably, the expression construct comprises the nucleic acid of the invention operably linked to one or more additional sequences in an expression vector. An "expression vector" may be either a self-replicating extra-chromosomal vector such as a plasmid, or a vector that integrates into a host genome.

By "operably linked" is meant that said additional nucleotide sequence(s) is/are positioned relative to the nucleic acid of the invention preferably to initiate, regulate or otherwise control transcription.

Regulatory nucleotide sequences will generally be appropriate for the host cell used for expression. Numerous types of appropriate expression vectors and suitable regulatory sequences are known in the art for a variety of host cells.

Typically, said one or more regulatory nucleotide sequences may include, but are not limited to, promoter sequences, leader or signal sequences, ribosomal binding sites, transcriptional start and termination sequences, translational start and termination sequences, and enhancer or activator sequences.

Constitutive or inducible promoters as known in the art are contemplated by the invention.

The expression construct may also include an additional nucleotide sequence encoding a fusion partner (typically provided by the expression vector) so that the recombinant allergenic protein of the invention is expressed as a fusion protein, as hereinbefore described.

In particular embodiments, the genetic construct is suitable for administration to a subject, such as a human. In a preferred form, the genetic construct is suitable for DNA vaccination of a subject, such as a human.

Suitably, DNA vaccination is by way of one or more plasmid DNA expression constructs. Plasmids typically comprise a viral promoter (such as SV40, RSV or CMV promoters). Intron A may be included to improve mRNA stability and thereby increase protein expression. Plasmids may further include a multiple cloning site, a strong polyadenylation/transcription termination signal, such as bovine growth hormone or rabbit beta-globulin polyadenylation sequences. The plasmid may further comprise Mason-Pfizer monkey virus cis-acting transcriptional elements (MPV-CTE) with or without HIV rev increased envelope expression. Additional modifications that may improve expression include the insertion of enhancer sequences, synthetic introns, adenovirus tripartite leader (TPL) sequences and/or modifications to polyadenylation and/or transcription termination sequences. A non-limiting example of a DNA vaccine plasmid is pVAC which is commercially available from Invivogen.

A useful reference describing DNA vaccinology is DNA Vaccines, Methods and Protocols, Second Edition (Volume 127 of Methods in Molecular Medicine series, Humana Press, 2006).

In a further aspect, the invention provides a host cell transformed with a nucleic acid molecule or a genetic construct described herein.

Suitable host cells for expression may be prokaryotic or eukaryotic. For example, suitable host cells may include but are not limited to mammalian cells (e.g. HeLa, HEK293T, Jurkat cells), yeast cells (e.g. *Saccharomyces cerevisiae*), insect cells (e.g. Sf9, *Trichoplusia ni*) utilized with or without a baculovirus expression system, plant cells (e.g. *Chlamydomonas reinhardtii, Phaeodactylum tricornutum*) or bacterial cells, such as *E. coli*. Introduction of genetic constructs into host cells (whether prokaryotic or eukaryotic) is well known in the art, as for example described in CURRENT PROTOCOLS IN MOLECULAR BIOLOGY Eds. Ausubel et al., (John Wiley & Sons, Inc. 1995-2009), in particular Chapters 9 and 16.

In yet another aspect, the invention provides a method of producing an isolated immunogenic fragment or isolated protein described herein, comprising; (i) culturing the previously transformed host cell hereinbefore described; and (ii) isolating said fragment or protein from said host cell cultured in step (i).

The recombinant protein may be conveniently prepared by a person skilled in the art using standard protocols as for example described in Sambrook, et al., MOLECULAR CLONING. A Laboratory Manual (Cold Spring Harbor Press, 1989), in particular Sections 16 and 17; CURRENT PROTOCOLS IN MOLECULAR BIOLOGY Eds. Ausubel et al., (John Wiley & Sons, Inc. 1995-2009), in particular Chapters 10 and 16; and CURRENT PROTOCOLS IN PROTEIN SCIENCE Eds. Coligan et al., (John Wiley & Sons, Inc. 1995-2009), in particular Chapters 1, 5 and 6.

In a further aspect, the invention provides an antibody or antibody fragment which binds and/or is raised against an immunogenic fragment and/or isolated protein described herein.

Suitably, said antibody or antibody fragment specifically binds said isolated immunogenic fragment and/or protein.

In some embodiments, the antibody may reduce, eliminate, inhibit or suppress the binding of NHBA of *N. gonorrhoeae* to one or more glycans and/or substrate molecules, such as GAGs, heparin, heparan sulfate and chondroitin. In other embodiments, the antibody may reduce, eliminate, inhibit or suppress the ability of *N. gonorrhoeae* to bind or adhere to a cell, such as an epithelial cell, in a subject. In further embodiments, the antibody may reduce, eliminate, inhibit or suppress the ability of *N. gonorrhoeae* to induce serum resistance in a subject. In certain embodiments, the antibody induces or mediates complement-dependent lysis and/or opsonophagocytic killing of *N. gonorrhoeae* cells.

Suitably, the antibody or antibody fragment specifically binds an isolated immunogenic peptide comprising the amino acid sequence set forth in SEQ ID NO:2 or a variant, fragment or derivative thereof. In some embodiments, the antibody or antibody fragment binds a minimal epitope sequence contained within SEQ ID NO:2 with a substantially higher affinity than an antibody raised against the full-length NHBA protein. In this context, by "substantially higher affinity" is meant an affinity at least 2, 3, 4, 5, 6, 7, 8, 9 or 10 fold higher at a particular concentration of NHBA protein.

Antibodies and antibody fragments may be polyclonal or monoclonal, native or recombinant. Antibody fragments include Fc, Fab or F(ab)2 fragments and/or may comprise single chain Fv antibodies (scFvs). Such scFvs may be prepared, for example, in accordance with the methods described respectively in U.S. Pat. No. 5,091,513, European Patent No 239,400 or the article by Winter & Milstein, 1991, Nature 349:293. Antibodies may also include multivalent recombinant antibody fragments, such as diabodies, triabodies and/or tetrabodies, comprising a plurality of scFvs, as well as dimerisation-activated demibodies (e.g. WO/2007/062466). By way of example, such antibodies may be prepared in accordance with the methods described in Holliger et al., 1993 Proc Natl Acad Sci USA 90 6444; or in Kipriyanov, 2009 Methods Mol Biol 562 177. Well-known protocols applicable to antibody production, purification and use may be found, for example, in Chapter 2 of Coligan et al., CURRENT PROTOCOLS IN IMMUNOLOGY (John Wiley & Sons NY, 1991-1994) and Harlow, E. & Lane, D. *Antibodies: A Laboratory Manual*, Cold Spring Harbour, Cold Spring Harbour Laboratory, 1988.

Methods of producing polyclonal antibodies are well known to those skilled in the art. Exemplary protocols which may be used are described for example in Coligan et al., CURRENT PROTOCOLS IN IMMUNOLOGY, supra, and in Harlow & Lane, 1988, supra. By way of example, polyclonal antibodies may be raised against purified or recombinant NHBA protein, or an immunogenic fragment thereof (e.g., SEQ ID NO:2), in production species such as horses and then subsequently purified prior to administration.

Monoclonal antibodies may be produced using the standard method as for example, originally described in an article by Kohler & Milstein, 1975, Nature 256, 495, or by more recent modifications thereof as for example, described in Coligan et al., CURRENT PROTOCOLS IN IMMUNOLOGY, supra by immortalizing spleen or other antibody producing cells derived from a production species which has been inoculated with one or more of the isolated proteins, fragments, variants or derivatives of the invention. In certain embodiments, the monoclonal antibody or fragment thereof may be in recombinant form. This may be particularly advantageous for "humanizing" the monoclonal antibody or fragment if the monoclonal antibody is initially produced by spleen cells of a non-human mammal.

Antibodies and antibody fragments of the invention may be particularly suitable for affinity chromatography purification of the isolated immunogenic fragments and/or proteins described herein. For example, reference may be made to affinity chromatographic procedures described in Chapter 9.5 of Coligan et al., CURRENT PROTOCOLS IN IMMUNOLOGY, supra.

In some embodiments, the antibody or antibody fragment may be administered to a mammal to provide "passive" immunity to a gonococcal infection.

In another embodiment, antibodies or antibody fragments that bind or are raised against the isolated immunogenic fragments and/or proteins of NHBA described herein may be used to detect cell surface-expressed NHBA.

Certain further aspects and embodiments of the invention provide compositions and/or methods of preventing, treating and/or immunizing against a gonococcal-associated disease, disorder or condition in an animal and more particularly humans.

In one such aspect, the invention resides in a composition for preventing or treating a gonococcal-associated disease, disorder or condition may comprise (i) one or more immunogenic fragments and/or proteins described herein; (ii) one or more isolated proteins described herein; (iii) one or more isolated nucleic acids described herein; (iv) one or more genetic constructs described herein; and/or (v) one or more antibodies or antibody fragments that bind or are raised against an immunogenic fragment or isolated protein such as those described herein, optionally together with a pharmaceutically-acceptable diluent, carrier or excipient.

By "pharmaceutically-acceptable carrier, diluent or excipient" is meant a solid or liquid filler, diluent or encapsulating substance that may be safely used in systemic administration. Depending upon the particular route of administration, a variety of carriers, well known in the art may be used. These carriers may be selected from a group including sugars, starches, cellulose and its derivatives, malt, gelatine, talc, calcium sulfate, vegetable oils, synthetic oils, polyols, alginic acid, phosphate buffered solutions, emulsifiers, isotonic saline and salts such as mineral acid salts including hydrochlorides, bromides and sulfates, organic acids such as acetates, propionates and malonates and pyrogen-free water.

A useful reference describing pharmaceutically acceptable carriers, diluents and excipients is Remington's Pharmaceutical Sciences (Mack Publishing Co. N.J. USA, 1991) which is incorporated herein by reference.

In one embodiment, the pharmaceutical composition of the present invention is an immunogenic composition. More particularly, the immunogenic composition suitably is a vaccine.

As generally used herein the terms "immunize", "vaccinate" and "vaccine" refer to methods and/or compositions that elicit a protective immune response against *N. gonorrhoeae*, whereby subsequent infection by *N. gonorrhoeae* is at least partly prevented or minimized.

Accordingly, such compositions may be delivered for the purposes of generating at least partial immunity, and preferably protective immunity, or for generating an immune response, preferably a protective immune response, to an *N. gonorrhoeae* bacteria, upon administration to a subject, although without limitation thereto.

By "protective immunity" is meant a level of immunity whereby the responsiveness to an antigen or antigens is sufficient to lead to rapid binding and/or elimination of said antigens and thus at least partially ameliorate or prevent a subsequent *N. gonorrhoeae* bacterial infection in an animal, such as human subjects.

By "protective immune response" is meant a level of immune response that is sufficient to prevent or reduce the severity, symptom, aspect, or characteristic of a current and/or future *N. gonorrhoeae* bacterial infection in an animal, such as human subjects.

In another particular embodiment, the immunogenic composition comprises one or more antibodies disclosed herein for passive immunization of a subject.

Suitable vaccines may be in the form of proteinaceous vaccines, and in particular, comprise one or more immunogenic fragments of an NHBA protein of *N. gonorrhoeae*, or a fragment, variant or derivative thereof as described herein.

It will be appreciated by the foregoing that the immunogenic composition and/or vaccine of the invention may include an "immunologically-acceptable carrier, diluent or excipient".

Useful carriers are well known in the art and include for example: thyroglobulin; albumins such as human serum albumin; toxins, toxoids or any mutant crossreactive material (CRM) of the toxin from tetanus, diphtheria, pertussis, *Pseudomonas, E. coli, Staphylococcus*, and *Streptococcus*; polyamino acids such as poly(lysine:glutamic acid); influenza; Rotavirus VP6, Parvovirus VP1 and VP2; hepatitis B virus core protein; hepatitis B virus recombinant vaccine and the like. Alternatively, a fragment or epitope of a carrier protein or other immunogenic protein may be used. For example, a T cell epitope of a bacterial toxin, toxoid or CRM may be used. In this regard, reference may be made to U.S. Pat. No. 5,785,973 which is incorporated herein by reference.

The "immunologically-acceptable carrier, diluent or excipient" includes within its scope water, bicarbonate buffer, phosphate buffered saline or saline and/or an adjuvant as is well known in the art. As will be understood in the art, an "adjuvant" means a composition comprised of one or more substances that enhances the immunogenicity and efficacy of a vaccine composition.

Preferably, for the purposes of eliciting an immune response, certain immunological agents may be used in combination or conjugated with the immunogenic fragments or isolated proteins described herein. The term "immunological agent" includes within its scope carriers, delivery agents, immunostimulants and/or adjuvants as are well known in the art. As will be understood in the art, immunostimulants and adjuvants refer to or include one or more substances that enhance the immunogenicity and/or efficacy of a composition.

Non-limiting examples of suitable adjuvants or immunostimulants include squalane and squalene (or other oils of plant or animal origin); block copolymers; detergents such as Tween®-80; Quil® A, mineral oils such as Drakeol or Marcol, vegetable oils such as peanut oil; *Corynebacterium*-derived adjuvants such as *Corynebacterium parvum*; *Propionibacterium*-derived adjuvants such as *Propionibacterium acne*; *Mycobacterium bovis* (Bacille Calmette and Guerin or BCG); *Bordetella pertussis* antigens; tetanus toxoid; diphtheria toxoid; surface active substances such as hexadecylamine, octadecylamine, octadecyl amino acid esters, lysolecithin, dimethyldioctadecylammonium bromide, N,N-dicoctadecyl-N',N'bis(2-hydroxyethyl-propanediamine), methoxyhexadecylglycerol, and pluronic polyols; polyamines such as pyran, dextransulfate, poly IC carbopol; peptides such as muramyl dipeptide and derivatives, dimethylglycine, tuftsin; oil emulsions; and mineral gels such as aluminium phosphate, aluminium hydroxide or alum; interleukins such as interleukin 2 and interleukin 12; monokines such as interleukin 1; tumour necrosis factor; interferons such as gamma interferon; combinations such as saponin-aluminium hydroxide or Quil-A aluminium hydroxide; liposomes; ISCOM® and ISCOMATRIX® adjuvant; mycobacterial cell wall extract; synthetic glycopeptides such as muramyl dipeptides or other derivatives; Avridine; Lipid A derivatives; dextran sulfate; DEAE-Dextran alone or with aluminium phosphate; carboxypolymethylene such as Carbopol' EMA; acrylic copolymer emulsions such as Neocryl A640 (e.g. U.S. Pat. No. 5,047,238); water in oil emulsifiers such as Montanide ISA 720; poliovirus, vaccinia or animal poxvirus proteins; or mixtures thereof.

With regard to subunit vaccines, an example of such a vaccine may be formulated with ISCOMs, such as described in International Publication WO97/45444.

An example of a vaccine in the form of a water-in-oil formulation includes Montanide ISA 720, such as described in International Publication WO97/45444.

Any suitable procedure is contemplated for producing vaccine compositions. Exemplary procedures include, for example, those described in New Generation Vaccines (1997, Levine et al., Marcel Dekker, Inc. New York, Basel, Hong Kong), which is incorporated herein by reference.

Alternatively, a vaccine may be in the form of a nucleic acid vaccine and in particular, a DNA vaccine. A useful reference describing DNA vaccinology is DNA Vaccines, Methods and Protocols, Second Edition (Volume 127 of Methods in Molecular Medicine series, Humana Press, 2006) and is incorporated herein by reference.

In some embodiments, the isolated immunogenic proteins and/or fragments of the present invention may be used as a vaccine in the purified form, fused to immunogenic carrier proteins, or expressed by live vaccine delivery systems including attenuated viruses, virus-like particles or live attenuated bacteria.

In other embodiments, compositions and vaccines of the invention may be administered to humans in the form of attenuated or inactivated bacteria that may be induced to express one or more isolated immunogenic proteins or immunogenic fragments of the present invention. Non-limiting examples of attenuated bacteria include *Salmonella* species, for example *Salmonella enterica* var. *Typhimurium* or *Salmonella typhi*. Alternatively, other enteric pathogens such as *Shigella* species or *E. coli* may be used in attenuated form. Attenuated *Salmonella* strains have been constructed by inactivating genes in the aromatic amino acid biosynthetic pathway (Alderton et al., Avian Diseases 35 435), by introducing mutations into two genes in the aromatic amino acid biosynthetic pathway (such as described in U.S. Pat. No. 5,770,214) or in other genes such as htrA (such as described in U.S. Pat. No. 5,980,907) or in genes encoding outer membrane proteins, such as ompR (such as described in U.S. Pat. No. 5,851,519).

In one embodiment, the antigenic composition comprises outer membrane vesicles (OMV). OMVs occur naturally in Gram negative bacteria, and are non-replicating spherical nanoparticles consisting of proteins, lipids (mostly LPS) and periplasmic contents. Suitably, the OMV can be prepared from naturally secreted or detergent extracted outer membrane of any bacterial species, such as a cultured strain of a *Neisseria* spp., (e.g., *Neisseria gonorrhoeae* and/or *Neisseria meningitidis*) or *E. coli*. OMVs may be obtained by any method known in the art (see e.g., Gerritzen et al. 2017, Biotech Adv. 35:565-574; Semchenko et al. 2017, Infect Immun 85(2)e00898-16). In particular embodiments, the immunogenic fragment and/or isolated protein of the present disclosure, can be formulated with an OMV for surface exposure, non-surface exposure, attached to the OMV or not attached (i.e., simple admixture). The immunogenic fragment and/or isolated protein and OMV can be produced by the Gram-negative bacteria simultaneously such that the OMV is produced with the immunogenic fragment and/or isolated protein loaded on to the surface or in the lumen of the OMV. Alternatively, the immunogenic fragment and/or isolated protein can be attached to the OMV after production of the OMV, such as by covalent attachment using an affinity tag on the antigen that binds to a fusion protein in the OMV (see e.g., Alves et al., 2015, ACS Appl. Mater. Interfaces, 7(44): 24963-24972). Still further, the immunogenic fragment and/or isolated protein can be loaded to the OMV lumen after the OMV had been produced, or can be simply admixed with the OMV after the OMV had been produced. Exemplary OMVs for use as an adjuvant with an immunogenic fragment and/or isolated protein of the present disclosure include OMVs produced from any Gram negative bacteria, including, but not limited to, *N. meningitidis, N. gonorrhoeae, E. coli* and *P. aeruginosa*. It is further envisaged that the bacterial species from which the OMVs are derived can be genetically modified for expression or upregulated expression of an NHBA protein, alone or in combination with other *Neisseria gonorrhoeae* and/or *Neisseria meningitidis* antigens, within said OMV derived therefrom.

Expression of the proteins, peptides, fragments or fusion proteins containing transport or immunogenic functions and could result in production of the immunogenic protein, peptide or fragment in the cytoplasm, cell wall, exposed on the cell surface or produced in a secreted form.

In another aspect, the invention relates to a method of eliciting an immune response to *Neisseria gonorrhoeae* and/or *Neisseria meningitidis* bacteria in a subject, said method including the step of administering: one or more immunogenic fragments described herein; the isolated protein described herein; the isolated nucleic acid described herein; the genetic construct described herein; the host cell described herein; the antibody or antibody fragment described herein; and/or the composition of the aforementioned aspect; to the subject to thereby elicit the immune response.

Suitably, the method elicits or enhances an immune response in said subject to prevent or prophylactically or therapeutically treat a gonococcal-associated disease, disorder or condition in the subject.

In a related aspect, the invention provides a method of inducing immunity against *Neisseria gonorrhoeae* and/or *Neisseria meningitidis* bacteria in a subject, said method including the step of administering: one or more immunogenic fragments described herein; the isolated protein described herein; the isolated nucleic acid described herein; the genetic construct described herein; the host cell described herein; the antibody or antibody fragment described herein; and/or the composition described herein; to the subject to thereby induce immunity against the *Neisseria gonorrhoeae* and/or *Neisseria meningitidis* bacteria in the subject.

Suitably, the immune response or immunity to the *N. gonorrhoeae* bacteria prevents the animal contracting a gonococcal-associated disease, disorder or condition. Additionally, it will be appreciated by the skilled artisan, that owing to homology observed in the protein sequence, particularly the C-terminal sequence, for the NHBA protein across different *Neisseria* species, the method may also be used to immunise an animal against a further *Neisseria* species, such as *Neisseria meningitidis*.

In a further aspect, the invention resides in a method of treating or preventing a *Neisseria gonorrhoeae* and/or *Neisseria meningitidis* bacterial infection in a subject, said method including the step of administering: one or more immunogenic fragments described herein; the isolated protein described herein; the isolated nucleic acid described herein; the genetic construct described herein; the host cell described herein; the antibody or antibody fragment described herein; and/or the composition described herein; to the subject to thereby prevent or treat the *Neisseria gonorrhoeae* and/or *Neisseria meningitidis* bacterial infection in the subject.

Similar to the previous two aspects, the method may also be used to treat an animal for a further *Neisseria* species, including, but not limited to, *Neisseria meningitidis*.

As used herein, "treating" (or "treat" or "treatment") refers to a therapeutic intervention that ameliorates a sign or symptom of a gonococcal- or meningococcal-associated disease, disorder or condition after it has begun to develop. The term "ameliorating," with reference to a gonococcal- or meningococcal-associated disease, disorder or condition, refers to any observable beneficial effect of the treatment. Treatment need not be absolute to be beneficial to the subject. The beneficial effect can be determined using any methods or standards known to the ordinarily skilled artisan.

As used herein, "preventing" (or "prevent" or "prevention") refers to a course of action (such as administering a composition comprising a therapeutically effective amount of one or more immunogenic proteins and/or a fragment, variant or derivative thereof of the present invention) initiated prior to the onset of a symptom, aspect, or characteristic of a gonococcal- or meningococcal-associated disease, disorder or condition, so as to prevent or reduce the symptom, aspect, or characteristic. It is to be understood that such preventing need not be absolute to be beneficial to a subject. A "prophylactic" treatment is a treatment administered to a subject who does not exhibit signs of a gonococcal- or meningococcal-associated disease, disorder or condition, or exhibits only early signs for the purpose of decreasing the risk of developing a symptom, aspect, or characteristic of a gonococcal- or meningococcal-associated disease, disorder or condition.

The term "therapeutically effective amount" describes a quantity of a specified agent, such as the isolated immunogenic fragments, isolated proteins and antibodies or antibody fragments described herein, sufficient to achieve a desired effect in a subject being treated with that agent. For example, this can be the amount of a composition comprising the isolated immunogenic fragments, isolated proteins and/or antibodies or antibody fragments described herein, necessary to reduce, alleviate and/or prevent a gonococcal- or meningococcal-associated disease, disorder or condition, inclusive of a gonococcal or meningococcal infection. In some embodiments, a "therapeutically effective amount" is sufficient to reduce or eliminate a symptom of a gonococcal- or meningococcal-associated disease, disorder or condition. In other embodiments, a "therapeutically effective amount" is an amount sufficient to achieve a desired biological effect, for example, an amount that is sufficient to elicit a protective immune response in a subject so as to inhibit or prevent a gonococcal and/or meningococcal infection.

Ideally, a therapeutically effective amount of an agent is an amount sufficient to induce the desired result without causing a substantial cytotoxic effect in the subject. The effective amount of an agent useful for reducing, alleviating and/or preventing a gonococcal- or meningococcal-associated disease, disorder or condition, such as a gonococcal infection or a meningococcal infection, will be dependent on the subject being treated, the type and severity of any associated disease, disorder and/or condition (e.g., the type of gonococcal- or meningococcal-associated disease, disorder or condition and/or strain of *N. gonorrhoeae* or *N. meningitidis*), and the manner of administration of the therapeutic composition.

In the context of the present invention, by "gonococcal-associated disease, disorder or condition" is meant any gonococcal or *Neisseria gonorrhoeae* infection, inclusive of any clinical pathology resulting from such an infection by *Neisseria gonorrhoeae*, such as those hereinbefore described.

Additionally, by "meningococcal-associated disease, disorder or condition" is meant any meningococcal or *Neisseria meningitidis* infection, inclusive of any clinical pathology resulting from such an infection by *Neisseria meningitidis*, such as meningitis, rash, septicaemia, fever, nausea, vomiting and diarrhoea.

In yet another aspect, the invention provides a method of at least partly inhibiting or preventing *Neisseria gonorrhoeae* and/or *Neisseria meningitidis* bacteria binding or adhering to a cell in a subject, said method including the step of administering: one or more immunogenic fragments described herein; the isolated protein described herein; the isolated nucleic acid described herein; the genetic construct described herein; the host cell described herein; the antibody or antibody fragment described herein; and/or the composition described herein; to the subject to thereby inhibit or prevent *Neisseria gonorrhoeae* and/or *Neisseria meningitidis* bacteria binding to the subject's cell.

It will be appreciated that bacterial adherence to host cells is the initial step and a prerequisite for successful colonization of host mucosal surfaces. In particular embodiments, the cell is an epithelial cell, such as vaginal epithelial cells, cervical epithelial cells, endometrial epithelial cells, pharyngeal epithelial cells and urethral epithelial cells.

In still another aspect, the invention relates to a method of at least partly inhibiting or reducing serum resistance of a *Neisseria gonorrhoeae* and/or *Neisseria meningitidis* bacterial infection in a subject, said method including the step of administering: one or more immunogenic fragments described herein; the isolated protein described herein; the isolated nucleic acid described herein; the genetic construct described herein; the host cell described herein; the antibody or antibody fragment described herein; and/or the composition described herein; to the subject to thereby inhibit or reduce serum resistance of the *Neisseria gonorrhoeae* and/or *Neisseria meningitidis* bacterial infection in the subject.

*Neisseria gonorrhoeae* is a frequent cause of sexually transmitted disease in humans worldwide. A small percentage of gonococcal infections may result in a severe life threatening complication generally referred to as disseminating gonococcal infection (DGI). Virulence and resistance to the complement dependent bactericidal effect of normal human serum (i.e., serum resistance) appear to be closely correlated for this gram negative diplococcus.

Suitably, the aforementioned methods of the present invention are performed on an animal such as a mammal. In one embodiment, the mammal is a human.

It will be appreciated that compositions for administration in the methods of the five aforementioned aspects may comprise, but are not necessarily limited to, one or more immunogenic fragments and/or isolated proteins of the present invention and/or one or more antibodies or antibody fragments of the present invention which have been raised against an immunogenic fragment and/or isolated protein described herein. Accordingly, in certain embodiments, such compositions may comprise one or more antibodies or one or more antibody fragments that may bind or are raised against a C-terminal fragment of a NHBA protein (e.g., SEQ ID NO:1), such as that set forth in SEQ ID NO:2.

By "administering" or "administration" is meant the introduction of a composition disclosed herein into a subject by a particular chosen route.

Any safe route of administration may be employed for providing a patient with the composition of the invention. For example, oral, rectal, parenteral, sublingual, buccal, intravenous, intra-articular, intra-muscular, intra-dermal, subcutaneous, inhalational, intraocular, intraperitoneal, intracerebroventricular, intra-vaginal and transdermal administration may be employed.

Dosage forms include tablets, dispersions, suspensions, injections, solutions, syrups, troches, capsules, nasal sprays, suppositories, aerosols, transdermal patches and the like. These dosage forms may also include injecting or implanting controlled releasing devices designed specifically for this purpose or other forms of implants modified to act additionally in this fashion. Controlled release of the therapeutic agent may be effected by coating the same, for example, with hydrophobic polymers including acrylic resins, waxes, higher aliphatic alcohols, polylactic and polyglycolic acids and certain cellulose derivatives such as hydroxypropylmethyl cellulose. In addition, the controlled release may be effected by using other polymer matrices, liposomes and/or microspheres.

Compositions of the present invention suitable for oral or parenteral administration may be presented as discrete units such as capsules, sachets, functional foods/feeds or tablets each containing a pre-determined amount of one or more therapeutic agents of the invention, as a powder or granules or as a solution or a suspension in an aqueous liquid, a non-aqueous liquid, an oil-in-water emulsion or a water-in-oil liquid emulsion. Such compositions may be prepared by any of the methods of pharmacy but all methods include the step of bringing into association one or more agents as described above with the carrier which constitutes one or more necessary ingredients. In general, the compositions are prepared by uniformly and intimately admixing the agents of the invention with liquid carriers or finely divided solid carriers or both, and then, if necessary, shaping the product into the desired presentation.

The above compositions may be administered in a manner compatible with the dosage formulation, and in such amount as is pharmaceutically-effective. The dose administered to a patient, in the context of the present invention, should be sufficient to effect a beneficial response in a patient over an appropriate period of time. The quantity of agent(s) to be administered may depend on the subject to be treated inclusive of the age, sex, weight and general health condition thereof, factors that will depend on the judgement of the practitioner.

In a particular embodiment of the aforementioned methods and compositions, the immunogenic fragment or isolated protein may be administered in combination with a further immunogenic fragment or protein derived from a NHBA protein or a further *N. gonorrhoeae* or *N. meningitidis* protein as are known in the art, such as the surface expressed MetQ protein (Semchenko et al. 2017), MsrAB, AniA and one or more of those four antigenic components present in the Bexsero vaccine (GSK Vaccines) (i.e., factor H binding protein (fHbp), neisserial adhesin A (NadA), Neisseria heparin binding antigen (NHBA) and outer membrane vesicles from a New Zealand epidemic strain (MeNZB, which provides PorA). In this regard, the immunogenic fragment or isolated protein described herein may be included as a component of a multi-antigen vaccine for *N.* gonorrhoeae and/or *Neisseria meningitidis*. In some embodiments, the immunogenic fragment or isolated protein of NHBA and the further immunogenic fragment or protein may be provided as a single, chimeric peptide. In this embodiment, the immunogenic fragment or isolated protein described herein may be N-terminal or C-terminal of the further immunogenic fragment or protein.

In a final aspect, the invention provides a method of detecting *N. gonorrhoeae* and/or *Neisseria meningitidis* in a biological sample obtained from an animal, said method including the step of contacting the biological sample with an antibody or antibody fragment described herein to thereby detect *N. gonorrhoeae* and/or *Neisseria meningitidis* in the biological sample. Suitably, a NHBA protein is detected on an extracellular surface of one or more *N. gonorrhoeae* and/or *N. meningitidis* cells in the biological sample.

In certain embodiments, the biological sample may be a pathology sample that comprises one or more fluids, cells, tissues, organs or organ samples obtained from an animal. Non-limiting examples include blood, plasma, serum, lymphocytes, urine, faeces, amniotic fluid, cervical samples, cerebrospinal fluid, tissue biopsies, bone marrow, bronchoalveolar lavage fluid, sputum and skin.

Suitably, detecting *N. gonorrhoeae* and/or *N. meningitidis* includes the step of forming a detectable complex between the antibody or antibody fragment and the NHBA protein. The complex so formed may be detected by any technique, assay or means known in the art, including immunoblotting, immunohistochemistry, immunocytochemistry, immunofluorescence, immunoprecipitation, ELISA, flow cytometry, magnetic bead separation, and biosensor-based detection systems such as surface plasmon resonance, although without limitation thereto.

To facilitate detection the antibody may be directly labelled or a labelled secondary antibody may be used. Additionally, the small molecule may be directly labelled.

The label may be selected from a group including a chromogen, a catalyst, biotin, digoxigenin, an enzyme, a fluorophore, a chemiluminescent molecule, a radioisotope, a drug, a magnetic bead and/or a direct visual label.

In the case of a direct visual label, use may be made of a colloidal metallic or non-metallic particle, a dye particle, an enzyme or a substrate, an organic polymer, a latex particle, a liposome, or other vesicle containing a signal producing substance and the like.

The fluorophore may be, for example, fluorescein isothiocyanate (FITC), Alexa dyes, tetramethylrhodamine isothiocyanate (TRITL), allophycocyanin (APC), Texas Red, Cy5, Cy3, or R-Phycoerythrin (RPE) as are well known in the art.

The enzyme may be horseradish peroxidase (HRP), alkaline phosphatase (AP), β-galactosidase or glucose oxidase, although without limitation thereto.

In some embodiments, detection methods may be performed in "high throughput" diagnostic tests or procedures such as performed by commercial pathology laboratories or in hospitals.

It would be further appreciated, that such detection methods of *N. gonorrhoeae* may have potential utility in characterising disease progression and/or severity of a gonococcal-associated disease, disorder or condition in an animal. Additionally, such methods may be used for selecting animals for anti-NHBA treatment, such as by a so-called "companion diagnostic".

As generally used herein, the terms "patient", "individual" and "subject" are used in the context of any mammalian recipient of a treatment or composition disclosed herein. Accordingly, the methods and compositions disclosed herein may have medical and/or veterinary applications. In a preferred form, the mammal is a human. One or more steps of a method described herein may be carried out in vitro.

So that the invention may be fully understood and put into practical effect, reference is made to the following non-limiting Examples.

EXAMPLES

Example 1

Introduction

Several recent advances support the feasibility of gonococcal vaccine development. A recent observational study suggested that a vaccine against the closely related bacteria *Neisseria meningitidis*, the outer membrane vesicle (OMV) meningococcal B vaccine MeNZB, had an effectiveness of 31% against infection with *N. gonorrhoeae* [12]. A newer four-component meningococcal B vaccine, 4CMenB (marketed as Bexsero) that contains the MeNZB OMV component plus three recombinant protein antigens, has been shown to induce cross reactive antibodies to *N. gonorrhoeae* proteins including NHBA [13].

In this Example, we perform a detailed analysis of the sequence variation and expression of NHBA in *N. gonorrhoeae*, and investigate the level, type and functional activity of antibodies raised to $NHBA_{Ng}$ to evaluate the potential of the full length protein and a C-terminal fragment of the protein as a gonococcal vaccine candidate.

Results

NHBA is Highly Conserved in *N. gonorrhoeae*

We have previously shown that NHBA is conserved in *N. gonorrhoeae* [13] and here we further examine the sequence variants of NHBA in available gonococcal isolates and genome sequences. A blastn search with the 1281 nucleotide nhba gene from *N. gonorrhoeae* strain 1291, which encodes the 427 amino acid NHBA (FIG. 1A), against the available gonococcal genomes in GenBank revealed that nhba is present in all 594 genomes, with 94.1-100% nucleic acid identity. A similar blastn search against the PubMLST database revealed the presence of the nhba gene in 4,424 isolates with 85.1-100% identity. The 1,228 isolates that did not have a match to nhba in this BLAST search were also missing annotated 16S and porB genes, indicating that incomplete sequences are available for these isolates. This confirms that nhba is widely distributed and highly conserved in a temporally and geographically diverse panel of gonococcal strains that were collected between 1960-2020 from >60 different countries.

Figure 1:
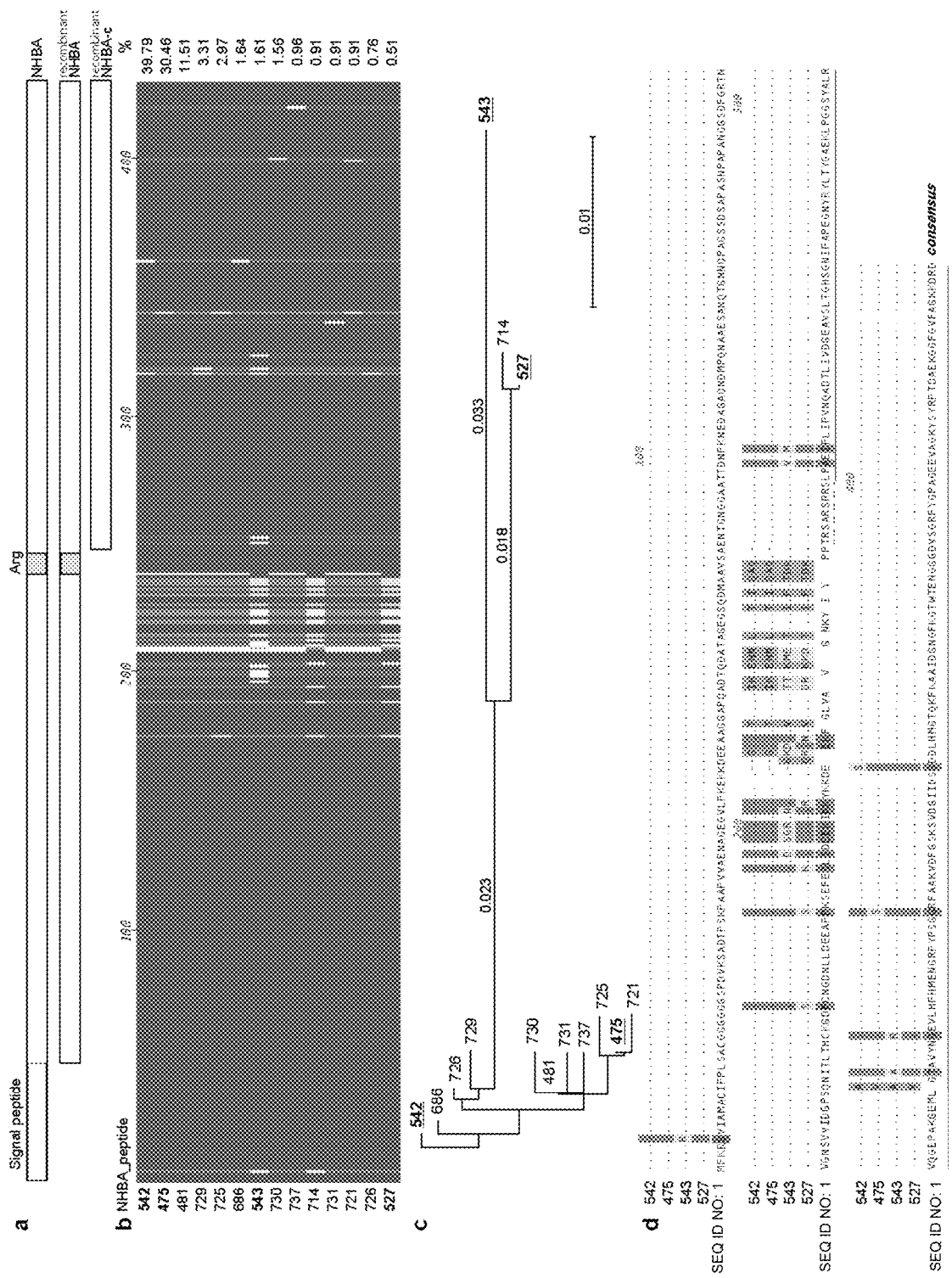
FIG. 1. Overview of the gonococcal NHBA. (a) Schematic of the NHBA protein from *N. gonorrhoeae* strain 1291, showing the signal peptide region (open box) and the arginine rich region (Arg; grey box). The recombinant proteins used in the study are also shown, the mature NHBA (NHBA; lacking the predicted signal peptide) and the C-terminal fragment of NHBA (NHBA-c). (b) An alignment of the amino acid sequences of the 14 main NHBA variants of *N. gonorrhoeae*, with amino acids that are identical between all variants shown as a dark grey vertical line, amino acids conserved between most variant shown as light grey, mismatches or gaps shown as white. The NHBA peptide number is shown on the left and the % of isolates in PubMLST that contain this variant on the right. (c) Neighbour-Joining phylogenetic tree of the 14 main NHBA variants. The four NHBA variants present in strains used in this study are underlined. (d) Amino acid alignment of the four NHBA variants present in strains used in this study. Matches to the consensus sequence (shown on the bottom line) are indicated by dots. The arginine rich region is indicated by a dashed line, and the NHBA-c fragment is indicated by a line.

As at 6 Apr. 2020, there are 42 unique NHBA_peptide variants in the 3,546 *N. gonorrhoeae* isolates that have an annotated NHBA protein in the PubMLST database. These variants share 97.5-100% amino acid identity. There are two predominant NHBA variants that are present in 70.3% of PubMLST isolates, NHBA-542 (present in 39.7% of strains, including *N. gonorrhoeae* 1291) and NHBA-475 (present in 30.4% of strains, including and *N. gonorrhoeae* WHO P and WHO X). Overall, one of 14 main NHBA variants is present in 97.8% of isolates, while the remaining 28 NHBA peptide variants are rare, being present in between 1-10 isolates (Table 5). Alignment of these 14 most common variants indicates that the N- and C-terminals have the highest level of conservation, with a variable central region present upstream of the arginine rich region (FIG. 1B, variants arranged in order of decreasing abundance). The phylogenetic relatedness of these NHBA variants is shown in FIG. 1C, and a panel of strains representative of NHBA diversity were used in subsequent assays. Given the sequence conservation of the C-terminal (FIG. 1B), that the structure of the meningococcal NHBA C-terminal region has been characterized [15, 19, 20] and that the C-terminal region is more likely to be exposed and accessible to vaccine induced antibodies, we focused our subsequent investigation on both the recombinant full length NHBA and a C-terminal NHBA fragment (NHBA-c) (FIG. 1.A).

Figure 2:
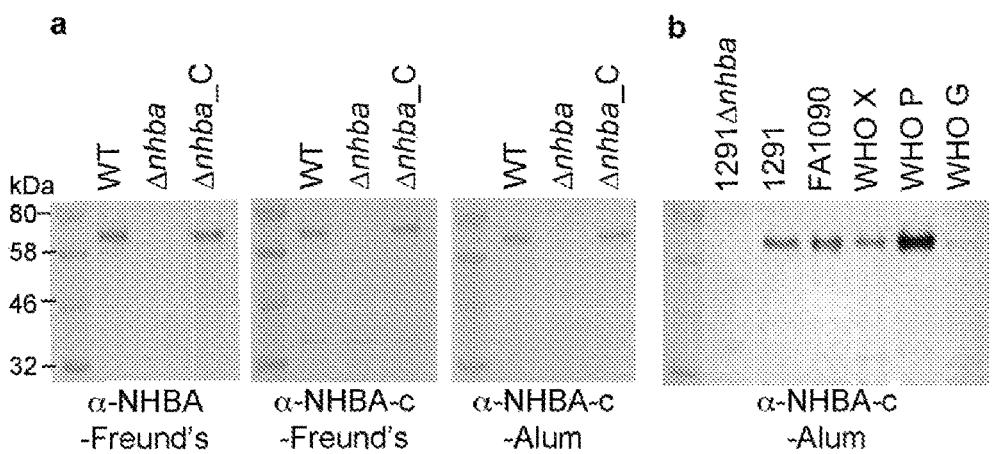
FIG. 2. Expression of NHBA in a panel of gonococcal strains. Western blot analysis of NHBA expression in (a) *N. gonorrhoeae* 1291 wild type (WT), nhba::kan mutant (ΔNHBA), and complemented (ΔNHBA_C) strains, and (b) the gonococcal strains used in SBA and OPA assays. The sera used is indicated below the blots.

The Recombinant Full Length NHBA and the C-Terminal NHBA Fragment are Immunogenic and Induce Antibodies that Recognize NHBA Variants from a Range of Gonococcal Strains To examine the immunogenicity of the gonococcal NHBA, sera from mice immunized with the recombinant full length NHBA plus Freund's adjuvant or the NHBA-c fragment plus Freund's or aluminium hydroxide (Alum) were assessed by ELISA and Western blot. Using whole-cell ELISA, we show that both NHBA and NHBA-c mouse sera can detect native NHBA on the surface of *N. gonorrhoeae* wild type (WT) and the NHBA complemented (ΔNHBA_C) strains, with significantly reduced titers for the NHBA mutant strain (ΔNHBA) (Table 1). Analysis of NHBA antisera by Western blotting against whole cell lysates of *N. gonorrhoeae* wild-type and the mutant confirmed that the antisera specifically recognizes NHBA (FIG. 2A). The expression of NHBA and the cross-reactivity of the NHBA antisera in a panel of *N. gonorrhoeae* strains was confirmed by Western blot analysis (FIG. 2B). NHBA expression varied between strains, and high, medium and low NHBA expressers were used in subsequent assays.

ELISA with the recombinant NHBA indicated the presence of a dominant IgG1 isotype response in mice immunized with NHBA (Table 1). However, the ratio of isotypes and subclasses differed between the different formulations, with NHBA-Freund's having higher levels of IgG3 and lower levels of IgG2a and IgG2b (IgG1>IgM>IgG3>IgG2b>IgG2a) than NHBA-c-Freund's (IgG1>IgM=IgG2b>IgG2a>IgG3) and NHBA-c-Alum (IgG1>IgM>IgG2b>IgG2a>IgG3). Overall, the ELISA and Western results confirm that the gonococcal NHBA is immunogenic and that anti-NHBA antisera can recognize NHBA on the surface of several *N. gonorrhoeae* strains that express different NHBA variants.

NHBA Antibodies Promote C3-Fragment Deposition

Figure 3:
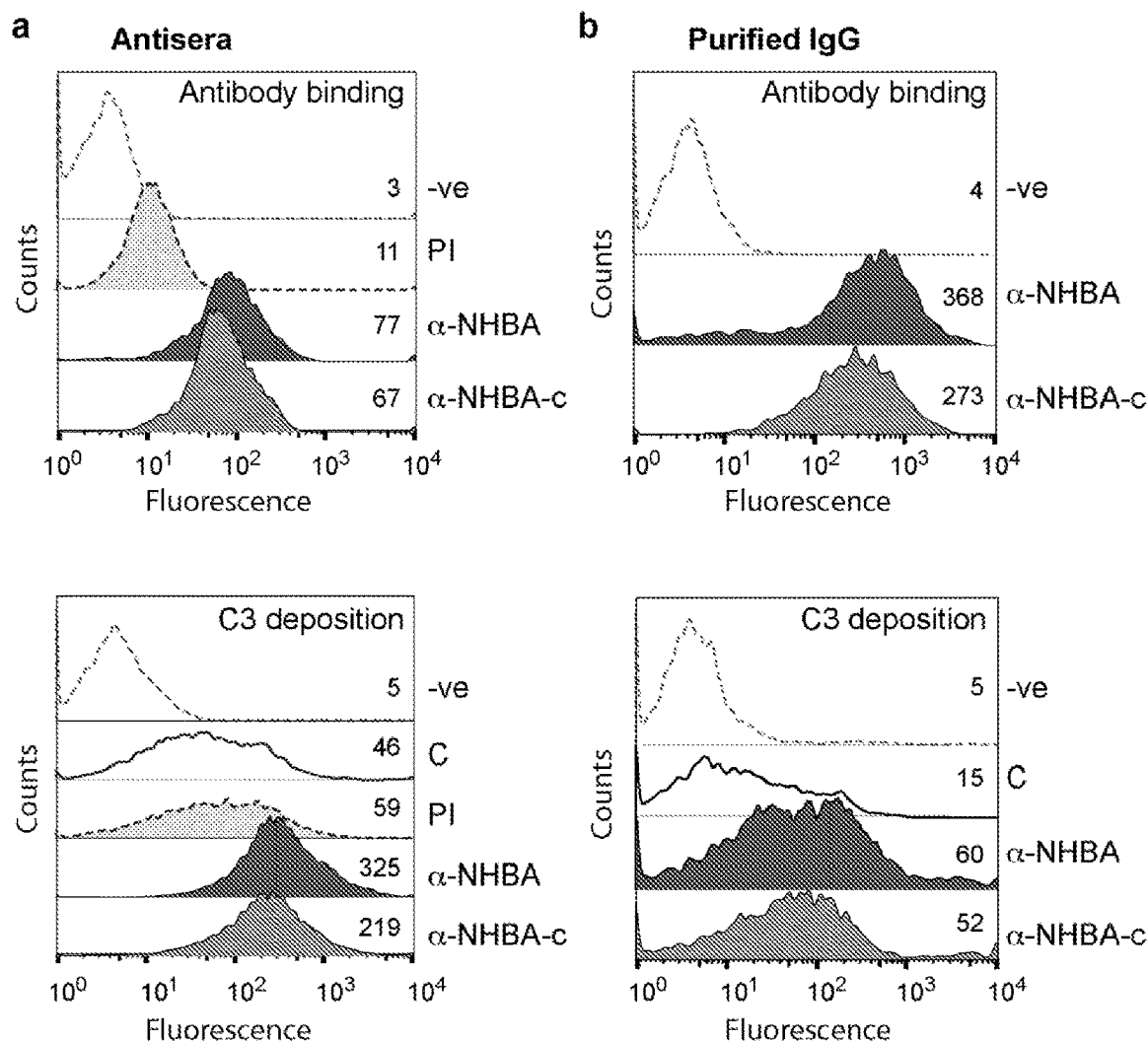
FIG. 3. Antibody binding and complement activation as measured by fragment deposition on *N. gonorrhoeae*. Flow cytometry of antibody binding and antibody-mediated C3-fragment deposition on the surface of *N. gonorrhoeae* 1291, in the presence of (a) polyclonal antisera or (b) purified IgG from mice immunised with either NHBA-Freund's or NHBA-c-Freund's. Values represent geometric mean fluorescence of antibody binding to *N. gonorrhoeae* cells and C3-fragment deposition. Secondary antibody only (−ve), pre-immune mouse sera (PI) and complement only (C) controls are included.

To investigate if NHBA antisera promote activation of the complement cascade, C3-fragment deposition onto the surface of *N. gonorrhoeae* was investigated using flow cytometry. NHBA-Freund's and NHBA-c-Freund's mouse sera, as well as purified NHBA-specific IgG from these sera was tested, all of which bind *N. gonorrhoeae* strain 1291 as evidenced by an increase in mean fluorescence intensity relative to the pre-immune sera or the control treated bacteria (FIG. 3A-B top panel). Bacteria incubated with human complement plus either the whole sera or purified IgG had markedly increased C3-fragment deposition, relative to the complement only control (7.1 and 5.2 fold increase, respectively, for NHBA; 4.8 and 4.7 fold increase, respectively, for NHBA-c; FIG. 3A-B bottom panel).

NHBA Antibodies have Bactericidal and Opsonophagocytic Activity

The ability of NHBA and NHBA-c antibodies to mediate complement-dependent lysis and opsonophagocytic killing of *N. gonorrhoeae* was tested using serum bactericidal activity (SBA) and opsonophagocytic killing (OPA) assays, respectively. Five gonococcal strains containing different NHBA variants and with variable NHBA expression levels were tested. For SBA assays, *N. gonorrhoeae* was incubated with NHBA or NHBA-c mouse sera before active source of human complement was added and bacterial survival measured. Both NHBA-Freund's and NHBA-c-Freund's sera elicited serum bactericidal activity in concentration dependent manner with SBA titers ranging from 100 to 1600 (compared to pre-immune sera titers<50) (FIG. 20A; Table 2). For OPA assays, *N. gonorrhoeae* opsonized with NHBA or NHBA-c antibodies and incubated in presence of human complement and human PMNs were killed in dose-dependent manner, with OPA titers ranging from 100 to 6,400 (compared to pre-immune sera titers<50) (FIG. 20B; Table 2). Sera raised to NHBA formulated with an adjuvant that is frequently used in human vaccines Alum (NHBA-c-Alum) also induced SBA and OPA killing of *N. gonorrhoeae*, with titres similar for those for those seen by NHBA-c-Freund's sera (FIG. 20A, B; Table 2). The purified NHBA immunoglobulins from mice immunised with NHBA-c-alum mediated concentration dependent SBA killing (FIG. 20C). Furthermore, no killing is seen in the NHBA-c-alum sera that has been depleted of anti-NHBA antibodies (FIG. 22), confirming the specificity of the immune response for NHBA.

Figure 6:
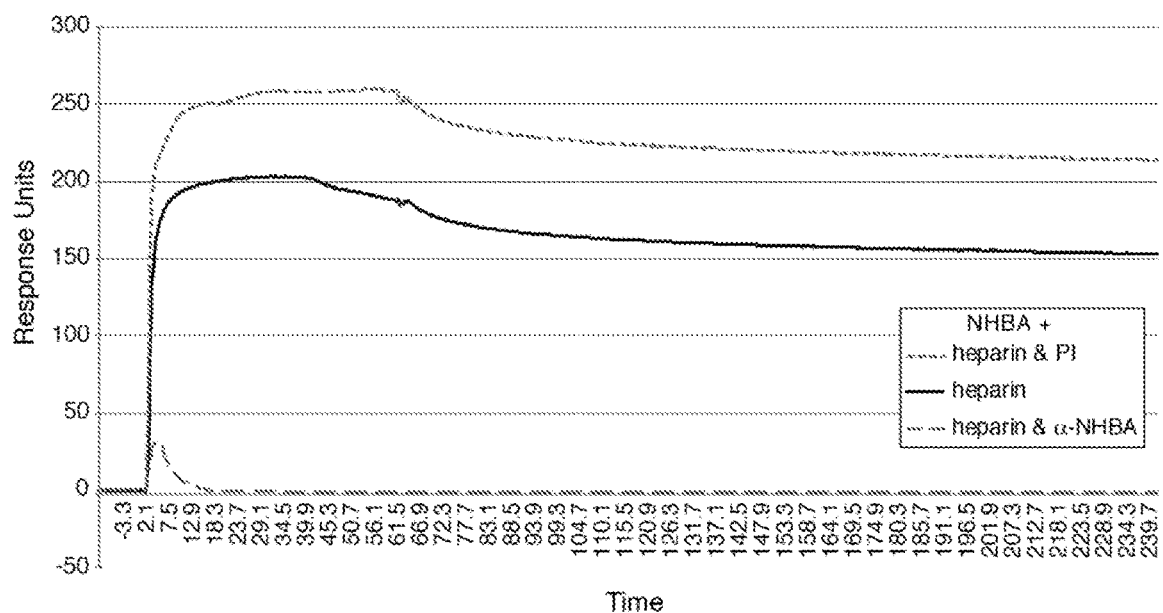
FIG. 6. Surface plasmon resonance (SPR) analysis of NHBA—heparin interactions. Representative sensorgrams of SPR analysis of recombinant NHBA binding to heparin in the presence of pre-immune sera (heparin & PI), no sera (heparin) or α-NHBA-Freund's post immune sera (heparin & α-NHBA). Response units are arbitrary units produced due to mass change on the sensor chip across time. Time is in seconds.

NHBA Antibodies Reduce NHBA Binding to Heparin, and Gonococcal Adherence to Host Cells To investigate whether NHBA and NHBA-c antisera can inhibit the functional role of NHBA, we conducted surface plasmon resonance (SPR) based competitive-binding experiments with recombinant NHBA and its predicted substrate heparin, in the presence and absence of NHBA antisera. In the absence of antisera, gonococcal NHBA binds heparin. Pre-immune serum had no effect on the ability of heparin to interact with NHBA, but serum from mice immunised with full length NHBA reduced heparin binding by 85.7% (P=0.0001) (FIG. 4A; FIG. 6). However, the NHBA-c serum was unable to significantly inhibit the interaction between heparin and NHBA (11% reduction in binding; P=0.1) (FIG. 4A; FIG. 6).

Figure 4:
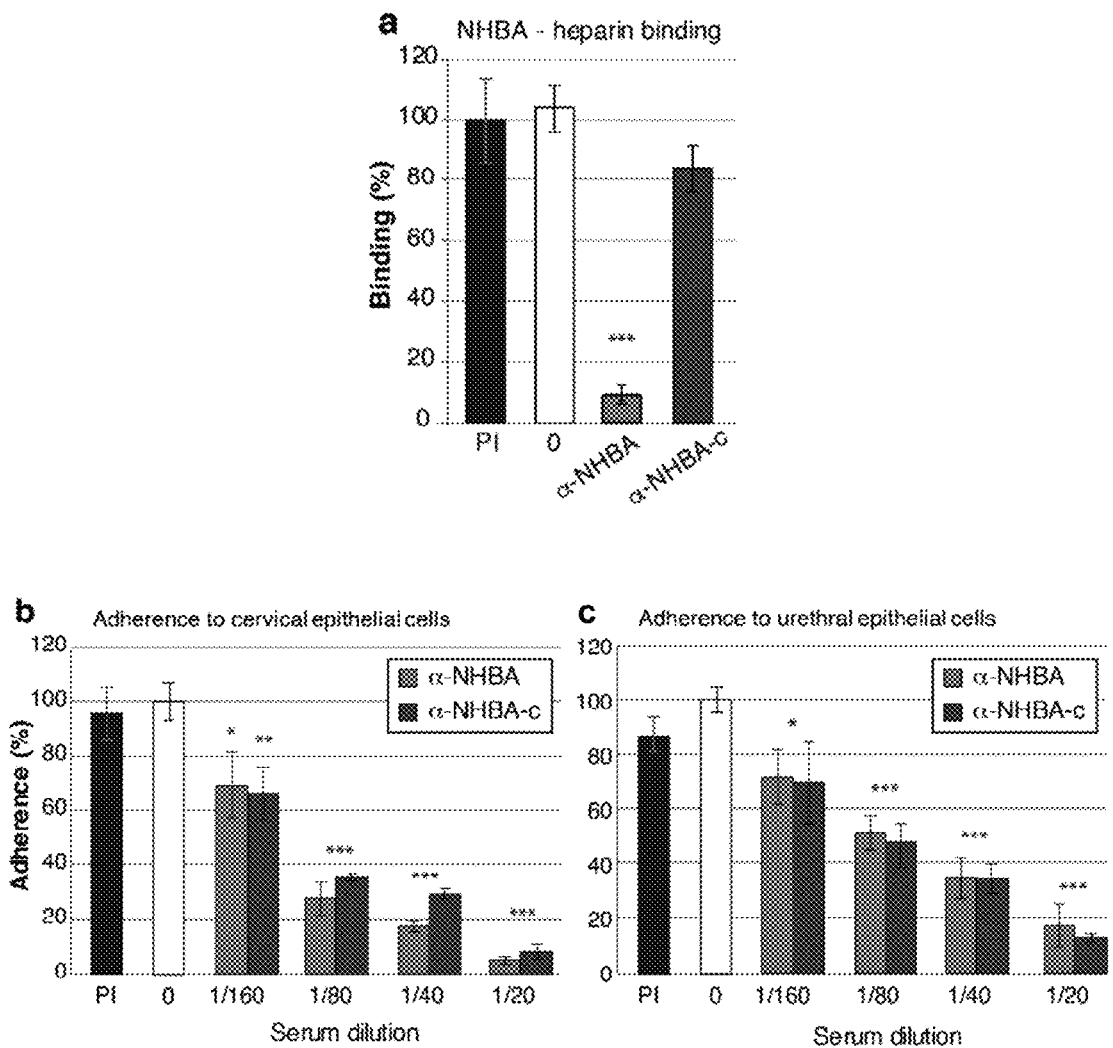
FIG. 4. Functional blocking activity of NHBA antisera against *N. gonorrhoeae*. (a) Blocking of NHBA-heparin interactions with α-NHBA antibodies. Surface plasmon resonance (SPR) analysis of NHBA-heparin interactions was performed in the absence of sera (0; white) or in the presence of pre-immune (PI; light grey), α-NHBA (medium gray) or α-NHBA-c (dark grey) sera. Data represents the mean NHBA-heparin binding (+/−1 standard deviation) for triplicate samples, as a percentage of binding in the absence of antibody (the no antibody control (white) set at 100%). (b-c) Blocking of *N. gonorrhoeae* adherence to epithelial cells. α-NHBA and α-NHBA-c serum-treated gonococci had significantly reduced adherence to (b) cervical and (c) urethral epithelial cells at all tested concentrations (p<0.05, calculated using a two-tailed Student's t-test) relative to the untreated control (0; white). Pre-immune sera (PI, light grey), did not affect bacterial adherence (p>0.05). Results are shown as average percentage of adherent bacteria from triplicate serum-treated samples relative to no antibody control (result for no antibody controls set at 100% are $4.33\pm0.31\times10^3$ and $1.37\pm0.061\times10^3$ adherent CFU for cervical and urethral cells, respectively). Error bars denote ±1 standard deviation. Experiments were performed twice with triplicate samples and representative results are shown.
Figure 5:
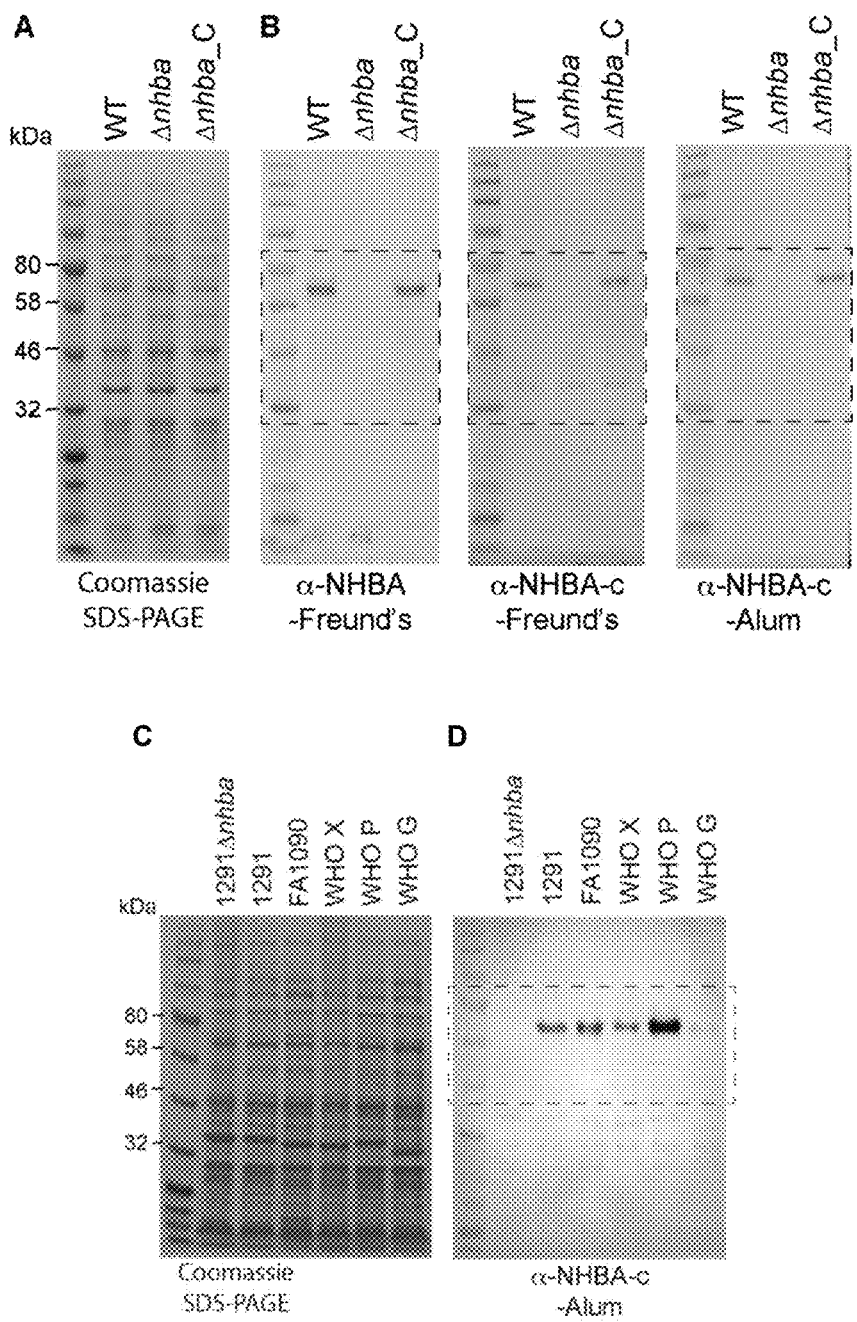
FIG. 5. Expression of NHBA in *N. gonorrhoeae*. (A) Coomassie stained SDS-PAGE and (B) Western blot analysis of whole cell lysates of *N. gonorrhoeae* 1291 wild type (WT), nhba::kan mutant (ΔNHBA), and complemented (ΔNHBA_C) strains, probed with α-NHBA antibodies as indicated below the blots. The region of the Western blot shown in FIG. 2A is boxed. (C) Coomassie stained SDS-PAGE and (D) Western blot analysis of whole cell lysates of a panel of *N. gonorrhoeae* strains. The region of the Western blot shown in FIG. 2B is boxed.

Gonococcal NHBA is a surface exposed [13] and likely to have similar adhesin function as meningococcal NHBA [18]. Therefore, we investigated whether NHBA and NHBA-c antisera can reduce gonococcal adherence to human cells. In vitro infection assays were performed with transformed cervical (tCX) and urethral (tUEC) epithelial cells with *N. gonorrhoeae* that was pre-incubated with antisera. NHBA and NHBA-c sera, but not the pre-immune sera, is able to reduce adherence to both tCX and tUEC in a concentration dependent manner, relative to the no antibody control. For example, a 1:20 dilution of NHBA sera decreases gonococcal adherence 19 and 6-fold in tCX and tUEC cells, respectively. Similarly, a 1:20 dilution of cNHBA antisera reduces bacterial adherence 8 and 5-fold in tCX and tUEC cells respectively (FIG. 4B-C).

Discussion

In light of the threat of antimicrobial resistant *N. gonorrhoeae*, there is an increasing need for the identification and characterization of potential vaccine candidates to aid development of a gonococcal vaccine. Here we characterize the gonococcal NHBA, and show that it is widely distributed and conserved in geographically and temporally diverse *N. gonorrhoeae* strains, and that antibodies raised to either the full length NHBA, or a C-terminal fragment of NHBA, mediate bactericidal and opsonophagocytic killing. These antibodies can also reduce adherence of *N. gonorrhoeae* to human epithelial cells and inhibit NHBA's glycan-binding activity. There is currently no known correlate of protection for N. gonorrhoeae (reviewed in [9]), however the ability of NHBA to elicit antibodies that are able to kill N. gonorrhoeae via two conventional immune killing mechanisms, as well as mediate functional blocking of an important stage in infection, supports its potential to be used in a gonococcal vaccine.

The gonococcal NHBA is highly conserved, with ≥97.5% amino acid identity in the N. gonorrhoeae strains investigated to date, and with the majority of strains expressing one of a limited number of NHBA variants (e.g., 70.3% expressing one of two main variants, 91.3% expressing one of seven variants). We also show that NHBA expression is variable between strains, even between strains expressing the same NHBA variant (e.g., WHO X and WHO P). However, we show that antisera raised to NHBA variant 542 (from N. gonorrhoeae strains 1291) was cross reactive and able to kill strains expressing homologous and heterologous NHBA variants and strains with high, medium and low NHBA expression. N. gonorrhoeae and N. meningitidis strains contain different predominant NHBA variants [13], however our findings are consistent with findings for NHBA of N. meningitidis where immune reactivity of antibodies to NHBA-2 (found in 4CMenB) was seen for 99.5% of strains circulating in the United States (442 strains), irrespective of their NHBA variant [26].

The NHBA and the NHBA-c fragment were immunogenic in mice when adjuvanted with either Freund's or aluminium hydroxide. Overall, an IgG1-dominant antibody response was elicited in all cases, although varying patterns of other isotypes and subclasses were seen for the different antigen and adjuvant combinations. Furthermore, although NHBA-c produced lower total IgG titres compared to the full length NHBA, it elicited similar or higher SBA and OPA titres against most strains in the panel investigated. Immunoglobulin isotypes and subclasses are known to differ in their ability to activate complement and mediate bactericidal and opsonophagocytic activity, although this ability varies between antigenic targets. For example, mouse antibodies targeting the N. meningitidis PorA antigen have a hierarchy of IgG3>>IgG2b>IgG2a>>IgG1 for serum bactericidal activity and IgG3>IgG2b=IgG2a>>IgG1 opsonophagocytic activity [27]. Similarly, mouse antibodies against the N. gonorrhoeae antigen MsrA/B have higher titers of IgG2a, IgG2b, and IgG3 when adjuvanted by Freund's compared to aluminium hydroxide, and the MsrA/B-Freund's antisera, but not MsrA/B-Alum antisera, mediated SBA and OPA killing of N. gonorrhoeae [28]. Our data suggest that IgG2a and IgG2b play a dominant role in the anti-NHBA SBA and OPA mediated killing of N. gonorrhoeae, as higher total levels of these antibodies were elicited by NHBA-c-Freund's compared to NHBA-Freund's. Furthermore, NHBA-c-Alum elicited IgG2b>IgG2a>IgG3 and mediated SBA and OPA against all five gonococcal strains tested. This is distinct from MsrA/B-Alum that did not elicit IgG2a, IgG2b, or IgG3 and anti-MsrA/B-Alum did not mediate killing of N. gonorrhoeae [28]. This difference in antibody levels and function may be antigen specific or may be associated with the different immunisation doses and schedules used in the different studies (NHBA, 25 μg days 0, 21, 28 and 42 vs MsrA/B 5 μg on days 0, 21, and 28).

Overall, we describe several key features of NHBA that support its use as an antigen in a gonococcal vaccine and highlight the potential to use the C-terminal fragment of NHBA as an optimized antigen that could be used alone, or as a fusion protein with another antigen.

Methods

Bacterial Strains and Growth Conditions

N. gonorrhoeae strains 1291, FA1090, WHO G, WHO P and WHO X were used in this study. N. gonorrhoeae was grown on GC agar (Oxoid) with 1% (v/v) IsoVitaleX (Becton Dickinson) at 37° C. or 32° C. with 5% $CO_2$. The majority of the gonococcal population used in assays were piliated and expressed opacity proteins as determined by visual inspection of colonies using phase contrast microscopy.

Sequence Analysis

Sequences were aligned with MacVector, and the percentage of amino acid identity and similarity were calculated (BLOSUM90, threshold 0). The Neighbor-joining phylogenetic tree (best tree, uncorrect ("p")) of NHBA variants was constructed with MacVector. The presence and conservation of nhba and the encoded NHBA protein between gonococcal strains was determined as at 19 Sep. 2019 using the Basic Local Alignment Search Tool program (BLAST) with nhba from N. gonorrhoeae 1291 (GenBank Accession EEH61857.1; genome locus tag NGAG_00725) against 594 gonococcal genomes in GenBank and 5652 N. gonorrhoeae isolates in Neisseria Multi Locus Sequence Typing website (PubMLST; https://pubmlst.org/neisseria/). Previously established PubMLST nomenclature for NHBA (encoded by NEIS2109) was used, where every unique peptide sequence is assigned a unique identification number (e.g., NHBA_peptide 2 [NHBA-2] is in 4CMenB and NHBA_peptide 542 [NHBA-542] is in N. gonorrhoeae strain 1291).

Construction of N. gonorrhoeae NHBA Mutant Strains

The N. gonorrhoeae 1291 nhba gene was amplified using 5'-ATGTTTAAACGCAGTGTGATTGC-3' (SEQ ID NO. 3) and 5'-TCAATCCCGATCTTTTTTGCCGGC-3' (SEQ ID NO. 4) primers and cloned into the pGEM-T Easy vector (Promega). A kanamycin resistance gene (pUC4Kan; Amersham Biosciences) was inserted into BamHI restriction site that was introduced into the middle of the nhba open reading frame using inverse PCR with 5'-ggatccCCGGCCGAGATTCCGCTGATTCC-3' (SEQ ID NO. 5) and 5'-ggatccGCGACCTCCTCGACCGTGCAGAAC-3' (SEQ ID NO. 6) primers (BamHI restriction enzyme sites introduced for subcloning of the kanamycin resistance gene into the nhba gene are shown in lower case). The nhba::kan construct was linearized with NcoI and transformed into N. gonorrhoeae 1291 to generate 1291 nhba::kan strain (ΔNHBA). The complemented strain (ΔNHBA_C) was generated by introducing the intact nhba gene (amplified using 5'-GGCATATGGCGGAAACAATA-3' (SEQ ID NO. 7) and 5'-TCAATCCCGATCTTTTTTGCCGGC-3' primers (SEQ ID NO. 8)) into the ΔNHBA strain using the complementation plasmid pCTS32 [29]. Successful deletion and subsequent complementation of the nhba gene was confirmed by PCR and Western blot.

Recombinant Protein Expression

Cloning and expression of the full length recombinant NHBA devoid of the predicted signal peptide was described previously [13]. For expression of the C-fragment of NHBA (NHBA-c), E. coli BL21 (DE3) was transformed with the pET19b plasmid containing cNHBA amplified from N. gonorrhoeae 1291 using primers 5'-ATTActcgagTCGCTTCCGGCCGAGATTCC-3' (SEQ ID NO. 9) and 5'-TGAAggatccCGGCATCAACATCAATC-3' (XhoI and BamHI sites are shown in lower case, in the respective primers) (SEQ ID NO. 10). Expression was induced by addition of 1 mM IPTG to $OD_{600}$ 0.4 culture and incubation at 20° C. for 24 hours. Protein was purified using TALON affinity resin (Clontech) as described previously [13].

Generation of Polyclonal Antibodies

Groups of five 3-week old female BALB/c mice (Animal Resources Center, W A, Australia) were immunized subcutaneously with 25 µg of recombinant protein with Freund's adjuvant (Merck) or with aluminium hydroxide (Alhydrogel; InvivoGen) on days 0, 21, 28 and 42. Terminal bleeds were collected on day 56 and serum collected via centrifugation. Pre-immune serum was collected from each mouse prior to immunization. This study was carried out in accordance with the recommendations of the Australian Code for the Care and Use of Animals for Scientific Purposes, and with approval from the Griffith University Animal Ethics Committee (AEC).

Polyclonal NHBA antibodies were purified from mouse sera using affinity chromatography with recombinant NHBA. NHBA was coupled to N-Hydroxysuccinimidyl-Sepharose® 4 Fast Flow (Merck) using manufacturer's instructions and incubated with mouse sera diluted ½ with PBS. Bound antibodies were eluted with 0.1M glycine buffer (pH 3.0). Eluted samples were buffer exchanged into PBS using Amicon-Ultra centrifugal spin unit (Merck). Antibody concentration determined with BCA (Thermo).

Enzyme-Linked Immunosorbent Assays (ELISAs)

ELISAs were performed in triplicate using 96-well MaxiSorp (NUNC) plates, coated with 100 ng of purified recombinant protein in 100 µl of coating buffer (0.5M carbonate/bicarbonate buffer, pH 9.6) for 1 h at room temperature, as described previously [13, 30, 31]. The ELISA titer is the highest serum dilution with absorbance at 450 nm greater than mean negative (all reagents excluding primary antibody)+3 standard deviations.

Serum Bactericidal Activity (SBA) and Opsonophagocytic Killing (OPA) Assays

SBA and OPA assays were performed as described previously [30, 31]. Briefly, approximately $1 \times 10^3$ colony forming units (CFU) of N. gonorrhoeae was incubated in serial dilutions of heat-inactivated (56° C., 60 min) anti-NHBA or pre-immune mouse sera for 15 min at 37° C. The SBA assay was initiated by adding the complement source (10% (v/v) normal human serum pre-absorbed with N. gonorrhoeae [30]) (FIG. 21), followed by incubation at 37° C., 5% $CO_2$ for 30 min. The OPA assay was initiated by adding the complement source and $\sim 1 \times 10^5$ polymorphonuclear leukocytes (PMNs), followed by incubation at 37° C., 5% $CO_2$ for 90 min. Serial dilutions of the contents of each well was plated on GC agar and grown overnight. The titer is the highest antibody dilution which induced more than 50% killing in the assay. Statistical analysis was performed using one-way analysis of variance (ANOVA) and two-tailed Student's t-test. Each experiment was performed three times, with triplicate samples in each experiment.

Flow Cytometry Analysis

Antibody binding to N. gonorrhoeae and C3 fragment deposition was measured using flow cytometry as described previously [28]. Briefly, N. gonorrhoeae 1291 ($\sim 1 \times 10^7$ CFU) was pre-incubated with 1:100 dilution of heat-inactivated mouse sera or 70 µg/mL of purified NHBA antibodies in HBSS+ (Hank's Balanced Salt Solution containing 0.15 mM $CaCl_2$) and 0.5 mM $MgCl_2$ and 1% BSA (w/v)). Antibody treated bacteria were washed and incubated with 1:200 dilution of Alexa Fluor 488 conjugated anti-mouse IgG (Thermo) or with 5% normal human serum pre-absorbed with N. gonorrhoeae for 15 min at 37° C., after which C3 fragments were detected by incubating bacteria with 1:200 dilution of FITC conjugated anti-human C3c antibody (BioRad). Data was acquired using CyAn ADP flow cytometer (Beckman Coulter) and analysed using FlowJo.

Surface Plasmon Resonance (SPR)

SPR competition assays were performed using a Pall Pioneer FE. Competition assays were performed as previously described [30] using NextStep injections in the OneStep assay builder. Pre- and post-immune NHBA mouse sera were used as the first injection (A), and heparin as the second injection (B). Binding of heparin (maximum OneStep concentration of 50 µM) to NHBA was compared with and without serum, and with 1:200 dilution of pre- or post-immune serum. Data was collected using the Pioneer Software package and analyzed using Qdat analysis software. The percentage blocking was calculated based on the relative RMax of the heparin injection without serum (Injection A=buffer; B=heparin) versus the serum subtracted (Injection A=pre/postimmune serum; B=buffer) binding of heparin in the presence of serum ((Injection A=pre/postimmune serum; B=heparin).

Epithelial Cell Adherence Assays

Gonococcal adherence assays were performed as described previously [31] with following modifications. Briefly, tCX and tUEC cell monolayers were infected (10 min at 37° C.) with approximately $1 \times 10^5$ CFU that was initially pre-incubated with serial dilutions of heat-inactivated mouse sera for 30 min at room temperature. Following the infection, cell monolayers were washed three times with warm HBSS to remove non-adherent bacteria and well contents plated onto GC agar. Results were calculated as the mean CFU from three replicate wells and presented as percentage of adherent bacteria relative to no antibody control. Statistical analysis performed with ANOVA and two-tailed Student's t-test. Each experiment was performed three times.

TABLE 1

Immunogenicity of gonococcal NHBA and NHBA-c.

| Sera | ELISA titre vs whole-cells ^ | | | ELISA titre vs recombinant NHBA | | | | | |
|---|---|---|---|---|---|---|---|---|---|
| | WT | ΔNHBA | ΔNHBA_C | Total IgG | IgG1 | IgG2a | IgG2b | IgG3 | IgM |
| NHBA-Freund's | 128,000 | 16,000 | 128,000 | 40,960,000 | 81,920,000 | 25,600 | 51,200 | 102,400 | 409,600 |
| NHBA-c-Freund's | 64,000 | 8,000 | 64,000 | 20,480,000 | 40,960,000 | 51,200 | 204,800 | 12,800 | 204,800 |
| NHBA-c-Alum | 32,000 | 4,000 | 32,000 | 10,240,000 | 40,960,000 | 25,600 | 51,200 | 6,400 | 102,400 |

^ Whole cell N. gonorrhoeae 1291 wild type (WT), nhba::kan mutant (ΔNHBA), and complemented (ΔNHBA_C) strains.

TABLE 2

Serum bactericidal and opsonophagocytic titers of NHBA and NHBA-c mouse sera against five gonococcal strains.

| Strain | NHBA variant | NHBA expression * | NHBA Freund's SBA | NHBA Freund's OPA | NHBA-c Freund's SBA | NHBA-c Freund's OPA | NHBA-c Alum SBA | NHBA-c Alum OPA |
|---|---|---|---|---|---|---|---|---|
| 1291 | 542 | ++ | 100 | 400 | 200 | 800 | 100 | 800 |
| FA1090 | 527 | +++ | 100 | 100 | 100 | 100 | 50 | 100 |
| WHO G | 543 | + | 200 | 200 | 200 | 400 | 100 | 100 |
| WHO X | 475 | ++ | 1600 | 6,400 | 1,600 | 6,400 | 1,600 | 3,200 |
| WHO P | 475 | ++++ | 200 | 800 | 200 | 800 | 200 | 400 |

* NHBA expression level as determined by visual inspection of Western blots with whole-cell lysates (see FIG. 2B). SBA, serum bactericidal activity titre; OPA, opsonophagocytic titre (reciprocal of the lowest antibody dilution which induced more than 50% killing). The titres of pre-immune sera against *N. gonorrhoeae* strains were <50 in SBA and OPA assays.

REFERENCES

1 Whiley, D. M., Jennison, A., Pearson, J. & Lahra, M. M. Genetic characterisation of *Neisseria gonorrhoeae* resistant to both ceftriaxone and azithromycin. *Lancet Infect Dis* 18, 717-718 (2018).
2 ECDC. Extensively drug-resistant (XDR) *Neisseria gonorrhoeae* in the United Kingdom and Australia. *European Centre for Disease Prevention and Control. Stockholm.* https://ecdc.europa.eu (2018).
3 WHO. *Global priority list of antibiotic-resistant bacteria to guide research, discovery, and development of new antibiotics*, <http://www.who.int/medicines/publications/global-priority-list-antibiotic-resistant-bacteria/en/> (2017).
4 CDC. *Antibiotic Resistance Threats in the United States*, 2013, <http://www.cdc.gov/drugresistance/threat-report-2013/pdf/ar-threats-2013-508.pdf>
5 Department of Health. Responding to the threat of antimicrobial resistance: Australia's First National Antimicrobial Resistance Strategy 2015-2019. (Department of Health, Australian Government, Canberra, 2015).
6 WHO. Global incidence and prevalence of selected curable sexually transmitted infections—2008. (World Health Organisation, 2012).
7 CDC. Sexually Transmitted Disease Surveillance 2017. https://www.cdc.gov/std/stats (2018).
8 Kirby Institute. HIV, viral hepatitis and sexually transmissible infections in Australia: annual surveillance report 2018. The Kirby Institute, UNSW Sydney. (2018).
9 Edwards, J. L., Jennings, M. P., Apicella, M. A. & Seib, K. L. Is gonococcal disease preventable? The importance of understanding immunity and pathogenesis in vaccine development. *Crit Rev Microbiol* 42, 928-941 (2016).
10 WHO. *Global incidence and prevalence of selected curable sexually transmitted infections*—2008, <http://www.who.int/reproductivehealth/publications/rtis/stisestimates/en/> (2012).
11 Rice, P. A., Shafer, W. M., Ram, S. & Jerse, A. E. *Neisseria gonorrhoeae*: Drug Resistance, Mouse Models, and Vaccine Development. *Annu Rev Microbiol* 71, 665-686 (2017).
12 Petousis-Harris, H. et al. Effectiveness of a group B outer membrane vesicle meningococcal vaccine against gonorrhoea in New Zealand: a retrospective case-control study. *Lancet* 390, 1603-1610 (2017).
13 Semchenko, E. A., Tan, A., Borrow, R. & Seib, K. L. The serogroup B meningococcal vaccine Bexsero elicits antibodies to *Neisseria gonorrhoeae*. *Clin Infect Dis* 69, 1101-1111(2018).
14 Serruto, D., Bottomley, M. J., Ram, S., Giuliani, M. M. & Rappuoli, R. The new multicomponent vaccine against meningococcal serogroup B, 4CMenB: immunological, functional and structural characterization of the antigens. *Vaccine* 30 Suppl 2, B87-97 (2012).
15 Esposito, V. et al. Structure of the C-terminal domain of Neisseria heparin binding antigen (NHBA), one of the main antigens of a novel vaccine against *Neisseria meningitidis*. *J Biol Chem* 286, 41767-41775 (2011).
16 Mubaiwa, T. D. et al. The Bexsero *Neisseria meningitidis* serogroup B vaccine antigen NHBA is a high-affinity chondroitin sulfate binding protein. *Scientific reports* 8, 6512 (2018).
17 Serruto, D. et al. *Neisseria meningitidis* GNA2132, a heparin-binding protein that induces protective immunity in humans. *Proc Natl Acad Sci USA* 107, 3770-3775 (2010).
18 Vacca, I. et al. Neisserial Heparin Binding Antigen (NHBA) Contributes to the Adhesion of *Neisseria meningitidis* to Human Epithelial Cells. *PLoS One* 11, e0162878 (2016).
19 Maritan, M. et al. Structures of NHBA elucidate a broadly conserved epitope identified by a vaccine induced antibody. *PLoS One* 13, e0201922 (2018).
20 Maritan, M. et al. Crystal structures of human Fabs targeting the Bexsero meningococcal vaccine antigen NHBA. *Acta Crystallogr F Struct Biol Commun* 73, 305-314 (2017).
21 Pizza, M. et al. Identification of vaccine candidates against serogroup B meningococcus by whole-genome sequencing. *Science* 287, 1816-1820 (2000).
22 Giuliani, M. M. et al. A universal vaccine for serogroup B meningococcus. *Proc Natl Acad Sci USA* 103, 10834-10839 (2006).
23 Welsch, J. A. et al. Antibody to genome-derived neisserial antigen 2132, a *Neisseria meningitidis* candidate vaccine, confers protection against bacteremia in the absence of complement-mediated bactericidal activity. *J Infect Dis* 188, 1730-1740 (2003).
24 Plested, J. S. & Granoff, D. M. Vaccine-induced opsonophagocytic immunity to *Neisseria meningitidis* group B. *Clin Vaccine Immunol* 15, 799-804 (2008).
25 Muzzi, A., Mora, M., Pizza, M., Rappuoli, R. & Donati, C. Conservation of meningococcal antigens in the genus *Neisseria*. *MBio* 4, e00163-00113 (2013).
26 Rajam, G. et al. Meningococcal Antigen Typing System (MATS)-Based *Neisseria meningitidis* Serogroup B Coverage Prediction for the MenB-4C Vaccine in the United States. *mSphere* 2 (2017).

27 Michaelsen, T. E., Kolberg, J., Aase, A., Herstad, T. K. & Hoiby, E. A. The four mouse IgG isotypes differ extensively in bactericidal and opsonophagocytic activity when reacting with the P1.16 epitope on the outer membrane PorA protein of *Neisseria meningitidis*. *Scand J Immunol* 59, 34-39 (2004).

28 Shaughnessy, J. et al. Human Factor H Domains 6 and 7 Fused to IgG1 Fc Are Immunotherapeutic against *Neisseria gonorrhoeae*. *J Immunol* 201, 2700-2709 (2018).

29 Steichen, C. T., Shao, J. Q., Ketterer, M. R. & Apicella, M. A. Gonococcal cervicitis: a role for biofilm in pathogenesis. *The Journal of infectious diseases* 198, 1856-1861 (2008).

30 Jen, F. E. C., Semchenko, E. A., Day, C. J., Seib, K. L. & Jennings, M. P. The *Neisseria gonorrhoeae* Methionine Sulfoxide Reductase (MsrA/B) Is a Surface Exposed, Immunogenic, Vaccine Candidate. *Frontiers in Immunology* 10 (2019).

31 Semchenko, E. A., Day, C. J. & Seib, K. L. MetQ of *Neisseria gonorrhoeae* Is a Surface-Expressed Antigen That Elicits Bactericidal and Functional Blocking Antibodies. *Infect Immun* 85 (2017).

Example 2

The Gonococcal Neisserial Heparin Binding Antigen (NHBA) is Involved in Microcolony Formation and Contributes to Serum Resistance and Adherence to Epithelial Cells The Neisseria heparin binding antigen (NHBA) is present in the four component meningococcal serogroup B vaccine (4CMenB, tradename Bexsero) licensed to protect against invasive disease caused by *Neisseria meningitidis* [9], which is closely related to *N. gonorrhoeae*. The gonococcal homologue of NHBA is surface exposed and highly conserved in *N. gonorrhoeae* strains (>93% identity), shares 67% identity [10] to the meningococcal NHBA variant 2 (NHBA-2) present in 4CMenB and is recognized by human sera from people vaccinated with 4CMenB [11].

The meningococcal NHBA has most extensively been studies in strain MC58 (expresses NHBA-3) and was named based on its ability to bind the glycosaminoglycan (GAG) heparin via an arginine-rich region (Arg-region), and NHBA binding to heparin increases meningococcal resistance to serum [12] and interactions with heparan sulfate mediates binding to epithelial cells [13]. NHBA binds several other glycans, with the highest affinity binding seen to chondroitin sulfate [14]. The meningococcal NHBA is the target of several proteases, including human lactoferrin [12], kallikrein [15] and C3-convertase [16], as well as meningococcal NalP [12]. NalP cleaves NHBA after the arginine rich region and it has been speculated that hypervirulent strains of *N. meningitidis* that express NalP release a NHBA fragment that increases vascular permeability [17]. NHBA-2 also has increased expression at lower temperatures (32 vs 37° C.) [18] and plays a role in biofilm formation [19]. The gonococcal NHBA has not yet been characterized, however *N. gonorrhoeae* does not express NalP [20], and its NHBA has a truncated Arg-region [10] indicating that it may play a different role in *N. gonorrhoeae* compared to *N. meningitidis*. In this Example, we examine the function of NHBA in *N. gonorrhoeae* in order to describe its role in pathogenesis and support its potential use as a gonococcal therapeutic target or vaccine candidate.

Methods

Sequence Analysis

NHBA sequences (*N. gonorrhoeae* 1291 Accession EEH61857.1; *N. meningitidis* MC58 AAF42586.1) were aligned with CLUSTAL in MacVector. PubMLST nomenclature for NHBA is used, where each unique peptide sequence is assigned an identification number (e.g., NHBA_peptide 542 [NHBA-542] is in *N. gonorrhoeae* 1291).

Growth and Phenotypic Characterization of *N. gonorrhoeae*

*N. gonorrhoeae* 1291 was cultured on GC agar (Oxoid) or GC broth with 1% (v/v) IsoVitaleX (Becton Dickinson) at 32 or 37° C. with 5% $CO_2$. Kanamycin (50 µg/mL) and spectinomycin (100 µg/mL) were used for knockout and complements strains, respectively. The majority of the gonococcal population were piliated and expressed opacity proteins as determined by phase contrast microscopy. Growth rate and agglutination experiments were performed in GC broth, measuring optical density at 600 nm ($OD_{600}$) hourly [21, 22]. SDS-PAGE and Western blot analysis also showed similar molecular weight and abundance of pilin (slightly less pilin in WT compared to ΔNHBA and ΔNHBA_C; FIG. 14B), major outer membrane proteins including Por and Opa (FIG. 14C), and lipooligosaccharide (LOS) (FIG. 14D) in these strains. Where indicated *N. gonorrhoeae* were trypsinised for 5 min in 0.25% trypsin for aggregation analysis.

Construction of *N. gonorrhoeae* NHBA Mutant Strain and Recombinant NHBA

The nhba gene (NGAG_00725) was amplified from *N. gonorrhoeae* strain 1291 (primers 5'-ATGTTTAAACGCAGTGTGATTGC-3' (SEQ ID NO. 3); 5'-TCAATCCCGATCTTTTTTGCCGGC-3' (SEQ ID NO. 4)) and cloned into pGEM-T Easy (Promega). A kanamycin resistance gene (pUC4Kan; Amersham Biosciences) was inserted into the BamHI site introduced into the middle of nhba using inverse PCR (primers 5'-<u>GGATCC</u>CCGGCCGAGATTCCGCTGATTCC-3' (SEQ ID NO. 5); 5'-<u>GGATCC</u>GCGACCTCCTCGACCGTGCAGAAC-3' (SEQ ID NO. 6); BamHI sites underlined). The nhba::kan construct was linearized and transformed into *N. gonorrhoeae* 1291 to generate nhba::kan (ΔNHBA). The complemented strain (ΔNHBA_C) was generated by introducing the intact nhba gene (primers 5'-GGCATATGGCGGAAACAATA-3' (SEQ ID NO. 7); 5'-TCAATCCCGATCTTTTTTGCCGGC-3' (SEQ ID NO. 8)) into the ΔNHBA using complementation plasmid pCTS32 [23]. Deletion and subsequent complementation of the nhba gene was confirmed by PCR and Western blot.

The *N. gonorrhoeae* 1291 nhba gene was cloned into pET19b in *E. coli* BL21, and the full length mature NHBA (no signal sequence) recombinant protein was expressed and purified as described previously [11].

Generation of Polyclonal Anti-NHBA

Groups of five 3-week old female BALB/c mice (Animal Resources Center, Western Australia) were immunized subcutaneously with 25 µg of recombinant NHBA with Freund's adjuvant (Merck) on days 0, 21, 28 and 42. Terminal bleeds were collected on day 56 and serum collected via centrifugation. This study was approved by the Griffith University Animal Ethics Committee.

Western Blot, ELISA and Flow Cytometry

Western blot analysis of NHBA expression from *N. gonorrhoeae* whole-cell lysates (resolved using 4-12% Bis-Tris SDS-PAGE (Thermo)) was performed as described previously with mouse anti-NHBA. Rabbit anti-NGAG_01228 was used to detect the periplasmic protein as described previously [24].

ELISA analysis of His-tagged recombinant NHBA binding to whole-cell N. gonorrhoeae was measured by after 30 minute incubation at room temperature using HRP-conjugated His-tag antibody (Thermo) as per standard protocols [11, 25].

NHBA expression on the surface of N. gonorrhoeae was measured by flow cytometry (as described previously [24, 26]) with bacteria (~$10^8$ CFU) incubated with anti-NHBA (1:200, 30 minutes), washed three times with PBS, incubated with Alexa Fluor 488 conjugated anti-mouse IgG (1:200, 1 hour; Thermo), washed, then fixed in formaldehyde (2.5%, 15 minutes). Binding of FITC-labelled gonococcal NHBA (100 µg/mL) to N. gonorrhoeae (~$10^7$ CFU) or human tCX and tUEC cells (~$5 \times 10^5$ cells) was measured after incubation for 20 minutes at 37° C. All samples were analysed using CyAn ADP flow cytometer (Beckman Coulter). Data analysis was performed using FlowJo.

Microscopy

Fluorescent microscopy was used to measure interaction of gonococcal NHBA (100 µg/mL) incubated with tCX cells (cultured on glass coverslips to full confluence) at 37° C. for 20 minutes. Cells were washed three times to remove unbound proteins and fixed in formaldehyde (2.5%, 15 minutes). NHBA$_{Ng}$ was detected using anti-NHBA (1:1000) [11] and Alexa Fluor 488 conjugated anti-mouse IgG (1:200; Thermo). Cells were counterstained with Alexa Fluor 568 Phalloidin (Thermo) and DAPI nucleic. Glass coverslips were mounted on microscope slides using ProLong Gold Antifade Mountant (Thermo), images captured on a Nikon MR confocal microscope and data analysed using NIS-Elements (Nikon).

Gonococcal microcolony formation was investigated using tUEC cells incubated with ~$1 \times 10^6$ CFU of N. gonorrhoeae at 37° C. for 5 hours. Cell monolayers were washed with three times (HBSS) to remove non-adherent bacteria, fixed in 2% glutaraldehyde and 5% formaldehyde solution for 30 minutes, and scanning electron microscopy performed as described previously [27] with images captured using a JCM-5000 NeoScope™ (JEOL).

Glycan Binding Analysis

Glycan array experiments were performed with recombinant NHBA (1 µg) and Institute for Glycomics glycan array (v3.0) as described previously [14, 28]. Positive binding was assigned to spots with average fluorescence>1-fold above the adjusted background (average of slide background+3 standard deviations) in three independent replicates (Student's t-test p<0.001).

Surface plasmon resonance (SPR) was performed using a BIAcore T200 instrument with recombinant NHBA$_{Ng}$ (100 µg/ml) immobilized on flow cells 2-4 by amine coupling on series S CMS sensor chips (GE Healthcare) as described previously [14, 25]. Flow cell 1 was used as the reference cell and immobilized with ethanolamine only. Single cycle kinetics was used to calculate the affinity ($K_D$) of interactions with glycans run in 1:5 dilution series at concentrations between 100 µM to 1 nM. Results were analysed using BIAcore T200 software 2.0.2.

Normal Human Serum (NHS) Survival Assays

Resistance of N. gonorrhoeae to serum-mediated killing was tested as described previously [24] with ~$10^4$ CFU incubated in 10% (v/v) for 60 minutes at 37° C. and subsequently plated on GC agar. Bacteria were pre-incubated with 6 µM heparin 30 minutes where indicated. Bacterial survival was calculated as percent CFU (average from three replicate wells) relative to no treatment control.

Adherence Assays

Gonococcal adherence assays were performed with E6/E7 transformed primary human cervical (tCX) and urethral epithelial (tUEC) cells with ~$10^5$ CFU for 1 hour as described previously [26]. Adherence blocking assays were performed similarly in cells pre-treated with recombinant gonococcal NHBA (1-100 µg/mL) or peanut agglutinin lectin (PNA 100 µg/ml; a negative control that does not bind tCX cells [26]), before being infected with N. gonorrhoeae for 10 minutes. Results are reported as percent adherent bacteria (average from three replicate wells) relative to wild type and adherence blocking calculated as percent of adherent bacteria relative to no treatment control. Adherence and serum survival assays were performed in triplicate on three separate occasions and statistical analysis performed with ANOVA and Student's t-test.

Results

Sequence Features and Expression of Gonococcal NHBA

Figure 7:
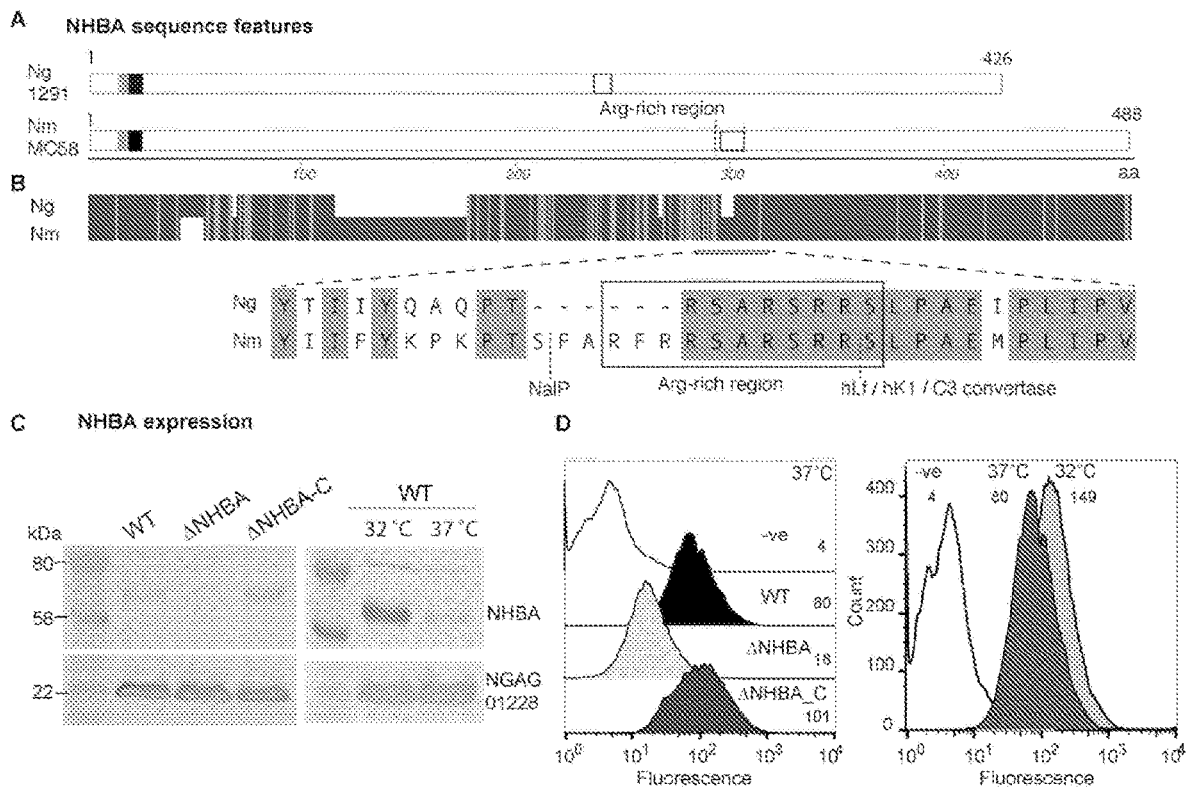
FIG. 7. NHBA sequence features and expression. (A) A schematic of *Neisseria gonorrhoeae* (Ng) strain 1291 NHBA and *Neisseria meningitidis* (Nm) strain MC58 NHBA proteins is shown, with the lipobox motif (grey box) and glycine stretch (black box) shown in the N-terminal, and the arginine rich region (white box) shown in the central region of NHBA. The amino acid (aa) length of each protein is shown on the right. (B) The Ng and Nm NHBA proteins were aligned using ClustalW in MacVector, and identical amino acids are shown as dark grey vertical lines, mismatches are shown as light grey lines, and gaps are shown as white. The amino acid sequences of the arginine rich region in the Ng and Nm NHBA proteins (boxed) and its flanking sequences are shown, with identical amino acids shaded gray and mismatches shown in white. The cleavage site of the meningococcal NalP upstream of the Arg-rich region, and human lactoferrin (hLf), kallikrein (hKl) and C3 convertase are shown. (C) Western blot of whole-cell lysates of the *N. gonorrhoeae* 1291 wild type (WT), NHBA knockout (ΔNHBA), and complemented (ΔNHBA_C) strains grown at 3TC, using polyclonal anti-NHBA antibodies. Upregulation of NHBA expression in the WT grown at 32° C. vs 37° C. is also shown. The periplasmic protein NGAG_01228 is shown as a loading control. (D) Flow cytometry of whole cells of *N. gonorrhoeae* WT, ΔNHBA and ΔNHBA_C strains grown at 32° C. and 37° C. with the expression of NHBA on the cell surface being confirmed using polyclonal anti-NHBA antibody. The negative (−ve) control is WT with secondary antibody only. Values represent geometric mean fluorescence.

The main NHBA variant expressed by N. gonorrhoeae strains is NHBA-542, which is present in >40% of gonococcal isolates in the PubMLST database, including strain 1291 [11]. NHBA-542 (referred to herein as NHBA$_{Ng}$) is 426 amino acids long, and contains similar sequence features to those that have been described in the well characterised NHBA-3 from N. meningitidis strain MC58 (referred to herein as NHBA$_{Nm}$), including a lipobox motif and a poly glycine stretch in the N-terminal and an arginine rich region in the central region of the protein (FIG. 7A). However, there are several differences between NHBA$_{Ng}$ and NHBA$_{Nm}$ due to insertions/deletions (FIG. 7B). The N-terminal half of the gonococcal nhba gene has a 63 amino acid deletion compared to NHBA-3, and this is consistent in the major gonococcal variants (FIG. 13). The Arg-region of NHBA$_{Ng}$ is truncated compared to NHBA$_{Nm}$. This region is highly conserved between Nm strains and between the major Ng NHBA variants (FIG. 13; variant shown are present in 94% of 3068 isolates [11]).

To facilitate characterisation of the gonococcal NHBA, a recombinant His-tagged protein (NHBA-542) was generated in E. coli and polyclonal anti-NHBA antibodies were raised in mice. In addition, an isogenic mutant of NHBA was generated by insertion of a kanamycin resistance cassette into the open reading frame of the nhba gene in N. gonorrhoeae strain 1291 (ΔNHBA) and this mutant was complemented by reintroducing a single copy of the nhba gene into the genome in trans (ΔNHBA_C). Western blot analysis of whole-cell lysates confirmed expression of NHBA in the wild-type strain, with a single band detected between 58-80 kDa by anti-NHBA sera. The complemented strain expressed similar levels of NHBA as the wild type, while no NHBA expression was detected in the mutant strain (FIG. 7C; FIG. 13). NHBA was also detected on the surface of the whole cell N. gonorrhoeae WT and ΔNHBA_C strains by flow cytometry (FIG. 7C). Growth of N. gonorrhoeae strains to mid log at 32° C. and 37° C. revealed that the expression of the gonococcal NHBA is temperature regulated, with higher expression seen at lower temperatures (FIGS. 7B & C, FIG. 14).

Gonococcal NHBA is Involved in Cell Aggregation and Microcolony Formation

Figure 8:
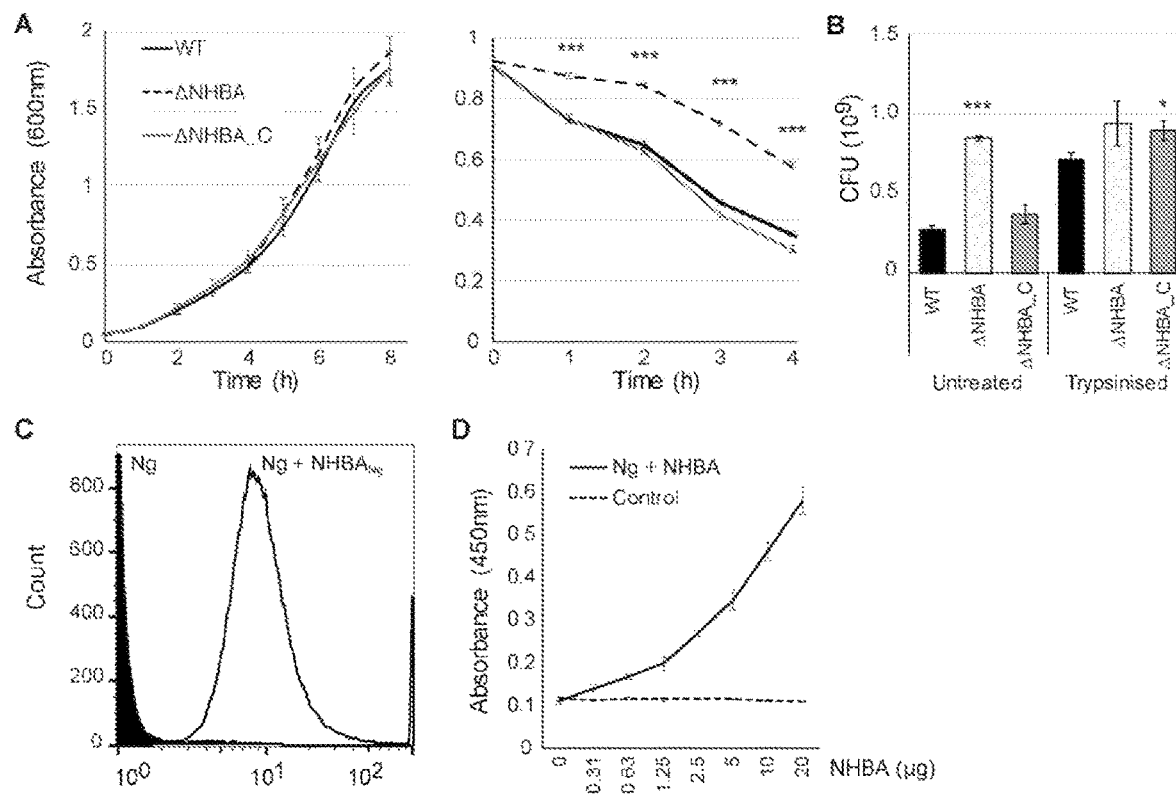
FIG. 8. Gonococcal NHBA is involved in cell aggregation. (A) Growth and settling curves of *N. gonorrhoeae* 1291 wild type (WT), NHBA knockout (ΔNHBA), and complemented (ΔNHBA_C) strains in GC broth, with absorbance measured at an optical density of 600 nm. (B) *N. gonorrhoeae* colony forming units (CFU) per mL of $OD_{600}$ 1 culture before and after trypsinisation. The countable CFU of WT and ΔNHBA_C strains increased 2.6 and 2.4-fold, respectively, after trypsin treatment (p=$8.1\times10^{-5}$ and $5.1\times10^{-4}$), whereas ΔNHBA CFU was not affected (p=0.31). For A & B; *P<0.05, P<0.01, *P<0.001 relative to WT. (C) Flow cytometric analysis of recombinant $NHBA_{Ng}$ binding to whole-cell *N. gonorrhoeae* (Ng) (black—Ng only; white—Ng+labelled $NHBA_{Ng}$). (D) Whole-cell ELISA titration curve showing binding of $NHBA_{Ng}$ to *N. gonorrhoeae* (black line). The antibody only control curve (dotted line) indicates absence of nonspecific interactions between whole-cell *N. gonorrhoeae* and the His-tag antibody.

To investigate the role of NHBA$_{Ng}$ in growth in vitro, the N. gonorrhoeae strain 1291 wild type, ΔNHBA and ΔNHBA_C strains were grown with GC broth and agar. All strains had equivalent growth rates and maximal growth levels in terms of optical density, however the ΔNHBA mutant strain had significantly reduced settling rates compared to the WT and ΔNHBA_C strains (FIG. 8A). Furthermore, when optical density equalised samples ($OD_{600}$=1) were plated onto GC agar, there were approximately three-fold higher numbers of viable CFU for the ΔNHBA strain compared to the WT or the ΔNHBA_C strains (FIG. 8B). Treatment of these samples with trypsin resulted in equalised CFU counts for all three strains (WT and ΔNHBA_C countable CFU increased 2.6 and 2.4-fold, respectively, whereas ΔNHBA CFU was not affected) (FIG. 8B), indicating the phenotype was due to cell aggregation rather than a defect in cell separation. Gram stain analysis of the three stains plus/minus trypsin treatment confirmed the presence of cell aggregates in the untreated WT and ΔNHBA_C strains (FIG. 15A). Furthermore, Western blot analysis indicated that trypsin treatment digested NHBA from the bacteria surface but did not alter a periplasmic control protein (FIG. 15B). Following this finding, the volume of ΔNHBA sample used in subsequent experiments was adjusted to equalise the CFU numbers. Gonococcal pili and opacity proteins have been previously implicated in formation of bacterial aggregates and phase contrast microscopy confirmed the WT, ΔNHBA and ΔNHBA_C strains shared identical colony morphology in terms of piliation and opacity.

To determine if $NHBA_{Ng}$ directly interacts with the gonococcal surface to facilitate aggregation, we used flow cytometry and ELISA with recombinant $NHBA_{Ng}$. Flow cytometry analysis showed binding of the FITC-labelled recombinant $NHBA_{Ng}$ to whole-cell N. gonorrhoeae (FIG. 8C). This was confirmed using whole-cell ELISAs where recombinant $NHBA_{Ng}$ bound N. gonorrhoeae in concentration dependent manner (FIG. 8D).

Figure 9:
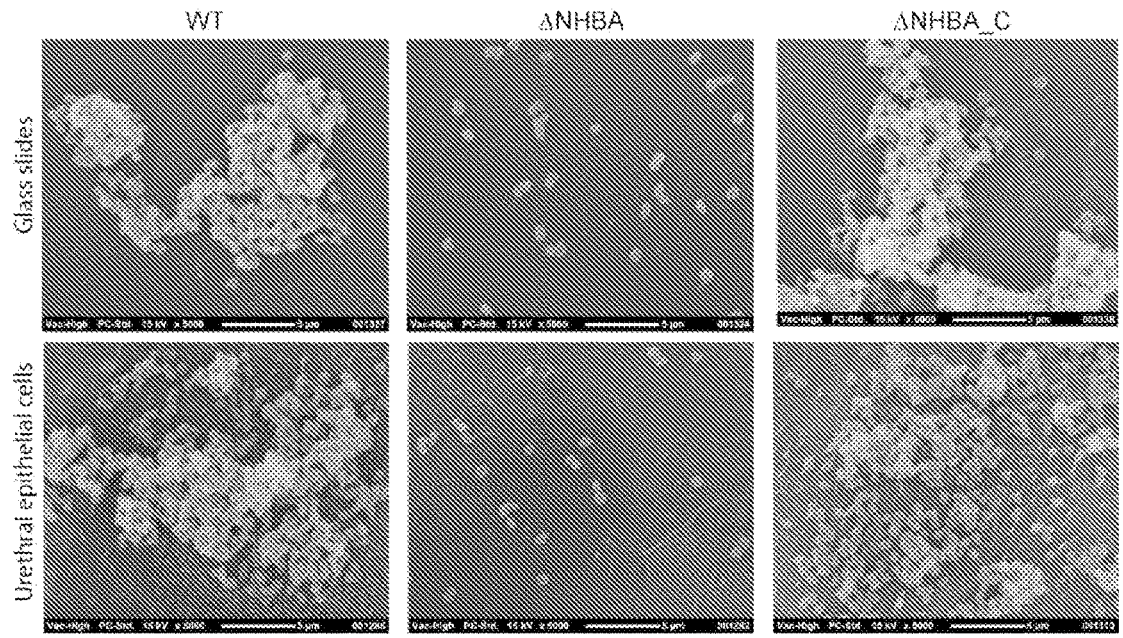
FIG. 9. Gonococcal NHBA is involved in microcolony formation. Scanning electron microscopy of *N. gonorrhoeae* 1291 wild type (WT), NHBA knockout (ΔNHBA), and complemented (ΔNHBA_C) strains grown for 5 hours on glass sides (top panel) or on human urethral epithelial cell monolayers on glass slides (bottom panel). Aggregates and microcolonies can be seen for the WT and ΔNHBA_C strains, while the ΔNHBA strain is seen as single colonies or diplococci. Images were acquired at a magnification is 5,000 and the scale bar at the bottom of each box represents 5 μm.

To further study the role of NHBA in bacteria-bacteria interactions and in the formation of gonococcal aggregates, we examined the ability ΔNHBA to form microcolonies. Unlike the WT or ΔNHBA_C strains, the ΔNHBA strain was unable to form microcolonies on the surface of glass coverslip slides or human urethral epithelial monolayers after 5 hour growth (FIG. 9). Biofilm assays were also performed to investigate whether the self-association properties of $NHBA_{Ng}$ play a role in establishment of gonococcal biofilm. However, under static conditions over 24-26 hr, no difference in biofilm formation was observed for the WT, ΔNHBA and ΔNHBA_C strains (data not shown).

$NHBA_{Ng}$ Binds to Several Glycans with High Affinity

The glycan-binding profile of the gonococcal NHBA was determined using glycan array analysis with arrays that display 368 structures that are representative of glycans found on human cells (including isomers and/or glycans that have similar structure, but differ in chain length, chemical linkage or spacer size). $NHBA_{Ng}$ bound to 39 glycan structures on the array (FIG. 16; Table 4), including the GAGs heparin, heparan sulfate and chondroitin sulfate. $NHBA_{Ng}$ also bound multiple structures that contain a lacto-N-biose and N-acetyllactosamine core structure (i.e., LNnT) including their sialylated and fucosylated variants (i.e., sLeX), as well as a limited set of N-acetylglucosamine, N-acetylgalactosamine, glucosyl and mannosyl glycans.

Figure 10:
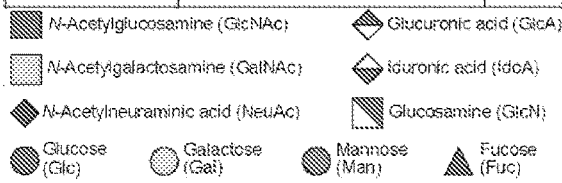
FIG. 10. Gonococcal NHBA binds to several glycans with high affinity. Surface plasmon resonance (SPR) analysis of $NHBA_{Ng}$ binding to (A) glycosylaminoglycans (GAGs) and (B) non-GAG glycans. The name, structure and sulfation patterns (S) of each glycan is shown, along with the dissociation constant ($K_D$) of $NHBA_{Ng}$ binding to each glycan. *

To characterise the kinetics of recombinant $NHBA_{Ng}$ interactions with glycans, SPR analysis was performed using selected GAGs (FIG. 10A) and non-GAG glycans (FIG. 10B) that were bound on array. The highest calculated affinity of all tested $NHBA_{Ng}$-glycan interactions was with heparin ($K_D$ 4.4 nM), followed by chondroitin sulfate ($K_D$ 73 nM). GAG structures are highly heterogeneous, comprising of repeating polysaccharides with various sulfation patterns. To determine whether $NHBA_{Ng}$ preferentially binds glycans with specific sulfation configuration we performed experiments with three types of chondroitin sulfate (A, B and C). $NHBA_{Ng}$ only bound chondroitin sulfate C (chondroitin 6-sulfate) and no concentration dependent binding observed for chondroitin sulfate A (chondroitin 4-sulfate) or chondroitin sulfate B (dermatan sulfate). We also show that $NHBA_{Ng}$ binds heparan sulfate, however with lower affinity ($K_D$ 2.79 μM). In terms of non-GAG glycans, $NHBA_{Ng}$ binds α2-6 sialylated pentasaccharide—LSTc ($K_D$ 0.24 μM) with higher affinity than its isomer LSTb ($K_D$ 2.26 μM), and a non-sialylated variant of LNnT ($K_D$ 4.89 μM). Furthermore, $NHBA_{Ng}$ has 5-fold greater affinity for Lewis X ($K_D$ 0.68 μM) than for sialyl Lewis X ($K_D$ 3.65 μM). No concentration dependent binding was observed for hyaluronan (a non-sulfated GAG) or H-disaccharide, which were not bound by $NHBA_{Ng}$ on the glycan array and were used as negative controls.

The Gonococcal NHBA Binds to Epithelial Cells $NHBA_{Nm}$ binds to epithelial cells through its Arg-region via interactions with heparan sulfate proteoglycans [13]. To investigate if $NHBA_{Ng}$ also interacts with epithelial cells Confocal microscopy and flow cytometry analysis were performed with recombinant $NHBA_{Ng}$ and cervical and urethral epithelial cells. For confocal microscopy, recombinant $NHBA_{Ng}$ ($rNHBA_{Ng}$) was incubated with human cervical epithelial (tCX) cells and detected using mouse anti-NHBA primary and Alexa Flour 488 secondary antibodies. Binding of $NHBA_{Ng}$ to tCX cells was observed (white arrow FIG. 11A (I)) with the protein signal localised to the surface of cells (white arrow FIG. 11A (II)). No nonspecific binding of the primary antibody (FIG. 11A (III)) or secondary antibody (FIG. 11A IV). to tCX cells was observed. Flow cytometric analysis further confirmed that $NHBA_{Ng}$ binds both cervical and urethral epithelial cells (FIG. 11B).

NHBA Contributes to Gonococcal Serum Survival and Adherence to Epithelial Cells

To investigate the functional role of $NHBA_{Ng}$ interactions of glycans, gonococcal cells and human epithelial cells, we conducted serum survival and epithelial cell adherence assays. Serum survival assays performed with the WT, ΔNHBA and the ΔNHBA_C strains in 10% of normal human serum (sub lethal serum concentration for the WT strain) indicated that the ΔNHBA strain had approximately 5-fold reduced survival relative to the WT and ΔNHBA_C strains (FIG. 12A). Pre-treatment of gonococci with heparin prior to exposure to human serum increased survival of the ΔNHBA mutant strain to a level comparable to that of the WT and ΔNHBA_C strains. N. gonorrhoeae expressed several proteins that interact with heparin (e.g., Opa [29]), which may have led to the restoration of serum resistance in the ΔNHBA strain.

To investigate the role of $NHBA_{Ng}$ in N. gonorrhoeae infection we conducted in vitro infection assays with human cervical and urethral epithelial cells and the WT, ΔNHBA and the ΔNHBA_C strains. For infection assays with epithelial cells, the ΔNHBA mutant had 11-fold and 12-fold reduced adherence of tCX cells and tUEC cells, respectively, relative to the WT (FIG. 12B). We also conducted adherence assays with cells that were pre-treated with either recombinant $NHBA_{Ng}$ or negative control protein PNA. Gonococcal adherence to $NHBA_{Ng}$-treated cells was reduced in concentration dependent manner (i.e., 2.5 and 1.7-fold with 100 and 10 μg/mL of $NHBA_{Ng}$ respectively) while treatment of cells with 100 μg/mL PNA, a negative control that does not bind these cells, had no effect on bacterial adherence (FIG. 12C).

Discussion

The sexually transmitted infection gonorrhoea is a growing public health concern due to rising rates of infection and increasing antimicrobial resistance. *N. gonorrhoeae* primarily colonizes mucosal surfaces, and gonococcal transmission, colonisation and pathogenesis are complex, multifactorial processes [reviewed in 30]. An increased understanding of all stages of gonococcal infections is required to aid development of new treatment and prevention strategies. In this study, we characterise the gonococcal NHBA in terms of its interactions with glycans, *N. gonorrhoeae* and human epithelial cells, and highlight its involvement in microcolony formation, resistance to human serum, and adherence to epithelial cells.

NHBA was first identified in *N. meningitidis* via reverse vaccinology as part of the development of the meningococcal serogroup B vaccine 4CMenB [31, 32] and its functional role has since been characterised in detail [12-16]. Despite a relatively high level of sequence identity between the gonococcal and meningococcal NHBA proteins (~67% identity [11]), there are several differences between the NHBA sequences and the conditions encountered by the two pathogenic *Neisseria* species that prompted a detailed analysis of NHBA in *N. gonorrhoeae*. NHBA is more conserved in *N. gonorrhoeae* than in *N. meningitidis* [11], and here we confirm that the 63 amino acid deletion in the N-terminus and the truncated Arg-region in *N. gonorrhoeae* are conserved in all major gonococcal NHBA variants. As such, data presented here is likely representative of the role of NHBA in majority of *N. gonorrhoeae* strains.

In our glycan array analysis, the recombinant $NHBA_{Ng}$ bound to 39 glycans including several GAGs such as heparin, heparan sulfate and chondroitin sulfate. We previously showed that $NHBA_{Nm}$ interacts with 28 glycans [14], and our SPR analysis confirmed that $NHBA_{Ng}$ and $NHBA_{Nm}$ bind at least 4 glycans in common (heparin, heparan sulfate, chondroitin sulfate, Glc-6P), however a key difference between the proteins is that $NHBA_{Ng}$ has higher binding affinity for heparin, and lower affinity for chondroitin sulfate and glucose 6-phosphate than $NHBA_{Nm}$. This is likely due to differences in the Arg-region, known to be involved in $NHBA_{Nm}$ binding to GAGS [12, 13]. Furthermore, Ng $NHBA_{Ng}$ but not $NHBA_{Nm}$ interacts with Lewis X and sialyl Lewis X antigens, lacto N-neotetraose (LNnT) and its sialylated variants on the glycan array, which can be typically found on the surface of host cells. Meningococcal cleavage of $NHBA_{Nm}$ by NalP releases a C-terminal fragment called C2 [12], that contains the Arg-rich region and increases vascular permeability [17]. Additionally, human proteases lactoferrin and kallikrein cleave $NHBA_{Nm}$ downstream of the Arg-region [12, 15], and the serum C3 convertase can cleave released NHBA C2 fragment, removing the Arg-region and negating protein's toxic effect on cells [16]. Since *N. gonorrhoeae* does not have a nalP gene [20], $NHBA_{Ng}$ would not be cleaved upstream of the Arg-region. $NHBA_{Ng}$ is not cleaved by human lactoferrin (data not shown) and cleavage by kallikrein and C3 convertase have not been investigated. However, due to the absence of NalP, even if $NHBA_{Ng}$ is cleaved by these human enzymes, the functional Arg-region would remain attached to the gonococcal surface where it can mediate its roles associated with glycan binding.

The gonococcal ΔNHBA mutant strain displayed several phenotypes relative to the WT and ΔNHBA_C strains, including decreased survival in human serum, decreased aggregation and microcolony formation, as well as decreased adherence to cervical and urethral epithelial cells. Although *N. gonorrhoeae* rarely causes disseminated disease, its ability to resist serum killing has been extensively studied and found to be mediated by factors including porin [30-32], LOS [33] and Opa [28], and is relevant during mucosal infections as serum and complement factors are present in the genital tract and other mucosal surfaces [34-36]. $NHBA_{Nm}$ is also involved in serum survival, with addition of heparin prior to the serum assay resulting in increased survival of the serum sensitive, unencapsulated parent meningococcal strain but not the ΔNHBA mutant strain [12]. Heparin interacts with several complement factors [37] and heparin-mediated recruitment of complement regulatory proteins by $NHBA_{Nm}$ was proposed to be the mechanism of action for serum resistance [12]. We propose a similar mechanism of action for $NHBA_{Ng}$ involving a higher level of recruitment of complement regulatory proteins to the surface of the WT strain relative to the ΔNHBA mutant. Even though $NHBA_{Ng}$ has higher affinity for heparin than $NHBA_{Nm}$, there are additional gonococcal heparin binding proteins that play a role in serum resistance, such as Opa [28] which would account for the relatively high level of survival of the WT under the serum conditions tested, as well as the restoration of resistance of the gonococcal ΔNHBA mutant after addition of heparin to the assay.

Gonococcal adherence to the mucosal epithelium is the key first step in establishing an infection, and following initial adherence, *N. gonorrhoeae* colonization depends on the formation of robust bacterial aggregates and microcolonies on the epithelial cell surface [reviewed in 30]. Both initial adherence and microcolony formation are mediated by gonococcal factors including type IV pili, opacity (Opa) proteins, and lipooligosaccharide (LOS) [23, 42-44]. However, *N. gonorrhoeae* also form aggregates even in the absence of pili or Opa suggesting the presence of unknown host factors that facilitate GC aggregation [45]. We show that $NHBA_{Ng}$ plays a key role in establishing gonococcal infection, as the ΔNHBA mutant displayed decreased adherence to cervical and urethral epithelial cells, as well as decreased aggregation and microcolony formation relative to the wild type. Furthermore, recombinant $NHBA_{Ng}$ directly interacts with both epithelial cells and gonococcal cells and $NHBA_{Ng}$ is able to block adherence to epithelial cells in a concentration dependent manner. This is likely as a result of NHBA interactions with host glycans on the epithelial cells which that mediate $NHBA_{Nm}$ interactions with Hec-1B and CHO-K1 cells [13]. The gonococcal NHBA is upregulated at 32° C. vs 3TC, consistent with NHBA regulation in *N. meningitidis* [18], which may be particularly relevant during adherence in the pharynx by these organisms due to the lower temperature of this niche.

The $NHBA_{Ng}$ mediated inter-bacterium interactions, and the role of $NHBA_{Ng}$ in microcolony formation may be facilitated by its interactions with LNnT that is present on the surface of gonococcal cells as part of LOS [46]. Gonococcal microcolonies interact with host microvilli and lead to rearrangement of the host cytoskeleton and cortical plaque formation [47-51]. Microcolonies have also been implicated in increasing gonococcal resistance to antibiotics [45], and formation of bacterial aggregates is enhanced following exposure to seminal plasma, which influences bacterial transmission [52]. The formation of *N. meningitidis* aggregates is also important for resisting shear forces on the cell surface [53], which may also be important for *N. gonorrhoeae*. However, it is interesting to note that the meningococcal NHBA has not been reported to be involved in aggregation to date [13, 54, 55].

In summary, we highlight NHBA's role during several stages of gonococcal infection and pathogenesis. As such, targeting NHBA-self and NHBA-host interactions may be a useful therapeutic and vaccine approach.

Throughout the specification the aim has been to describe the preferred embodiments of the invention without limiting the invention to any one embodiment or specific collection of features. It will therefore be appreciated by those of skill in the art that, in light of the instant disclosure, various modifications and changes can be made in the particular embodiments exemplified without departing from the scope of the present invention.

All computer programs, algorithms, patent and scientific literature and protein and nucleic acid sequences or accession numbers referred to herein are incorporated herein by reference.

TABLE 3

Primers and vectors used to generate the nhba mutant and complemented strains*

| Primer name | Sequence (5' - 3') | Comments |
|---|---|---|
| nhba1 (SEQ ID NO. 3) | ATGTTTAAACGC AGTGTGATTGC | Used to amplify the nhba gene (NGAG_00725) from *N. gonorrhoeae* strain 1291 to generate the ΔNHBA mutant strain |
| nhba2 (SEQ ID NO. 4) | TCAATCCCGATC TTTTTTGCCGGC | |
| nhba3 (SEQ ID NO. 5) | GGATCCCCGCC GAGATTCCGCTG ATTCC | Used to introduce a BamHI restriction site (underlined) into nhba by inverse PCR |
| nhba4 (SEQ ID NO. 6) | GGATCCGCGACC TCCTCGACCGTG CAGAAC | |
| nhba5 (SEQ ID NO. 7) | GGCATATGGCGG AAACAATA | Used to generate the ΔNHBA_C complemented strain |
| nhba6 (SEQ ID NO. 8) | TCAATCCCGATC TTTTTTGCCGGC | |

| Vector name | Source | Comments |
|---|---|---|
| pGEM-T Easy | Promega | Used to clone nhba for ΔNHBA mutant |
| pUC4Kan | Amersham Biosciences | Kanamycin resistance cassette |
| pCTS32 | [23] | Complementation plasmid used to generate ΔNHBA_C. |

*The nhba gene (NGAG_00725) was amplified from *N. gonorrhoeae* strain 1291 (primers nhba1 and nhba2) and cloned into pGEM-T Easy (Promega). A kanamycin resistance gene (pUC4Kan; Amersham Biosciences) was inserted into the BamHI site introduced into the middle of nhba using inverse PCR (primers nhba3 and nhb4). The nhba::kan construct was linearized and transformed into *N. gonorrhoeae* 1291 to generate nhba::kan (ΔNHBA). The complemented strain (ΔNHBA_C) was generated by introducing the intact nhba gene (primers nhba5 and nhba6) into the ΔNHBA using complementation plasmid pCTS32 [23]. Kanamycin (50 μg/mL) and spectinomycin (100 μg/mL) were used for knockout and complements strains, respectively. Deletion and subsequent complementation of the nhba gene was confirmed by PCR and Western blot.

TABLE 4

Heat map of glycan array results for recombinant NHBA from *Neisseria gonorrhoeae* 1291.

| Class | Index | Structure | $NHBA_{Ng}$ |
|---|---|---|---|
| Terminal galactose | 2 | Galα-sp3 | |
| | 3 | Galβ-sp3 | |
| | 37 | 3-O-Su-Galβ-sp3 | |
| | 75 | Galα1-2Galβ-sp3 | |
| | 76 | Galα1-3Galβ-sp3 | |
| | 77 | Galα1-3GalNAcβ-sp3 | 1.3 |
| | 78 | Galα1-3GalNAcα-sp3 | |
| | 80 | Galα1-3GlcNAcβ-sp3 | |
| | 81 | Galα1-4GlcNAcβ-sp3 | |
| | 83 | Galα1-6Glcβ-sp4 | |
| | 84 | Galβ1-2Galβ-sp3 | |
| | 85 | Galβ1-3GlcNaAcβ-sp3 | |
| | 87 | Galβ1-3Galβ-sp3 | |
| | 88 | Galβ1-3GalNAcβ-sp3 | |
| | 89 | Galβ1-3GalNAcα-sp3 | |
| | 93 | Galβ1-4Glcβ-sp4 | |
| | 94 | Galβ1-4Galβ-sp4 | |
| | 97 | Galβ1-4GlcNAcβ-sp3 | |
| | 100 | Galβ1-6Galβ-sp4 | |
| | 145 | Galβ1-3(6-O-Su)GlcNAcβ-sp3 | |
| | 146 | Galβ1-4(6-O-Su)Glcβ-sp2 | |
| | 147 | Galβ1-4(6-O-Su)GlcNAcβ-sp3 | |
| | 150 | 3-O-Su-Galβ1-3GalNAcα-sp3 | |
| | 151 | 6-O-Su-Galβ1-3GalNAcα-sp3 | 1.6 |
| | 152 | 3-O-Su-Galβ1-4Glcβ-sp2 | |
| | 153 | 6-O-Su-Galβ1-4Glcβ-sp2 | |
| | 155 | 3-O-Su-Galβ1-3GlcNAcβ-sp3 | |
| | 157 | 3-O-Su-Galβ1-4GlcNAcβ-sp3 | |
| | 159 | 4-O-Su-Galβ1-4GlcNAcβ-sp3 | |
| | 161 | 6-O-Su-Galβ1-3GlcNAcβ-sp3 | |

TABLE 4-continued

Heat map of glycan array results for recombinant NHBA from *Neisseria gonorrhoeae* 1291.

| Class | Index | Structure | NHBA$_{Ng}$ |
|---|---|---|---|
| | 163 | 6-O-Su-Galβ1-4GlcNAcβ-sp3 | |
| | 176 | 3-O-Su-Galβ1-4(6-O-Su)Glcβ-sp2 | |
| | 177 | 3-O-Su-Galβ1-4(6-O-Su)GlcNAcβ-sp2 | |
| | 178 | 6-O-Su-Galβ1-4(6-O-Su)Glcβ-sp2 | |
| | 179 | 6-O-Su-Galβ1-3(6-O-Su)GlcNAcβ-sp2 | |
| | 180 | 6-O-Su-Galβ1-4(6-O-Su)GlcNAcβ-sp2 | 1.2 |
| | 181 | 3,4-O-Su$_2$-Galβ1-4GlcNAcβ-sp3 | |
| | 182 | 3,6-O-Su$_2$-Galβ1-4GlcNAcβ-sp2 | |
| | 183 | 4,6-O-Su$_2$-Galβ1-4GlcNAcβ-sp2 | |
| | 184 | 4,6-O-Su$_2$-Galβ1-4GlcNAcβ-sp3 | |
| | 189 | 3,6-O-Su$_2$-Galβ1-4(6-O-Su)GlcNAcβ-sp2 | |
| | 201 | 3,4-O-Su$_2$-Galβ1-4GlcNAcβ-sp3 | |
| | 203 | Galβ1-4(6-O-Su)GlcNAcβ-sp2 | |
| | 220 | Galα1-3Galβ1-4Glcβ-sp2 | |
| | 222 | Galα1-3Galβ1-4GlcNAcβ-sp3 | |
| | 224 | Galα1-4Galβ1-4Glcβ-sp3 | |
| | 225 | Galα1-4Galβ1-4GlcNAc-sp2 | 1.8 |
| | 228 | Galβ1-2Galα1-4GlcNAcβ-sp4 | |
| | 229 | Galβ1-3Galβ1-4GlcNAcβ-sp4 | |
| | 231 | Galβ1-4GlcNAcβ1-3GalNAcα-sp3 | |
| | 232 | Galβ1-4GlcNAcβ1-6GalNAcα-sp3 | |
| | 254 | Galβ1-3(GlcNAcβ1-6)GalNAcα-sp3 | |
| | 262 | Galβ1-3GalNAcβ1-3Gal-sp4 | |
| | 264 | Galβ1-4Galβ1-4GlcNAc-sp3 | |
| | 373 | Galα1-3Galβ1-4GlcNAcβ1-3Galβ-sp3 | |
| | 375 | Galα1-4GlcNAcβ1-3Galβ1-4GlcNAcβ-sp3 | |
| | 376 | Galβ1-3GlcNAcβ1-3Galβ1-4Glcβ-sp4 | |
| | 377 | Galβ1-3GlcNAcβ1-3Galβ1-3GlcNAcβ-sp2 | |
| | 378 | Galβ1-3GlcNAcα1-3Galβ1-4GlcNAcβ-sp3 | |
| | 379 | Galβ1-3GlcNAcβ1-3Galβ1-4GlcNAcβ-sp3 | |
| | 380 | Galβ1-3GlcNAcα1-6Galβ1-4GlcNAcβ-sp2 | |
| | 381 | Galβ1-3GlcNAcβ1-6Galβ1-4GlcNAcβ-sp2 | |
| | 382 | Galβ1-3GalNAcβ1-4Galβ1-4Glcβ-sp3 | |
| | 383 | Galβ1-4GlcNAcβ1-3Galβ1-4Glcβ-sp2 | 1.3 |
| | 385 | Galβ1-4GlcNAcβ1-3Galβ1-4GlcNAcβ-sp3 | |
| | 387 | Galβ1-4GlcNAcβ1-6Galβ1-4GlcNAcβ-sp2 | |
| | 388 | Galβ1-3(Galβ1-4GlcNAcβ1-6)GalNAcα-sp3 | |
| | 401 | Galβ1-3GlcNAcβ1-3Galβ1-3GlcNAcβ-sp3 | |
| | 419 | 3-O-SuGalβ1-4GlcNAcβ1-3Galβ1-4GlcNAcβ-sp3 | |
| | 420 | 4-O-SuGalβ1-4GlcNAcβ1-3Galβ1-4GlcNAcβ-sp3 | |
| | 481 | Galα1-3Galβ1-4GlcNAcβ1-3Galβ1-4Glcβ-sp4 | |
| | 488 | Galβ1-4GlcNAcβ1-3(Galβ1-4GlcNAcβ1-6)GalNAcα-sp3 | 1.2 |
| | 489 | Galβ1-4GlcNAcβ1-3(GlcNAcβ1-6)Galβ1-4GlcNAc-sp2 | |
| | 490 | Galβ1-4GlcNAcβ1-6(GlcNAcβ1-3)Galβ1-4GlcNAcβ-sp2 | |
| | 498 | (Galβ1-4GlcNAcβ1-3)$_3$-sp3 | |
| | 499 | Galβ1-4GlcNAcβ1-3(Galβ1-4GlcNAcβ1-6)Galβ1-4GlcNAc-sp2 | |
| | 501 | Galβ1-3GalNAcβ1-3Galα1-4Galβ1-4Glcβ-sp4 | |
| | 1A | Galβ1-3GlcNAc | |
| | 1B | Galβ1-4GlcNAc | |
| | 1C | Galβ1-4Gal | |
| | 1D | Galβ1-6GlcNAc | |
| | 1E | Galβ1-3GalNAc | |
| | 1F | Galβ1-3GalNAcβ1-4Galβ1-4Glc | |
| | 1G | Galβ1-3GlcNAcβ1-3Galβ1-4Glc | |
| | 1H | Galβ1-4GlcNAcβ1-3Galβ1-4Glc | |
| | 1I | Galβ1-4GlcNAcβ1-6(Galβ1-4GlcNAcβ1-3)Galβ1-4Glc | |
| | 1J | Galβ1-4GlcNAcβ1-6(Galβ1-3GlcNAcβ1-3)Galβ1-4Glc | |
| | 1K | Galα1-4Galβ1-4Glc | |
| | 1L | GalNAcα1-O-Ser | |
| | 1M | Galβ1-3GalNAcα1-O-Ser | |
| | 1N | Galα1-3Gal | |
| | 1O | Galα1-3Galβ1-4GlcNAc | |
| | 1P | Galα1-3Galβ1-4Glc | |
| | 2A | Galα1-3Galβ1-4Galα1-3Gal | |
| | 2B | Galβ1-6Gal | |
| | 2C | GalNAcβ1-3Gal | |
| | 2D | GalNAcβ1-4Gal | |
| | 2E | Galα1-4Galβ1-4GlcNAc | |
| | 2F | GalNAcα1-3Galβ1-4Glc | |
| | 2G | Galβ1-3GlcNAcβ1-3Galβ1-4GlcNAcβ1-6(Galβ1-3GlcNAcβ1-3)Galβ1-4Glc | |
| Terminal GlcNAc | 10 | GlcNAcβ-sp3 | |
| | 22 | GlcNAcβ-sp4 | |
| | 43 | 6-O-Su-GlcNAcβ-sp3 | |
| | 55 | 3-O-Su-GlcNAcβ-sp3 | |

TABLE 4-continued

Heat map of glycan array results for recombinant NHBA from *Neisseria gonorrhoeae* 1291.

| Class | Index | Structure | NHBA$_{Ng}$ |
|---|---|---|---|
| | 113 | GlcNAcβ1-3GalNAcα-sp3 | |
| | 114 | GlcNAcβ1-3Manβ-sp4 | 1.1 |
| | 115 | GlcNAcβ1-4GlcNAcβ-Asn | |
| | 117 | GlcNAcβ1-4GlcNAcβ-sp4 | |
| | 118 | GlcNAcβ1-6GalNAcα-sp3 | |
| | 149 | GlcNAcβ1-4(6-O-Su)GlcNAcβ-sp2 | 1.5 |
| | 167 | GlcNAcβ1-4-[HOOC(CH$_3$)CH]-3-O-GlcNAcβ-sp4 | |
| | 168 | GlcNAcβ1--[HOOC(CH$_3$)CH]-3-O-GlcNAcβ-L-alanyl-D-i-glutaminyl-L-lysine | |
| | 246 | GlcNAcβ1-2Galβ1-3GalNAcα-sp3 | |
| | 247 | GlcNAcβ1-3Galβ1-3GalNAcα-sp3 | |
| | 248 | GlcNAcβ1-3Galβ1-4Glcβ-sp2 | |
| | 250 | GlcNAcβ1-3Galβ1-4GlcNAcβ-sp3 | |
| | 251 | GlcNAcβ1-4Galβ1-4GlcNAcβ-sp2 | |
| | 252 | GlcNAcβ1-4GlcNAcβ1-4GlcNAcβ-sp4 | |
| | 253 | GlcNAcβ1-6Galβ1-4GlcNAcβ-sp2 | |
| | 255 | GlcNAcβ1-3(GlcNAcβ1-6)GalNAcα-sp3 | |
| | 395 | GlcNAcβ1-3(GlcNAcβ1-6)Galβ1-4GlcNAcβ-sp3 | |
| | 493 | (GlcNAcβ1-4)$_5$β-sp4 | |
| | 503 | (GlcNAcβ1-4)$_6$β-sp4 | |
| | 504 | (A-GN-M)$_2$-3,6-M-GN-GNβ-sp4 | |
| | 505 | (GN-M)$_2$-3,6-M-GN-GNβ-sp4 | 1.4 |
| | 4A | GlcNAcβ1-4GlcNAc | |
| | 4B | GlcNAcβ1-4GlcNAcβ1-4GlcNAc | |
| | 4C | GlcNAcβ1-4GlcNAcβ1-4GlcNAcβ1-4GlcNAc | |
| | 4D | GlcNAcβ1-4GlcNAcβ1-4GlcNAcβ1-4GlcNAcβ1-4GlcNAcβ1-4GlcNAc | 1.8 |
| | 4E | GlcNAcβ1-4MurNAc | |
| Mannosyl | 16 | Manα-sp3 | |
| | 18 | Manβ-sp4 | |
| | 19 | ManNAcβ-sp4 | |
| | 47 | 6-H$_2$PO$_3$Manα-sp3 | |
| | 119 | Manα1-2Manβ-sp4 | |
| | 120 | Manα1-3Manβ-sp4 | |
| | 121 | Manα1-4Manβ-sp4 | |
| | 122 | Manα1-6Manβ-sp4 | |
| | 123 | Manβ1-4GlcNAcβ-sp4 | |
| | 124 | Manα1-2Manα-sp4 | |
| | 258 | Manα1-3(Manα1-6 )Manβ-sp4 | |
| | 495 | Manα1-6(Manα1-3)Manα1-6(Manα1-3) Manβ-sp4 | |
| | 5A | GlcNAcβ1-2Man | |
| | 5B | GlcNAcβ1-2Manα1-6(GlcNAcβ1-2Manα1-3)Man | |
| | 5C | Manα1-2Man | 1.1 |
| | 5D | Manα1-3Man | |
| | 5E | Manα1-4Man | |
| | 5F | Manα1-6Man | |
| | 5G | Manα1-6(Manα1-3)Man | |
| | 5H | Manα1-6(Manα1-3)Manα1-6(Manα1-3) Man | |
| Fucosyl | 1 | Fucα-sp3 | |
| | 71 | Fucα1-2Galβ-sp3 | |
| | 72 | Fucα1-3GlcNAcβ-sp3 | |
| | 73 | Fucα1-4GlcNAcβ-sp3 | |
| | 215 | Fucα1-2Galβ1-3GlcNAcβ-sp3 | |
| | 216 | Fucα1-2Galβ1-4GlcNAcβ-sp3 | |
| | 217 | Fucα1-2Galβ1-3GalNAcα-sp3 | 1 |
| | 219 | Fucα1-2Galβ1-4Glcβ-sp4 | 1.1 |
| | 226 | Fucα1-2(Galα1-3)Galβ-sp3 | |
| | 233 | Galβ1-3(Fucα1-4 )GlcNAcβ-sp3 | |
| | 234 | Fucα1-3(Galβ1-4)GlcNAcβ-sp3 | |
| | 235 | Fucα1-2(GalNAcα1-3)Galβ-sp3 | |
| | 287 | 3-O-Su-Galβ1-3(Fucα1-4)GlcNAcβ-sp3 | |
| | 288 | Fucα1-3(3-O-Su-Galβ1-4)GlcNAcβ-sp3 | |
| | 359 | Fucα1-2(Galα1-3)Galβ1-3GlcNAcβ-sp3 | |
| | 360 | Fucα1-2(Galα1-3)Galβ1-4GlcNAcβ-sp3 | |
| | 362 | Fucα1-2(Galα1-3)Galβ1-3GalNAcα-sp3 | |
| | 363 | Fucα1-2(Galα1-3)Galβ1-3GalNAcβ-sp3 | 1.3 |
| | 364 | Fucα1-3(Galα1-3Galβ1-4)GlcNAcβ-sp3 | |
| | 366 | Fucα1-2(GalNAcα1-3)Galβ1-3GlcNAcβ-sp3 | |
| | 368 | Fucα1-2(GalNAcα1-3)Galβ1-4GlcNAcβ-sp3 | |
| | 371 | Fucα1-2Galβ1-3(Fucα1-4)GlcNAcβ-sp3 | |
| | 372 | Fucα1-3(Fucα1-2Galβ1-4)GlcNAcβ-sp3 | |
| | 392 | Fucα1-2(GalNAcα1-6)GalNAcα1-6-sp3 | |
| | 479 | Fucα1-2Galβ1-SGlcNAcβ1-3Galβ1-4Glcβ-sp4 | |
| | 480 | Fucα1-2Galβ1-SGlcNAcβ1-3Galβ1-4GlcNAcβ-sp2 | |
| | 483 | Galα1-3(Fucα1-2)Galβ1-4 (Fucα1-3)GlcNAcβ-sp3 | |
| | 496 | Fucα1-2Galβ1-3(Fucα1-4)GlcNAcβ1-3Galβ1-4Glcβ-sp4 | |

TABLE 4-continued

Heat map of glycan array results for recombinant NHBA from Neisseria gonorrhoeae 1291.

| Class | Index | Structure | NHBA$_{Ng}$ |
|---|---|---|---|
| | 497 | Fucα1-3(Fucα1-2Galβ1-4)GlcNAcβ1-3Galβ1-4Glcβ-sp4 | |
| | 538 | Le$^x$1-6'(Le$^e$1-3')Lac-sp4 | |
| | 539 | LacNAc1-6'(Le$^d$1-3')Lac-sp4 | 1.5 |
| | 540 | Le$^x$1-6'(6'SLN1-3')Lac-sp4 | |
| | 541 | Le$^x$1-6'(Le$^d$1-3')Lac-sp4 | |
| | 542 | Le$^e$Le$^x$1-6'(Le$^e$1-3')Lac-sp4 | 1.2 |
| | 543 | Le$^x$1-6'(Le$^b$1-3')Lac-sp4 | |
| | 7A | Fucα1-2Galβ1-3GlcNAcβ1-3Galβ1-4Glc | |
| | 7B | Galβ1-3(Fucα1-4)GlcNAcβ1-3Galβ1-4Glc | |
| | 7C | Galβ1-4(Fucα1-3)GlcNAcβ1-3Galβ1-4Glc | |
| | 7D | Fucα1-2Galβ1-3(Fucα1-4)GlcNAcβ1-3Galβ1-4Glc | |
| | 7E | Galβ1-3(Fucα1-4)GlcNAcβ1-3Galβ1-4(Fucα1-3)Glc | |
| | 7F | Fucα1-2Gal | |
| | 7G | Fucα1-2Galβ1-4Glc | |
| | 7H | Galβ1-4(Fucα1-3)Glc | |
| | 7I | Galβ1-4(Fucα1-3)GlcNAc | |
| | 7J | Galβ1-3(Fucα1-4)GlcNAc | |
| | 7K | GalNAcα1-3(Fucα1-2)Gal | |
| | 7L | Fucα1-2Galβ1-4(Fucα1-3)Glc | |
| | 7M | Galβ1-3(Fucα1-2)Gal | |
| | 7N | Fucα1-2Galβ1-4(Fucα1-3)GlcNAc | |
| | 7O | Fucα1-2Galβ1-3GlcNAc | |
| | 7P | Fucα1-2Galβ1-3(Fucα1-4)GlcNAc | |
| | 8A | SO3-3Galβ1-3(Fucα1-4)GlcNAc | |
| | 8B | SO3-3Galβ1-4(Fucα1-3)GlcNAc | |
| | 8C | Galβ1-3GlcNAcβ1-3Galβ1-4(Fucα1-3)GlcNAcβ1-3Galβ1-4Glc | 1.6 |
| | 8D | Galβ1-4(Fucα1-3)GlcNAcβ1-6(Galβ1-3GlcNAcβ1-3)Galβ1-4Glc | |
| | 8E | Galβ1-4(Fucα1-3)GlcNAcβ1-6(Fucα1-2Galβ1-3GlcNAcβ1-3)Galβ1-4Glc | |
| | 8F | Galβ1-4(Fucα1-3)GlcNAcβ1-6(Fucα1-2Galβ1-3(Fucα1-4)GlcNAcβ1-3)Galβ1-4Glc | |
| | 8G | Lacto-N-fucopentaose VI (LNFP VI) | |
| | 8H | Lacto-N-neodifucohexaose I (LNnDFH I) | |
| | 8I | Lacto-N-neodifucohexaose II (LNnDFH II) | |
| | 8J | Trifucosyllacto-N-neoteraose I (TFLNnTI) | |
| | 8K | Monofucosyllacto- N-neohexaose I (MFLNnH I) | |
| | 8L | Difucosyllacto-N-neohexaose I (DFLNnH I) | 1.1 |
| | 8M | Difucosyllacto-N-neohexaose II (DFLNnH II) | |
| | 8N | Monofucosyl(1-3)-iso-lacto-N-octaose (MFiLNO) | |
| | 8O | Trifucosyl(1-2,1-2,1-3)-iso-lacto-N-octaose (TFiLNO (1-2,1-2,1-3)) | |
| | 8P | GalNAcb1-3(Fuca1-2)Galb1-4Glc | |
| Sialylated | 48 | Neu5Acα-sp3 | |
| | 49 | Neu5Acα-sp9 | |
| | 52 | Neu5Gcα-sp3 | |
| | 54 | 9-NAc-Neu5Acα-sp3 | |
| | 169 | Neu5Acα2-3Galβ-sp3 | |
| | 170 | Neu5Acα2-6Galβ-sp3 | 1.8 |
| | 171 | Neu5Acα2-3GalNAcα-sp3 | 1.4 |
| | 172 | Neu5Acα2-6GalNAcα-sp3 | |
| | 174 | Neu5Gcα2-6GalNAcα-sp3 | |
| | 186 | Neu5Acα2-8Neu5Acα2-sp3 | |
| | 205 | Neu5Acα2-6GalNAcβ-sp3 | |
| | 206 | Neu5Gcα2-3Gal-sp3 | |
| | 289 | Galα1-3(Neu5Acα2-6)GalNAcα-sp3 | |
| | 290 | Galβ1-3(Neu5Acα2-6)GalNAcα-sp3 | |
| | 292 | Neu5Acα2-3Galβ1-3GalNAcα-sp3 | |
| | 293 | Neu5Acα2-3Galβ1-4Glcβ-sp3 | |
| | 294 | Neu5Acα2-3Galβ1-4Glcβ-sp4 | |
| | 295 | Neu5Acα2-6Galβ1-4Glcβ-sp2 | |
| | 298 | Neu5Acα2-3Galβ1-4GlcNAcβ-sp3 | |
| | 299 | Neu5Acα2-3Galβ1-3GlcNAcβ-sp3 | |
| | 300 | Neu5Acα2-6Galβ1-4GlcNAcβ-sp3 | |
| | 303 | Neu5Gcα2-3Galβ1-4GlcNAcβ-sp3 | |
| | 304 | Neu5Gcα2-6Galβ1-4GlcNAcβ-sp3 | |
| | 306 | 9-NAc-Neu5Acα2-6Galβ1-4GlcNAcβ-sp3 | |
| | 315 | Neu5Acα2-3Galβ1-4-(6-O-Su)GlcNAcβ-sp3 | |
| | 317 | Neu5Acα2-3Galβ1-3-(6-O-Su)GalNAcβ-sp3 | |
| | 318 | Neu5Acα2-6Galβ1-4-(6-O-Su)GlcNAcβ-sp3 | |
| | 319 | Neu5Acα2-3-(6-O-Su)Galβ1-4GlcNAcβ-sp3 | |
| | 321 | (Neu5Acα2-8)$_3$-sp3 | |
| | 323 | Neu5Acα2-6Galβ1-3GlcNAc-sp3 | |
| | 324 | Neu5Acα2-6Galβ1-3(6-O-Su)GlcNAc-sp3 | 1 |
| | 331 | Neu5Gcα2-3Galβ1-3GlcNAcβ-sp3 | |
| | 421 | Neu5Acα2-3(GalNAcβ1-4)Galβ1-4Glcβ-sp2 | |

TABLE 4-continued

Heat map of glycan array results for recombinant NHBA from *Neisseria gonorrhoeae* 1291.

| Class | Index | Structure | NHBA$_{Ng}$ |
|---|---|---|---|
| | 422 | Neu5Acα2-3Galβ1-4GlcNAcβ1-3Galβ-sp3 | 1.2 |
| | 423 | Fucα1-3(Neu5Acα2-3Galβ1-4)GlcNAcβ-sp3 | |
| | 426 | Neu5Acα2-3Galβ1-3(Fucα1-4)GlcNAcβ-sp3 | |
| | 428 | Fucα1-3(Neu5Acα2-3Galβ1-4)6-O-Su-GlcNAcβ-sp3 | 1.1 |
| | 429 | Fucα1-3(Neu5Acα2-3(6-O-Su)Galβ1-4)GlcNAcβ-sp3 | |
| | 433 | Neu5Acα2-3Galβ1-3(Neu5Acα2-6)GalNAcα-sp3 | |
| | 434 | Neu5Acα2-8Neu5Acα2-3Galβ1-4Glcβ-sp4 | |
| | 527 | Neu5Acα2-3Galβ1-4GlcNAcβ1-3Galβ1-4GlcNAcβ-sp2 | |
| | 528 | Fucα1-3(Neu5Acα2-3Galβ1-4)GlcNAcβ1-3Galβ-sp3 | |
| | 529 | Galβ1-3(Neu5Acα2-6)GlcNAcβ1-3Galβ1-4Glcβ-sp4 | 1.4 |
| | 531 | Neu5Acα2-8Neu5Acα2-3(GalNAcβ1-4)Galβ1-4Glc-sp2 | |
| | 532 | Neu5Acα2-8Neu5Acα2-8Neu5Acα2-3Galβ1-4Glc-sp2 | |
| | 533 | (Neu5Acα2-8)2Neu5Acα2-3(GalNAcβ1-4)Galβ1-4Glc-sp2 | |
| | 534 | Neu5Acα2-3Galβ1-4GlcNAcβ1-3Galβ1-4GlcNAcβ-sp3 | |
| | 536 | Neu5Acα2-3Galβ1-3GlcNAcβ1-3Galβ1-4Glcβ-sp4 | |
| | 537 | Neu5Acα2-3Galβ1-4GlcNAcβ1-3Galβ1-4Glcβ-sp4 | |
| | 540 | Le$^x$1-6'(6'SLN1-3')Lac-sp4 | |
| | 627 | (Sia2-6A-GN-M)$_2$-3,6-M-GN-GNβ-sp4 | 1.5 |
| | 10A | Neu5Acα2-3Galβ1-3(Fucα1-4)GlcNAc | |
| | 10B | Neu5Acα2-3Galβ1-4(Fucα1-3)GlcNAc | |
| | 10C | Neu5Acα2-3Galβ1-3GlcNAcβ1-3Galβ1-4Glc | |
| | 10D | Galβ1-4(Fucα1-3)GlcNAcβ1-6(Neu5Acα2-6Galβ1-4GlcNAcβ1-3)Galb1-4Glc | |
| | 10E | Disialyl-TF | |
| | 10H | Sialyllacto-N-fucopentaose VI (SLNFPVI) | |
| | 10K | Neu5Acα2-3Galβ1-4GlcNAc | |
| | 10L | Neu5Acα2-6Galβ1-4GlcNAc | |
| | 10M | Neu5Acα2-3Galβ1-3GlcNAcβ1-3Galβ1-4Glc | |
| | 10N | Galβ1-3(Neu5Acα2-6)GlcNAcβ1-3Galβ1-4Glc | |
| | 10O | Neu5Acα2-6Galβ1-4GlcNAcβ1-3Galβ1-4Glc | |
| | 10P | Neu5Acα2-3Galβ1-3(Neu5Acα2-6)GlcNAcβ1-3Galβ1-4Glc | |
| | 11A | Neu5Acα2-3Galβ1-4Glc | |
| | 11B | Neu5Acα2-6Galβ1-4Glc | |
| | 11C | (Neu5Acα2-8Neu5Ac)n (n < 50) | |
| | 11D | Neu5Acα2-6Galβ1-4GlcNAcβ1-2Manα1-6(Neu5Acα2-6Galβ1-4GlcNAcβ1-2Manα1-6)Manβ1-4GlcNAcβ1-4GlcNAc-Asn | |
| Terminal GalNAc | 4 | GalNAcα-sp0 | |
| | 5 | GalNAcα-sp3 | |
| | 6 | GalNAcβ-sp3 | |
| | 38 | 3-O-Su-GalNAcα-sp3 | |
| | 101 | GalNAcα1-3GalNAcβ-sp3 | 1.6 |
| | 102 | GalNAcα1-3Galβ-sp3 | |
| | 103 | GalNAcα1-3GalNAcα-sp3 | |
| | 104 | GalNAcβ1-3Galβ-sp3 | |
| | 106 | GalNAcβ1-4GlcNAcβ-sp3 | |
| | 192 | GalNAcβ1-4(6-O-Su)GlcNAcβ-sp3 | |
| | 193 | 3-O-Su-GalNAcβ1-4GlcNAcβ-sp3 | |
| | 194 | 6-O-Su-GalNAcβ1-4GlcNAcβ-sp3 | |
| | 195 | 6-O-Su-GalNAcβ1-4-(3-O-Su-)GlcNAcβ-sp3 | |
| | 196 | 3-O-Su-GalNAcβ1-4(3-O-Su-)-GlcNAcβ-sp3 | |
| | 197 | 3,6-O-Su$_2$-GalNAcβl-4GlcNAcβ-sp3 | 1.2 |
| | 198 | 4,6-O-Su$_2$-GalNAcβl-4GlcNAcβ-sp3 | |
| | 199 | 4,6-O-Su$_2$-GalNAcβl-4-(3-O-Ac)GlcNAcβ-sp3 | 1.6 |
| | 200 | 4-O-Su-GalNAcβ1-4GlcNAcβ-sp3 | |
| | 201 | 3,4-O-Su$_2$-Galβ1-4GlcNAcβ-sp3 | |
| | 202 | 6-O-Su-GalNAcβ1-4(6-O-Su)GlcNAcβ-sp3 | 1.3 |
| | 204 | 4-O-Su-GalNAcβ1-4GlcNAcβ-sp2 | |
| | 238 | GalNAcβ1-4Galβ1-4Glcβ-sp3 | |
| | 389 | GalNacβ1-3GalαGalβ1-4Glcβ-sp3 | |
| Terminal Glucose | 7 | Glcα-sp3 | |
| | 9 | Glcβ-sp3 | |
| | 46 | 6-H$_2$PO$_3$Glcβ-sp4 | 1 |
| | 110 | Glcα1-4Glcβ-sp3 | 1.5 |
| | 111 | Glcβ1-4Glcβ-sp4 | |
| | 112 | Glcβ1-6Glcβ-sp4 | |
| | 240 | (Glcα1-4)$_3$β-sp4 | |
| | 241 | (Glcα1-6)$_3$β-sp4 | 1.4 |
| | 390 | (Glcα1-4)$_4$β-sp4 | |
| | 391 | (Glcα1-6)$_4$β-sp4 | |
| | 492 | (Glcα1-6)$_5$β-sp4 | |
| | 502 | (Glcα1-6)$_6$β-sp4 | |
| Glycosaminoglycan digests (low molecular weight) | 12A | Neocarratetraose-41, 3-di-O-sulphate (Na$^+$) | |
| | 12B | Neocarratetraose-41-O-sulphate (Na$^+$) | |
| | 12C | Neocarrahexaose-24,41, 3, 5-tetra-O-sulphate (Na$^+$) | |
| | 12D | Neocarrahexaose-41, 3, 5-tri-O-sulphate (Na$^+$) | |

TABLE 4-continued

Heat map of glycan array results for recombinant NHBA from *Neisseria gonorrhoeae* 1291.

| Class | Index | Structure | NHBA$_{Ng}$ |
|---|---|---|---|
| | 12E | Neocarraoctaose-41, 3, 5, 7-tetra-O-sulphate (Na$^+$) | |
| | 12F | Neocarradecaose-41, 3, 5, 7, 9-penta-O-sulphate (Na$^+$) | |
| | 12G | ΔUA-2S ® GlcNS-6S Na$_4$ (I-S) | |
| | 12H | ΔUA → GlucNS-6S Na$_3$ (II-S) | |
| | 12I | ΔUA → 2S-GlcNS Na$_3$ (III-S) | |
| | 12J | ΔUA → 2S-GlcNAc-6S Na$_3$ (I-A) | |
| | 12K | ΔUA → GlcNAc-6S Na$_2$ (II-A) | |
| | 12L | ΔUA → 2S-GlcNAc Na$_2$ (III-A) | |
| | 12M | ΔUA → GlcNAc Na (IV-A) | |
| | 12N | ΔUA → GalNAc-4S Na$_2$ (Δ Di-4S) | |
| | 12O | ΔUA → GalNAc-6S Na2 (Δ Di-6S) | |
| | 12P | ΔUA → GalNAc-4S,6S Na$_3$ (Δ Di-disE) | |
| | 13A | ΔUA → 2S-GalNAc-4S Na$_2$ (Δ Di-disB) | 1.5 |
| | 13B | ΔUA → 2S-GalNAc-6S Na$_3$ (Δ Di-disD) | |
| | 13C | ΔUA → 2S-GalNAc-4S-6S Na$_4$ (Δ Di-tisS) | 1.5 |
| | 13D | ΔUA → 2S-GalNAc-6S Na$_2$ (ΔDi-UA2S) | 1.4 |
| | 13E | ΔUA → GlcNAc Na (Δ Di-HA) | |
| | 13F | (GlcAβ1-3GlcNAcβ1-4)n (n = 4) | |
| | 13G | (GlcAβ1-3GlcNAcβ1-4)n (n = 8) | |
| | 13H | (GlcAβ1-3GlcNAcβ1-4)n (n = 10) | 1 |
| | 13I | (GlcAβ1-3GlcNAcβ1-4)n (n = 12) | |
| | 13J | (GlcA/IdoAα/β1-4GlcNAcα1-4)n (n = 200) | 1.3 |
| | 13K | (GlcA/IdoAβ1-3(±4/6S)GalNAcβ1-4)n (n < 250) | |
| | 13L | ((±2S)GlcA/IdoAα/β1-3(±4S)GalNAcβ1-4)n (n < 250) | |
| | 13M | (GlcA/IdoAβ1-3(±6S)GalNAcβ1-4)n (n < 250) | |
| | 13N | (GlcAβ1-3GlcNAcβ1-4)n (n = 4) | |
| | 13O | (GlcAβ1-3GlcNAcβ1-4)n (n = 6) | |
| | 13P | (GlcAβ1-3GlcNAcβ1-4)n (n = 8) | |
| | 14A | (GlcAβ1-3GlcNAcβ1-4)n (n = 10) | |
| | 14B | (GlcAβ1-3GlcNAcβ1-4)n (n = 12) | |
| | 14C | (GlcAβ1-3GlcNAcβ1-4)n (n = 14) | |
| | 14D | (GlcAβ1-3GlcNAcβ1-4)n (n = 16) | |
| | 14E | HA-30,000 Da | |
| | 14F | HA-107,000 Da | |
| | 14G | HA-190,000 Da | |
| | 14H | HA-220,000 Da | |
| | 14I | HA-1,600,000 Da | |
| | 14J | Heparan Sulfate | |
| | 14K | (Glcβ1-3Glcβ1-3)n | |
| Other | 14 | GlcN(Gc)β-sp4 | |
| | 15 | HOCH$_2$(HOCH)$_4$CH$_2$NH$_2$ | |
| | 20 | Rhaα-sp3 | |
| | 44 | GlcAα-sp3 | |
| | 45 | GlcAβ-sp3 | |
| | 164 | GlcAβ1-3GlcNAcβ-sp3 | |
| | 165 | GlcAβ1-3Galβ-sp3 | |
| | 166 | GlcAβ1-6Galβ-sp3 | 1.6 |
| | 625 | (GlcAβ1-4GlcNAcβ1-3)$_8$-NH$_2$-ol | |

Black squares denote binding to a respective glycan in three independent experiments (white squares denote no binding). Values represent mean fluorescent intensity of spots above background (calculated as from the average background of empty spots on the array +3 standard deviations) from three independent experiments (Student's t-test p < 0.001).

TABLE 5

Distribution of NHBA peptide variants in *N. gonorrhoeae* isolates that have an annotated NHBA protein in the PubMLST database.

| NHBA peptide | Frequency | Percentage |
|---|---|---|
| 542 | 1407 | 39.68 |
| 475 | 1078 | 30.4 |
| 481 | 406 | 11.45 |
| 725 | 117 | 3.3 |
| 729 | 117 | 3.3 |
| 543 | 57 | 1.61 |
| 686 | 55 | 1.55 |
| 730 | 55 | 1.55 |
| 737 | 34 | 0.96 |
| 721 | 32 | 0.9 |
| 714 | 32 | 0.9 |
| 731 | 32 | 0.9 |
| 726 | 28 | 0.79 |
| 527 | 18 | 0.51 |
| 722 | 10 | 0.28 |
| 739 | 8 | 0.23 |
| 723 | 6 | 0.17 |
| 724 | 6 | 0.17 |
| 687 | 5 | 0.14 |
| 822 | 4 | 0.11 |
| 685 | 4 | 0.11 |
| 738 | 4 | 0.11 |
| 821 | 3 | 0.08 |
| 720 | 3 | 0.08 |
| 740 | 2 | 0.06 |
| 718 | 2 | 0.06 |
| 9 | 2 | 0.06 |
| 719 | 2 | 0.06 |
| 717 | 2 | 0.06 |
| 480 | 2 | 0.06 |

TABLE 5-continued

Distribution of NHBA peptide variants in *N. gonorrhoeae* isolates that have an annotated NHBA protein in the PubMLST database.

| NHBA peptide | Frequency | Percentage |
|---|---|---|
| 732 | 2 | 0.06 |
| 734 | 1 | 0.03 |
| 735 | 1 | 0.03 |
| 1252 | 1 | 0.03 |
| 823 | 1 | 0.03 |
| 683 | 1 | 0.03 |
| 733 | 1 | 0.03 |
| 727 | 1 | 0.03 |
| 736 | 1 | 0.03 |
| 824 | 1 | 0.03 |
| 684 | 1 | 0.03 |
| 728 | 1 | 0.03 |

REFERENCES

1. WHO. Global incidence and prevalence of selected curable sexually transmitted infections—2008: World Health Organisation, 2012.
2. Hook E W, Handsfield H H. Gonococcal Infection in the Adult. In: Holmes K K, ed. Sexually Transmitted Diseases. New York: McGraw-Hill, 2008:627-45.
3. Edwards J L, Jennings M P, Apicella M A, Seib K L. Is gonococcal disease preventable? The importance of understanding immunity and pathogenesis in vaccine development. Crit Rev Microbiol 2016; 42:928-41.
4. CDC. Antibiotic Resistance Threats in the United States, 2013. Available at: http://www.cdc.gov/drugresistance/threat-report-2013/pdf/ar-threats-2013-508.pdf. Accessed 8 Apr. 2018.
5. WHO. Global priority list of antibiotic-resistant bacteria to guide research, discovery, and development of new antibiotics. Available at: http://www.who.int/medicines/publications/global-priority-list-antibiotic-resistant-bacteria/en/. Accessed 8 Apr. 2018.
6. Unemo M, Bradshaw C S, Hocking J S, et al. Sexually transmitted infections: challenges ahead. Lancet Infect Dis 2017; 17:e235-e79.
7. PHE. UK case of *Neisseria gonorrhoeae* with high-level resistance to azithromycin and resistance to ceftriaxone acquired abroad. Health Protection Report 12(11). Available at: https://assests.publishing.service.gov.uk/government/uploads/system/uploads/attachment_data/fil e/694655/hpr1118_MDRGC.pdf. Accessed 8 Apr. 2018.
8. Rice P A, Shafer W M, Ram S, Jerse A E. *Neisseria gonorrhoeae*: Drug Resistance, Mouse Models, and Vaccine Development. Annu Rev Microbiol 2017; 71:665-86.
9. Serruto D, Bottomley M J, Ram S, Giuliani M M, Rappuoli R. The new multicomponent vaccine against meningococcal serogroup B, 4CMenB: immunological, functional and structural characterization of the antigens. Vaccine 2012; 30 Suppl 2:B87-97.
10. Hadad R, Jacobsson S, Pizza M, et al. Novel meningococcal 4CMenB vaccine antigens—prevalence and polymorphisms of the encoding genes in *Neisseria gonorrhoeae*. APMIS 2012; 120:750-60.
11. Semchenko E A, Tan A, Borrow R, Seib K L. The serogroup B meningococcal vaccine Bexsero elicits antibodies to *Neisseria gonorrhoeae*. Clin Infect Dis 2018.
12. Serruto D, Spadafina T, Ciucchi L, et al. *Neisseria meningitidis* GNA2132, a heparin-binding protein that induces protective immunity in humans. Proc Natl Acad Sci USA 2010; 107:3770-5.
13. Vacca I, Del Tordello E, Gasperini G, et al. Neisserial Heparin Binding Antigen (NHBA) Contributes to the Adhesion of *Neisseria meningitidis* to Human Epithelial Cells. PLoS One 2016; 11:e0162878.
14. Mubaiwa T D, Hartley-Tassell L E, Semchenko E A, Day C J, Jennings M P, Seib K L. The Bexsero *Neisseria meningitidis* serogroup B vaccine antigen NHBA is a high-affinity chondroitin sulfate binding protein. Scientific reports 2018; 8:6512.
15. Pantano E, Cartocci E, Marchi S, et al. NHBA is processed by kallikrein from human saliva. 2018.
16. Di Fede M, Biagini M, Cartocci E, et al. Neisseria Heparin Binding Antigen is targeted by the human alternative pathway C3-convertase. PLoS One 2018; 13:e0194662.
17. Casellato A, Rossi Paccani S, Barrile R, et al. The C2 fragment from *Neisseria meningitidis* antigen NHBA increases endothelial permeability by destabilizing adherens junctions. Cell Microbiol 2014; 16:925-37.
18. Lappann M, Otto A, Brauer M, Becher D, Vogel U, Johswich K. Impact of Moderate Temperature Changes on *Neisseria meningitidis* Adhesion Phenotypes and Proteome. Infect Immun 2016; 84:3484-95.
19. Arenas J, Nijland R, Rodriguez F J, Bosma T N, Tommassen J. Involvement of three meningococcal surface-exposed proteins, the heparin-binding protein NhbA, the alpha-peptide of IgA protease and the autotransporter protease NalP, in initiation of biofilm formation. Mol Microbiol 2013; 87:254-68.
20. Del Tordello E, Vacca I, Ram S, Rappuoli R, Serruto D. *Neisseria meningitidis* NalP cleaves human complement C3, facilitating degradation of C3b and survival in human serum. Proc Natl Acad Sci USA 2014; 111:427-32.
21. Seib K L, Oriente F, Adu-Bobie J, et al. Influence of serogroup B meningococcal vaccine antigens on growth and survival of the meningococcus in vitro and in ex vivo and in vivo models of infection. Vaccine 2010; 28:2416-27.
22. Rahman H, King R M, Shewell L K, et al. Characterisation of a multi-ligand binding chemoreceptor CcmL (Tlp3) of *Campylobacter jejuni*. PLoS Pathog 2014; 10:e1003822.
23. Steichen C T, Shao J Q, Ketterer M R, Apicella M A. Gonococcal cervicitis: a role for biofilm in pathogenesis. The Journal of infectious diseases 2008; 198:1856-61.
24. Semchenko E A, Day C J, Seib K L. MetQ of *Neisseria gonorrhoeae* Is a Surface-Expressed Antigen That Elicits Bactericidal and Functional Blocking Antibodies. Infect Immun 2017; 85.
25. Jen F E C, Semchenko E A, Day C J, Seib K L, Jennings M P. The *Neisseria gonorrhoeae* Methionine Sulfoxide Reductase (MsrA/B) Is a Surface Exposed, Immunogenic, Vaccine Candidate. Frontiers in Immunology 2019; 10.
26. Semchenko E A, Everest-Dass A V, Jen F E, Mubaiwa T D, Day C J, Seib K L. Glycointeractome of *Neisseria gonorrhoeae*: Identification of Host Glycans Targeted by the Gonococcus To Facilitate Adherence to Cervical and Urethral Epithelial Cells. MBio 2019; 10.
27. Seib K L, Haag A F, Oriente F, et al. The meningococcal vaccine antigen GNA2091 is an analogue of YraP and plays key roles in outer membrane stability and virulence. FASEB J 2019:fj201900669R.
28. Hartley-Tassell L E, Day C J, Semchenko E A, et al. A peculiar case of *Campylobacter jejuni* attenuated aspartate chemosensory mutant, able to cause pathology and inflammation in avian and murine model animals. Sci Rep 2018; 8:12594.

29. Chen T, Swanson J, Wilson J, Belland R J. Heparin protects Opa+ *Neisseria gonorrhoeae* from the bactericidal action of normal human serum. Infect Immun 1995; 63:1790-5.
30. Quillin S J, Seifert H S. *Neisseria gonorrhoeae* host adaptation and pathogenesis. Nat Rev Microbiol 2018; 16:226-40.
31. Pizza M, Scarlato V, Masignani V, et al. Identification of vaccine candidates against serogroup B meningococcus by whole-genome sequencing. Science 2000; 287:1816-20.
32. Giuliani M M, Adu-Bobie J, Comanducci M, et al. A universal vaccine for serogroup B meningococcus. Proc Natl Acad Sci USA 2006; 103:10834-9.
33. Ram S, Cullinane M, Blom A M, et al. Binding of C4b-binding protein to porin: a molecular mechanism of serum resistance of *Neisseria gonorrhoeae*. J Exp Med 2001; 193:281-95.
34. Ram S, McQuillen D P, Gulati S, Elkins C, Pangburn M K, Rice P A. Binding of complement factor H to loop 5 of porin protein 1A: a molecular mechanism of serum resistance of nonsialylated *Neisseria gonorrhoeae*. J Exp Med 1998; 188:671-80.
35. Ngampasutadol J, Ram S, Gulati S, et al. Human factor H interacts selectively with *Neisseria gonorrhoeae* and results in species-specific complement evasion. J Immunol 2008; 180:3426-35.
36. Gulati S, Cox A, Lewis L A, et al. Enhanced factor H binding to sialylated Gonococci is restricted to the sialylated lacto-N-neotetraose lipooligosaccharide species: implications for serum resistance and evidence for a bifunctional lipooligosaccharide sialyltransferase in Gonococci. Infect Immun 2005; 73:7390-7.
37. McQuillen D P, Gulati S, Ram S, et al. Complement processing and immunoglobulin binding to *Neisseria gonorrhoeae* determined in vitro simulates in vivo effects. J Infect Dis 1999; 179:124-35.
38. Bischof P, Planas-Basset D, Meisser A, Campana A. Investigations on the cell type responsible for the endometrial secretion of complement component 3 (C3). Hum Reprod 1994; 9:1652-9.
39. Price R J, Boettcher B. The presence of complement in human cervical mucus and its possible relevance to infertility in women with complement-dependent sperm-immobilizing antibodies. Fertil Steril 1979; 32:61-6.
40. Schumacher G F. Immunology of spermatozoa and cervical mucus. Hum Reprod 1988; 3:289-300.
41. Yu H, Munoz E M, Edens R E, Linhardt R J. Kinetic studies on the interactions of heparin and complement proteins using surface plasmon resonance. Biochim Biophys Acta 2005; 1726:168-76.
42. Zollner R, Oldewurtel E R, Kouzel N, Maier B. Phase and antigenic variation govern competition dynamics through positioning in bacterial colonies. Scientific reports 2017; 7:12151.
43. Stein D C, LeVan A, Hardy B, Wang L C, Zimmerman L, Song W. Expression of Opacity Proteins Interferes with the Transmigration of *Neisseria gonorrhoeae* across Polarized Epithelial Cells. PLoS One 2015; 10:e0134342.
44. LeVan A, Zimmerman L I, Mahle A C, et al. Construction and characterization of a derivative of *Neisseria gonorrhoeae* strain MS11 devoid of all opa genes. J Bacteriol 2012; 194:6468-78.
45. Wang L C, Litwin M, Sahiholnasab Z, Song W, Stein D C. *Neisseria gonorrhoeae* Aggregation Reduces Its Ceftriaxone Susceptibility. Antibiotics (Basel) 2018; 7.
46. Mandrell R E, Griffiss J M, Macher B A. Lipooligosaccharides (LOS) of *Neisseria gonorrhoeae* and *Neisseria meningitidis* have components that are immunochemically similar to precursors of human blood group antigens. Carbohydrate sequence specificity of the mouse monoclonal antibodies that recognize crossreacting antigens on LOS and human erythrocytes. J Exp Med 1988; 168:107-26.
47. Lee S W, Higashi D L, Snyder A, Merz A J, Potter L, So M. PilT is required for PI(3,4,5)P3-mediated crosstalk between *Neisseria gonorrhoeae* and epithelial cells. Cell Microbiol 2005; 7:1271-84.
48. Higashi D L, Lee S W, Snyder A, Weyand N J, Bakke A, So M. Dynamics of *Neisseria gonorrhoeae* attachment: microcolony development, cortical plaque formation, and cytoprotection. Infect Immun 2007; 75:4743-53.
49. Merz A J, So M. Attachment of piliated, Opa- and Opc-gonococci and meningococci to epithelial cells elicits cortical actin rearrangements and clustering of tyrosine-phosphorylated proteins. Infect Immun 1997; 65:4341-9.
50. Merz A J, Enns C A, So M. Type IV pili of pathogenic Neisseriae elicit cortical plaque formation in epithelial cells. Mol Microbiol 1999; 32:1316-32.
51. Dietrich M, Bartfeld S, Munke R, et al. Activation of NF-kappaB by *Neisseria gonorrhoeae* is associated with microcolony formation and type IV pilus retraction. Cell Microbiol 2011; 13:1168-82.
52. Anderson M T, Dewenter L, Maier B, Seifert H S. Seminal plasma initiates a *Neisseria gonorrhoeae* transmission state. MBio 2014; 5:e01004-13.
53. Mikaty G, Soyer M, Mairey E, et al. Extracellular bacterial pathogen induces host cell surface reorganization to resist shear stress. PLoS Pathog 2009; 5:e1000314.
54. Seib K, Oriente F, Adu-Bobie J, et al. Influence of serogroup B meningococcal vaccine antigens on growth and survival of the meningococcus in vitro and in ex vivo and in vivo models of infection. Vaccine 2010; 28:2416-27.
55. Serruto D, Spadafina T, Ciucchi L, et al. *Neisseria meningitidis* GNA2132, a heparin-binding protein that induces protective immunity in humans. Proceedings of the National Academy of Sciences 2010; 107:3770-5.

The invention claimed is:

1. An immunogenic fragment of an isolated Neisserial Heparin Binding Antigen (NHBA) protein of *Neisseria gonorrhoeae*, wherein the immunogenic fragment is between about 165 amino acids to about 200 amino acids in length and wherein the immunogenic fragment comprises, is contained in, consists of or consists essentially of an amino acid sequence set forth in SEQ ID NO: 2 or a variant thereof, wherein the variant shares at least 97% sequence identity with SEQ ID NO: 2.

2. The immunogenic fragment of claim 1, wherein the immunogenic fragment consists of or consists essentially of the amino acid sequence set forth in SEQ ID NO: 2 or the variant thereof having at least 97% sequence identity with SEQ ID NO: 2.

3. The immunogenic fragment of claim 1, wherein the variant comprises one or more amino acid substitutions of residues 4, 6, 7, 10, 21, 51, 58, 61, 62, 70, 72, 76, 77, 84, 89, 90, 92, 93, 94, 114, 136, 151, 153, 154, 168, 174, 178, 181 and 182 of SEQ ID NO: 2.

4. The immunogenic fragment of claim 3, wherein the one or more amino acid substitutions of SEQ ID NO: 2 are selected from the group consisting of A4V, I6M, P7L, P10S, G21E, P51S, R58S, G61A, E62K, A70V, T72A, N76S, G77R, M84T, P89S, Y90C, S92T, G93R, G94S, S114G, T136N, G151D, A153V, G154D, A168T, G174S, G178D, D181E, R182Q and any combination thereof.

5. The immunogenic fragment of claim 1, which comprises one or more heparin binding residues and/or one or more active site residues of the isolated NHBA protein.

6. An isolated protein comprising one or a plurality of an immunogenic fragments of an isolated Neisserial Heparin Binding Antigen (NHBA) protein of *Neisseria gonorrhoeae*, wherein the immunogenic fragments are between about 165 amino acids to about 200 amino acids in length and wherein the immunogenic fragments comprises, is contained in, consists of or consists essentially of an amino acid sequence set forth in SEQ ID NO: 2 or a variant thereof, wherein the variant shares at least 97% sequence identity with SEQ ID NO: 2.

7. The immunogenic fragment or variant thereof of claim 1, wherein the immunogenic fragment or the variant thereof is conjugated, coupled or otherwise linked to a carrier protein.

8. The variant of claim 1, wherein the variant shares at least 98% or 99% sequence identity with SEQ ID NO: 2.

* * * * *